United States Patent [19]
Nakajima et al.

[11] Patent Number: 5,832,088
[45] Date of Patent: Nov. 3, 1998

[54] METHOD AND APPARATUS FOR PREVENTING DATA COPYING FROM A DISK USING DATA LENGTHS TOO LARGE FOR A PIRATE MEDIUM

[75] Inventors: Heitaro Nakajima; Takaharu Kitada; Hiroshi Ogawa, all of Tokyo, Japan

[73] Assignee: Sony Corporation, Tokyo, Japan

[21] Appl. No.: 624,391

[22] PCT Filed: Aug. 8, 1995

[86] PCT No.: PCT/JP95/01574

§ 371 Date: Apr. 5, 1996

§ 102(e) Date: Apr. 5, 1996

[87] PCT Pub. No.: WO96/05595

PCT Pub. Date: Feb. 22, 1996

[30] Foreign Application Priority Data

Aug. 8, 1994 [JP] Japan .................................... 6-204199

[51] Int. Cl.⁶ .................................................. G06F 5/00
[52] U.S. Cl. .............................. 380/22; 380/9; 380/10; 380/6; 380/3; 711/163
[58] Field of Search .............................. 326/8; 395/186, 395/885, 888; 380/3, 4, 5, 6, 9, 10, 22; 711/163, 164

[56] References Cited

U.S. PATENT DOCUMENTS 5,414,688 5/1995 Inokuchi ................................... 369/84
5,513,260 4/1996 Ryan ........................................ 380/3

FOREIGN PATENT DOCUMENTS 5-205397 8/1993 Japan .
5-325418 12/1993 Japan .

*Primary Examiner*—Tod R. Swann
*Assistant Examiner*—J. Peikari
*Attorney, Agent, or Firm*—Limbach & Limbach LLP

[57] ABSTRACT

Recording data is recorded on a CD-ROM so as to satisfy a relationship expressed as $W \geq D$ and $W > m$ where W is the data length of recording data recorded on the CD-ROM, D is the data length of effective data useful for being accessed (system area, file groups selected when data is edited and retrieval data such as volume descriptor, path table and directory) and m is the maximum recordable data length of a blank disk of a CD-ROM to which data recorded on the CD-ROM is copied. Then, when the relationship between the recording data length W and the effective data length D is expressed by $W > D$, said recording data contains randomly quasi-data useless for being accessed. Further, a part (e.g., path table) of the retrieval data is arranged at the end of the recording data upon recording. Thus, an illegal copy from the CD-ROM to a blank disk becomes substantially useless, thereby making it possible to effectively protect a copyright of the CD-ROM.

21 Claims, 28 Drawing Sheets

FIG. 21

Information Table

0 Record
- Directory Name (or Directory Number)
- File Name (or File Number) ⎫
- Starting Logical Address ⎬ In The Case of Dummy Data "FFFF"
- Recording Time (Available L B N)

1 Record
- Directory Name (or Directory Number)
- File Name (or File Number)
- Starting Logical Address
- Recording Time (Available L B N)

Dummy Table

| | |
|---|---|
| 0 Record | Recording Time (Available LBN) |
| 1 Record | Recording Time (Available LBN) |
| 2 Record | Recording Time (Available LBN) |
| 3 Record | Recording Time (Available LBN) |

⋮

METHOD AND APPARATUS FOR PREVENTING DATA COPYING FROM A DISK USING DATA LENGTHS TOO LARGE FOR A PIRATE MEDIUM

TECHNICAL FIELD

1. [FIELD OF INDUSTRIAL APPLICATION]

The present invention relates to a data recording method for effectively preventing illegal data duplication (copy) between disk-like recording mediums such as a read-only optical disk (CD-ROM, etc.), a write once optical disk (CD-R, etc.), a recordable optical disk (magneto-optical disk, etc.) or magnetic disk, a data recording apparatus and disk-like recording medium which can realize the data recording method and a computer system and a data copy preventing method for preventing illegal data copy between the disk-like recording mediums when one system is arranged by using these disk-like recording mediums.

2. BACKGROUND ART

As a disk-like recording medium (referred to hereinafter as an optical disk) on and from which an information signal is recorded and reproduced by laser beam, there are now commercially available a so-called compact disc with audio data recorded therein, a CD-ROM in which computer data is recorded, a write once optical disk on which an information signal can be recorded once and a recordable optical disk in which an information signal can be reproduced, recorded and erased.

The read-only optical disk such as a compact disc or CD-ROM has tracks on which irregular patterns, i.e., phase pits are concentrically or spirally formed on the basis of a recorded information signal formed on one surface thereof. Specifically, the read-only optical disk is composed of a disk base plate made of a transparent synthetic resin such as polycarbonate or PMMA (polymethyl methacrylate), a reflection film made of a metal such as Al or Au formed so as to cover phase pits formed on one surface of the disk base plate and a protection layer formed so as to cover the reflection film in order to protect the reflection film.

When an information signal is reproduced from the read-only optical disk, laser beam from a laser light source is converged by an objective lens and irradiated on the read-only optical disk from the disk base plate side. Reflected light flux modulated by the phase pits on the optical disk is detected by a photodetector, for example, and converted into a detected signal having a signal level corresponding to an intensity of reflected light flux, thereby allowing a reproduced signal of the information signal recorded on the read-only optical disk to be obtained.

While the read-only optical disk can provide mass-produced products (optical disks) inexpensively on the market, it is not suitable for products of small demand. For this end, write once optical disks are prepared for optical disk products of small demand and a variety of data can be provided to the user easily.

As write once optical disks, there are available a write once optical disk of recording system using physical chemical change of pigment, a write once optical disk of a single layer hole forming recording system, a write once optical disk of multi-layer hole forming recording system, a write once optical disk of phase-change recording system and a write once optical disk of bubble-foaming system. Upon reproduction, in a manner similar to the read-only optical disk, a laser beam (having a weak reproduction laser power) from a laser light source is irradiated on the disk from the disk base plate side under the condition that the laser beam is converged by an objective lens. Then, reflected light flux that is modulated by previously-recorded pits is detected by a photodetector and the detected signal is converted into a detected signal having a signal level corresponding to an intensity of a reflected light bundle, thereby obtaining a reproduced signal of an information signal recorded on the write once optical disk.

When an information signal is recorded on the above write once optical disk, a laser beam (having a strong recording laser power) from a laser light source is irradiated on the optical disk from the disk base plate side under the condition that the laser beam is converged by an objective lens. Then, the power of the laser beam is turned on and off by modulating the laser beam in response to an information signal and pits (pits substantially similar to those recorded on the read-only optical disk) corresponding to the information signal are formed along recording tracks of the optical disk.

Specifically, in the case of the single layer hole forming recording system, a hole is formed on the recording track at an area irradiated with a strong laser beam and this hole is recorded as a pit. In the case of a multi-layer hole forming recording system, a hole is formed on the recording track at an area irradiated with a strong laser beam, e.g., the film of the first layer and the hole on the first layer are recorded as a pit.

In the case of the phase change recording system, a portion of the recording track irradiated with a strong laser beam is changed from the amorphous state to the crystal state and the portion that was changed to the crystal state is recorded as a pit. In the case of the bubble foaming recording system, of the recording tracks, a recording layer of the portion irradiated with a strong laser beam is upheaved and the upheaved portion is recorded as a pit.

In the write once optical disk, in particular, a guide groove is formed (pre-groove portion) to allow tracking control of laser beam. An end face opposing the pre-groove is formed as a sine wave shape (generally referred to as a wobble shape) having a predetermined amplitude and a predetermined period along the track. When this wobble shape is optically detected by laser beam, it is possible to obtain a wobble signal serving as absolute time information.

The wobble signal is used to control the system of the recording and reproducing apparatus and, in particular, the timing information for recording pits on the optical disk. Further, the wobble signal is used to servo-control an optical disk rotating and driving means, e.g., a spindle motor. According to the servo control operation, the rotational speed of the spindle motor is controlled such that the period of the wobble signal becomes constant.

The above write once optical disk is generally of a groove recording 10 system where pits are recorded on the pre-groove portion. When information data that is to be recorded on the write once optical disk is recorded, a target position is synchronously searched based on the period of the wobble signal obtained by optically detecting the wobble shape formed on the pre-groove portion. When the target position is detected, the above information data that is to be recorded on the write once optical disk is recorded on the target position according to a predetermined format.

On the other hand, upon reproduction, a target position is searched as described above. When the target position is detected, based on a frame synchronizing signal inserted into the data to be recorded on the write once optical disk, 2 kilobytes of data, for example, are sequentially read out, thereby reproducing recorded data.

Since the read-only optical disk and the write once optical disk are the same in reproduction principle as described above, even when the write once optical disk is loaded onto a reproducing apparatus which reproduces an information signal from the read-only optical disk, data recorded on the write once optical disk can be reproduced without distinction of the read-only optical disk.

In addition, the write once optical disk has a feature that allows a number of optical disks to be easily produced by relatively simple equipment.

For this reason, there is the risk that the write once optical disk will be illegally copied (illegal copy).

Specifically, initially, there is a computer system wherein a reproducing apparatus for reproducing an information signal from a read-only optical disk is connected to one external input and output terminal of a personal computer used by the end user. For example, and an external storage device for recording and reproducing an information signal on and from the write once optical disk is connected to another external input and output terminal. Then, recorded data that had been read out from the read-only optical disk by the reproducing apparatus are all written in the write once optical disk by the external storage device, thereby producing a pirate edition of the read-only optical disk.

In this case, if the read-only optical-disk is a CD-ROM where computer data (including computer program) are recorded, then a pirate edition of game software can be easily produced. If the read-only optical disk is a compact disc (CD) where music information are recorded, then it becomes possible to easily produce a pirate edition of the compact disc.

Since computer programs are copyrighted material protected by copyright, copies—except those made by the regular user, i.e., registered users who accepted the software license agreement (software license agreement)—for backup or copies for the hard disk are illegal.

Further, copy for thoroughly copying recorded data on the CD-ROM which is a copyright material to the write once optical disk for the purpose of action of concession in distribution is also illegal and such illegal action for obtaining unfair profit should be prevented.

Furthermore, an act wherein a regular user makes a free distribution for those who are not regular users in an enterprise or CAI (Computer Assisted Instruction) is regarded as serious.

At present, there are a variety of proposed methods for copy protection many of which have been reduced to practice. On the other hand, a software (program or the like) called "copy tool" used in removing copy protection is now commercially available. Short of the user's own conscience, there is currently no other way to prevent the illegal copying of recorded data.

In view of the aforesaid, it is an object of the present invention to provide a data recording method wherein an illegal copy between disk-like recording mediums can be effectively protected even against a copy tool and in which copyrighted material (recorded data) recorded on the disk-like recording medium can be protected.

It is another object of the present invention to provide a data recording apparatus which can easily realize a data recording method capable of effectively preventing an illegal copy between disk-like recording mediums.

It is a further object of the present invention to provide a disk-like recording medium having a data recording form such that an illegal copy between disk-like recording mediums can be effectively prevented.

It is still a further object of the present invention to provide a computer system wherein when a plurality of external storage devices using disk-like recording mediums are connected to a computer, and an illegal copy among the disk-like recording mediums in these external storage devices can be prevented effectively.

It is yet a further object of the present invention to provide a data copy preventing method in which an illegal copy between disk-like recording mediums can be effectively prevented even by a copy tool and in which copyrighted material (recorded data) recorded on the disk-like recording medium can be protected.

DISCLOSURE OF THE INVENTION

According to the present invention, there is provided a data recording method for recording data on a disk-like recording medium which is comprised of a step (a) for making recording data which satisfies a relationship expressed as $M \geq W \geq D$ where M is the maximum recordable data length defined by the standard of the disk-like recording medium, W is the data length of recording data recorded on the disk-like recording medium, and D is the data length of effective data accessed of the recording data and a step (b) for recording the recording data made at the step (a) on the disk-like recording medium.

Therefore, when the recording data is copied to another disk-like recording medium having a maximum recordable data length shorter than the recording data length W, if the effective data length D is the same as the recording data length W, for example, then the recording data is forced to be copied under the condition that a part of the effective data is dropped.

Accordingly, even when the user intends to obtain expected and desired program operation and information from the effective data by use of another disk-like recording medium, data and information necessary for the desired program operation are not complete and such data and information are useless as copied data and information. Thus, the illegal copying from the disk-like recording medium to another disk-like recording medium can be substantially prevented.

If the effective data length is shorter than the recording data length W, then the effective data can be spatially spaced apart and recorded and an important key file can be recorded on the end portion of the recording data, for example. Also in this case, when the recording data is copied to another disk-like recording medium, the recording data is copied under the condition that a part of the effective data is dropped. Therefore, the illegal copy from the disk-like recording medium to another disk-like recording medium can be prevented substantially.

In particular, according to the above-mentioned method, the recording data having a relationship of W>m is made at the step (a) when a maximum recordable data length of other data recordable disk-like recording medium is m in association with the disk-like recording medium. In this case, when the recording data is copied to another disk-like recording medium to which recording data is copied, the recording data is copied to another disk-like recording medium under the condition that a part of the effective data is dropped as described above. Therefore, the illegal copying to another disk-like recording medium can be substantially prevented.

According to the above-mentioned method, when a relationship between the recording data length W and the effective data length is W>D, the recording data having a relationship of W>m is made by adding invalid data to the effective data in the step (a).

In this case, it becomes possible to use the recording form such that the effective data cannot be copied completely if the invalid data is not removed when copying is carried out. Thus, those who intend to do the illegal copying are forced to do difficult work, such as detecting and removing the invalid data.

Therefore, it is possible to effectively lower the probability that the illegal copy will be achieved. This leads to substantial prevention of illegal copying.

In the above-mentioned method, the invalid data may have an invisible attribute. In this case, it is frequently observed that those who are skilled in operating a personal computer can record the effective data on another disk-like recording medium by searching the position of the invalid data with a DIR command, for example, and by removing the invalid data in order to execute the illegal copy from the disk-like recording medium to another disk-like recording medium on the picture displayed on the display. If the invalid data has invisible attributes, then the above-mentioned operation becomes meaningless. Therefore, it becomes possible to reliably prevent illegal copying by those who are skilled in operating the personal computer.

In the above-mentioned method, part of the effective data may be rearranged. In this case, there is very a small probability that a part of the rearranged data will be recorded on another disk-like recording medium to which data is copied. Thus, data is copied to another disk-like recording medium under the condition that a part of the effective data is dropped. Therefore, the illegal copy can be prevented.

In the above-mentioned method, a part of the data may be arranged at the end of the recording data. In this case, when the effective data recorded on the disk-like recording medium, for example, is forcibly copied to another disk-like recording medium, since the maximum recordable data length of another disk-like recording medium is set to be shorter than the recording data length of the disk-like recording medium, there is then the large probability that data wherein a part of data arranged at the end is dropped will be recorded as the data recorded on another disk-like recording medium or data where a part of data is dropped is constantly recorded on another disk-like recording medium. Therefore, it becomes possible to make the copy to another disk-like recording medium substantially impossible.

In the above-mentioned method, the effective data comprises real data composed of a number of file groups and retrieval data used to retrieve the real data and the part of data is a part or whole of the retrieval data. In this case, since data where a part or whole of the retrieval data, which is a part of the data, is recorded on another disk-like recording medium, even when another disk-like recording medium is loaded on and reproduced by an external storage device or a reproducing apparatus, for example, the effective data cannot be retrieved and another disk-like recording medium becomes substantially useless. Therefore, illegal copying to another disk-like recording medium can be substantially prevented.

Incidentally, a retrieval key file for the execution or text files contained in the effective data can be used as the retrieval data.

Further, in a data recording apparatus according to the present invention, a data recording apparatus for recording data on a disk-like recording medium is comprised of a recording data making means for making recording data which satisfies a relationship expressed as $M \geq W \geq D$ where M is the maximum recordable data length defined by the standard of the disk-like recording medium, W is the data length of recording data recorded on the disk-like recording medium and D is the data length of effective data accessed of the recording data, and a recording means for recording the recording data made by the recording data making means on the disk-like recording medium.

Therefore, when the recording data is copied to another disk-like recording medium having a maximum recordable data length shorter than the recording data length W, if the effective data length D is the same as the recording data length W, for example, then the recording data is copied on another disk-like recording medium under the condition that a part of the effective data is dropped.

Accordingly, even when the user intends to obtain expected and desired program operation and information from the effective data by use of another disk-like recording medium, since data and information necessary for the desired program operation are not complete, they are not useful as copied material. Therefore, the illegal copy from the disk-like recording medium to another disk-like recording medium can be substantially prevented.

If the effective data length is shorter than the recording data length W, then the effective data can be spatially spaced apart and recorded or an important key file can be recorded on the end portion of recording data, for example. Also in this case, when the recording data is copied to another disk-like recording medium, the recording data is copied under the condition that a part of the effective data is dropped. Therefore, the illegal copy from the disk-like recording medium to another disk-like recording medium can be substantially prevented.

In the above-mentioned arrangement, the data making means makes the recording data have a relationship of W>m when a maximum recordable data length of other data recordable disk-like recording mediums is m in association with the disk-like recording medium.

In this case, when the recording data is copied to another disk-like recording medium to which the recording data is copied, as described above, the recording data is copied to another disk-like recording medium under the condition that a part of the effective data is dropped. Therefore, the illegal copy to another disk-like recording medium can be prevented substantially.

Specifically, when a relationship between the recording data length W and the effective data length is W>D, the recording data making means makes the recording data having a relationship of W>m by adding invalid data to the effective data.

Therefore, the recording data making means makes the recording data by adding the invalid data to the effective data. Thereafter, the data recording means records the recording data on the disk-like recording medium.

In this case, it becomes possible to use the recording form such that, when the recording data is copied to another disk-like recording medium, if the invalid data is not removed, then the effective data cannot be completed. Therefore, those who do the illegal copying are forced to detect and remove the invalid data. Thus, it is possible to effectively lower the probability that the illegal copy will be made. This leads to substantial prevention of illegal copying.

Further, in the above-mentioned arrangement, the recording data making means includes an attribute setting means for setting the invalid data on an effective data management file as an invisible attribute. In this case, since the above attribute setting means makes the invalid data an invisible attribute, this becomes effective for the following cases.

Specifically, it is frequently observed that those who are skilled in operating a personal computer can record the effective data on another disk-like recording medium by searching for the position of the invalid data with a DIR command, for example, and by removing the invalid data in order to execute the illegal copy from the disk-like recording medium to another disk-like recording medium on the picture displayed on the display. If the invalid data has invisible attributes, then the above-mentioned operation becomes meaningless. Therefore, it becomes possible to reliably prevent illegal copying by those who are skilled in operating personal computers.

In the above-mentioned arrangement, the recording data making means includes a rearrangement means for rearranging a part of the effective data.

In this case, as described above, the recording data making means makes recording data by adding the invalid data to the effective data. According to the present invention, the rearrangement means makes the final recording data by rearranging a part of the effective data. Then, the data recording means records the recording data on the disk-like recording medium.

Accordingly, when the recording data recorded on the disk-like recording medium is copied to another disk-like recording medium, there is then a very small probability that a part of the rearranged data will be recorded on another disk-like recording medium to which the copy is made. As a consequence, the recording data is copied to another disk-like recording medium under the condition that a part of the effective data is dropped, and the invalid data also is recorded on another disk-like recording medium. Therefore, it is possible to reliably prevent the illegal copy.

In the above-mentioned arrangement, the rearrangement means arranges a part of the data at the end of the recording data. In this case, of the recording data made by the recording data making means, part of the effective data is taken out and rearranged at the end of the recording data by the rearrangement means and thus a final recording data is made.

Therefore, if the effective data recorded on the disk-like recording medium, for example, is forced to be copied to another disk-like recording medium, then since the maximum recordable data length of another disk-like recording medium is set to be shorter than the recording data length of the disk-like recording medium, there is the large probability that data where a part of data arranged at the end is dropped will be recorded as the data to be recorded on another disk-like recording medium or data wherein a part of data is dropped will constantly be recorded. Therefore, it becomes possible to substantially disable the copy to another disk-like recording medium.

In the above-mentioned arrangement, the effective data is comprised of real data composed of a number of file groups and retrieval data used to retrieve the real data and the part of data is a part or whole of the retrieval data.

In this case, since data wherein a part or whole of the retrieval data forming a part of the data is dropped is recorded on another disk-like recording medium, even when another disk-shaped recording medium is loaded onto and reproduced by the external storage device or the reproducing apparatus. For example, the effective data cannot be retrieved and another disk-like recording medium becomes substantially useless. Therefore, the illegal copy to another disk-like recording medium can be substantially prevented.

The retrieval key files of the execution and text files contained in the effective data can be used as the retrieval data.

Further, in a disk-like recording medium according to the present invention, recording data which satisfies a relationship expressed as $M \geq W \geq D$ is recorded where M is the maximum recordable data length defined by the standard of the disk-like recording medium, W is the data length of recording data recorded on the disk-like recording medium and D is the data length of effective data accessed of the recording data.

In this case, when the recording data recorded on the disk-like recording medium is copied to another disk-like recording medium having the maximum recordable data length shorter than the recording data length by use of an external storage device (composed of a disk-like recording medium recording and reproducing apparatus, etc.) connected to a personal computer, for example, if the effective data length D is the same as that of the recording data length W, then the recording data is forced to be copied to another disk-like recording medium under the condition that a part of the effective data is dropped.

Accordingly, even when expected and desired program operation and information are obtained from the effective data by use of another disk-like recording medium, data and information necessary for the desired program operation are not complete and they become useless as a copy material. As a consequence, illegal copying from the disk-like recording medium to another disk-like recording medium can be substantially prevented.

If the effective data length is shorter than the recording data length W, then the effective data can be spatially spaced apart and recorded. Important key files can be recorded at the end portion of the recording data, for example. Also in this case, when the recording data is copied to another disk-like recording medium, the recording data is copied to another disk-like recording medium under the condition that a part of the effective data is dropped. Thus, the illegal copy from the disk-like recording medium to another disk-like recording medium can be substantially prevented.

In particular, the recording data satisfies a relationship of W>m when a maximum recordable data length of other data recordable disk-like recording medium is m in association with the disk-like recording medium. Therefore, when the recording data is copied to another disk-like recording medium to which the copy is made, the recording data is recorded on another disk-like recording medium under the condition that a part of the effective data is dropped. Thus, the illegal copy to another disk-like recording medium can be substantially prevented.

In the disk-like recording medium, recording data can be recorded under the condition that a part of the effective data is rearranged. Therefore, when the recording data recorded on the disk-like recording medium is copied to another disk-like recording medium (having a maximum recordable data length shorter than the recording data length), there is then a very small probability that a part of the separated data will be recorded on another disk-like recording medium to which the copy is made. As a result, the recording data is recorded on another disk-like recording medium under the condition that a part of the effective data is dropped. Thus, it is possible to prevent the illegal copy.

In the disk-like recording medium, a part of the data is recorded on the end of the recording data. In this case, when the recording data recorded on the disk-like recording medium is forced to be copied to another disk-like recording medium, the maximum recordable data length of another disk-like recording medium is set to be shorter than the recording data length of the disk-like recording medium.

Therefore, there is the large probability that, of the effective data, data where a part of data arranged at the end is dropped will be recorded as the data to be recorded on another disk-like recording medium or data where a part of data is dropped will be recorded. Thus, it becomes possible to substantially disable copying to another disk-like recording medium.

In a computer system according to the present invention which includes a first storage device for reproducing information data from a first disk-like recording medium, a second storage device for recording information data on a second disk-like recording medium and a control apparatus for controlling the first and second storage devices the computer system comprises a data length judgement means for judging a data length W of information data recorded on the first disk-like recording medium, a judgement means for judging whether the data length W is longer than a maximum recordable data length m determined by standards for the second disk-like recording medium, and a copy restricting means for restricting information data recording on the first disk-like recording medium from being copied to the second disk-like recording medium when the judgement means determines W>m.

When recorded data reproduced from the first disk-like recording medium by the first storage device is copied to the second disk-like recording medium in said second storage device, the judgement means determines whether or not the recording data length W of the first disk-like recording medium is longer than the second maximum recordable data length m. If a judged result is W>m, then the above-mentioned copy is restricted by the copy restricting means.

Accordingly, when the first disk-like recording medium is a disk-like recording medium that is inhibited from being copied, if the recording data length of the first disk-like recording medium is set to be longer than the maximum recordable data length of the second disk-like recording medium, then the copy of the recording data recorded on the first disk-like recording medium to the second disk-like recording medium is restricted by the copy restricting means.

In the above-mentioned arrangement, if the copy restricting means includes a copy inhibiting means for inhibiting the recording data from being copied to the second disk-like recording medium, then when the recording data length of the first disk-shaped recording medium is longer than the maximum recordable data length of the second disk-like recording medium, the copy inhibit means is activated in response to the judged result of the judging means and the copy of the recording data recorded on the first disk-like recording medium to the second disk-like recording medium is thereby inhibited. Therefore, it becomes possible to substantially prevent the illegal copy.

In the above-mentioned arrangement, the copy restricting means may include a warning generating means for generating warnings indicating that the data copy is substantially invalid.

In this case, without the copy inhibiting means, if the recording data length of the first disk-like recording medium is longer than the maximum recordable data length of the second disk-like recording medium, then extra data from the maximum recordable data length is dropped and the recording data is recorded on the second disk-like recording medium. Therefore, "warning indicating that data copy is substantially invalid" generated from the above warning generating means becomes useful. By this warning, the user who intends to carry out the illegal copy is urged to recognize that the illegal copy is substantially useless. Needless to say, if the warning generating means includes the copy inhibiting means, then the illegal copy can be prevented completely. Specifically, the data recorded on the first disk-like recording medium is inhibited from being recorded on the second disk-like recording medium at all. Thus, it is possible to more reliably prevent the illegal copy.

In a data copy preventing method for preventing information data having a recording data length W recorded on a first disk-like recording medium from being copied to a second disk-like recording medium having a maximum recordable data length m, the data copy preventing method according to the present invention comprises the steps of comparing the recording data length W and the maximum recordable data length m and restricting the information data recorded on the first disk-like recording medium from being copied on the second disk-like recording medium.

Therefore, when the data recorded on the first disk-like recording medium is copied to the second disk-like recording medium, the recording data length W of the first disk-like recording medium and the maximum recordable data length m are compared with each other. Then, if the compared result is W >m, then the data copy is restricted.

Accordingly, when the first disk-like recording medium is a disk-like recording medium that should be inhibited from being copied, if the recording data length of the first disk-like recording medium is set to be longer than the maximum recordable data length of the second disk-like recording medium, then the recording data recorded on the first disk-like recording medium is restricted from being copied to the second disk-like recording medium.

If at least the recording data is restricted from being copied to the second disk-like recording medium as a restriction on copying data, then when the recording data length of the first disk-like recording medium is longer than the maximum recordable data length of the second disk-like recording medium, the recording data recorded on the first disk-like recording medium is inhibited from being copied to the second disk-like recording medium in response to the judged result, thereby making it possible to substantially prevent illegal copying.

Further, if at least a warning indicating that the data copy is substantially invalid is generated as a restriction on copying data, then when the recording data length of the first disk-like recording medium is longer than the maximum recordable data length of the second disk-like recording medium, the recording data is recorded on the second disk-like recording medium under the condition that extra data overflowed from the maximum recordable data length is dropped. Therefore, the above-mentioned warning becomes useful. By this warning, it is possible to urge those who intend to do the illegal copying to recognize that the illegal copy is substantially useless. Of course, if the copy inhibition is carried out together with the warning, then the illegal copy can be prevented completely. Specifically, data recorded on the first disk-like recording medium can be perfectly prevented from being recorded on the second disk-like recording medium. As a consequence, the illegal copy can be prevented more reliably.

BRIEF DESCRIPTION OF DRAWINGS

FIG. 21 is an explanatory diagram showing contents of an information table formed by the information table generating means;

FIG. 22 is an explanatory diagram showing contents of a dummy table formed by the dummy data setting means;

BEST MODE FOR CARRYING OUT THE INVENTION

Figure 1:
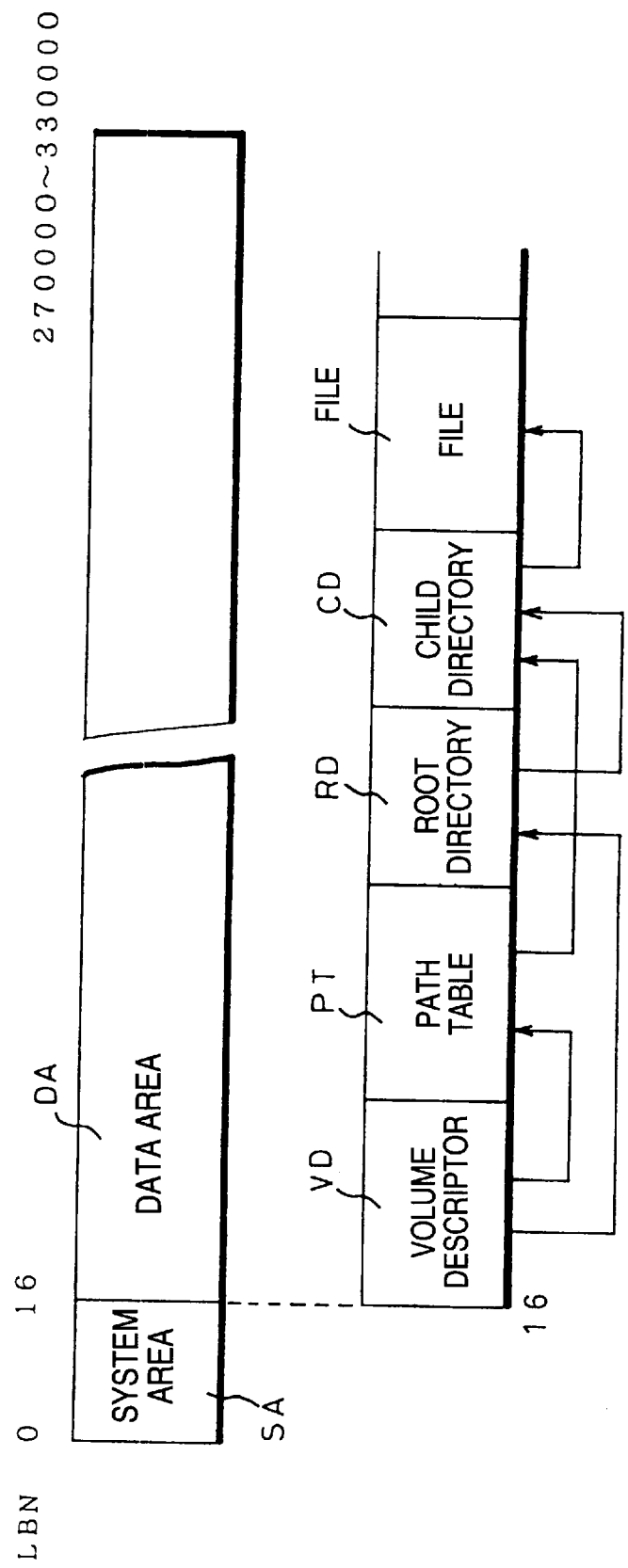
FIG. 1 is an explanatory diagram showing a schematic arrangement of a file format (corresponding to ISO9660) recorded on a CD-ROM.

A data recording method according to the present invention and an embodiment wherein a data recording apparatus which realizes the data recording method is applied to a read-only optical disc, e.g., CD-ROM will be described with reference to FIGS. 1 to 23 (the above-mentioned method and apparatus will hereinafter be referred to simply as a "data recording method according to this embodiment" and a "data recording apparatus according to this embodiment").

Then, together with the explanation of the data recording method and the data recording apparatus according to this embodiment, an example wherein the present invention is applied to a computer system arranged by connecting a plurality of external storage devices also will be described with reference to FIGS. 24 to 29.

As a plurality of external storage devices connected to a personal computer which is a main component of the computer system, there are enumerated an external storage device (generally referred to as a CD-ROM drive) which can reproduce recorded data of CD-ROM that was recorded by the data recording apparatus according to this embodiment and an external storage device (generally referred to as a CD-R drive) on which a write once optical disk in which computer data or the like can be recorded once is loaded. The CD-ROM is an abbreviation of Compact Disc-Read Only Memory and the CD-R is an abbreviation of Compact Disc-Recordable. In the following description, the write once optical disk is referred to as a CD-R and a CD-R on which any particular data is not recorded is referred to as a blank disk.

Further, in the following description, when the CD-ROM is manufactured, those who operate the data recording apparatus according to this embodiment are simply referred to as operators and those who operate the computer system by use of legally purchased CD-ROMs are simply referred to as users.

[File formats of CD-ROM and CD-R]

Prior to describing the data recording method according to this embodiment, the file format of a disk-like recording medium to be used, i.e., CD-ROM will be described in brief based on standards, particularly the ISO9660.

The ISO9660 is based on the previously-proposed HSF (High Sierra format) and is made by improving and correcting the previously-proposed HSF.

The ISO9660 is designed strongly feeling neither MS-DOS (registered trademark) of IBM compatible machine nor HFS of Apple Macintosh (registered trademark) but the CD-ROM.

Initially, technical terms used when this file format is described will be described below.

Volume (volume): A single CD-ROM for simplicity

Volume Set (volume set): One or a plurality of volumes constructing one application Volume Descriptor (volume descriptor): A descriptor in which a variety of information concerning the volume are collected Extent (extent): Set of consecutive sectors Logical Sector (logical sector): Dividing unit of information on the disk and is generally 2 kilobytes (2048 bytes).

Logical block (logical block): Unit for subdividing the logical sector. When the logical sector is 2 kbytes, the logical sector is subdivided into 512 bytes, 1 kbyte or 2 kbytes. The optimum minimum size of the logical block is 2 kbytes depending on the application program.

LBN (abbreviation of logical block number): When a recordable time of a CD-ROM is 60 minutes, since there can be set 75 logical blocks of 2 kbytes per second, there can be set 75×60×60×=270000 (LBN=0 to 269999) in total. Similarly, when a recordable time is 74 minutes, there can be set 330000 (LBN=0 to 329999) logical blocks.

The following conversion equation is used in order to convert a physical address of a practical optical disk (CD-ROM). Specifically, if an absolute time is m minutes, s seconds and f frames, then $LBN=(((m*60)+s)*75+f)-150$ where $-150$ represents the influence of 2 seconds brought about by the pre-gap of CD-ROM.

A file structure of ISO9660 will be described below. As shown in FIG. 1, 16 logical blocks composed of LBN 0 to 15 are called a system area SA. According to the ISO9660, the system area SA can be used freely by the user. Although the system area SA can be used variously, all of OS (operating system) cannot always access the system area SA.

A data area DA starts with LBN 16 and ends with the last physically recordable LBN. If the CD-ROM handles multimedia, then it records not only program but also video and audio data in the data area DA. If the computer handles, i.e., recognizes data, then it becomes necessary to provide data where a file format is described in some area.

In the ISO9660, there is provided an area at the first portion of the data area DA and data (referred to as retrieval data for the sake of convenience) where the file format is described is defined and registered in this area. The retrieval data contains data structure indicating volume, i.e., table of contents of CD-ROM, directory and file.

To be concrete, the retrieval data is composed of volume descriptor VD (Volume Descriptor), path table PT (Path table), root directory RD (Root Directory) and child directory CD (Child Directory), in that order, and also includes practical file groups following the child directory.

The retrieval data can retrieve the child directory CD of a lower hierarchy and the practical files based on information concerning the root directory RD and information concerning the path table PT written on the volume descriptor VD. The recorded position of the volume descriptor VD designates a recorded address (logical block) in the ISO9660.

While only the volume descriptor is recorded at the determined position in accordance with the ISO9660, the recorded position of the path table PT or the like can be freely determined by the user. The retrieval data is generally recorded at the position shown in FIG. 1.

Contents of retrieval data will be described in more detail. The volume descriptor VD is a file where fundamental information, obtained when the CD-ROM is regarded as a publication and address of the index used by the computer to access data, is recorded. The volume descriptor VD is recorded from the LBN 16. One volume descriptor VD occupies one sector.

The path table PT is set on the basis of the following circumstances. Specifically, the CD-ROM is based on the compact disc technology and a device which is inherently difficult to access. Therefore, when the CD-ROM has many files formed thereon, if it is intended to access a target file, then many seek operations have to be repeated until a target file is accessed because directories of hierarchies have to be sought sequentially from the root directory RD. Thus, the user has to endure such repeated seek operations.

In order to improve such situation, a table (referred to as a "path table") indicating the start of the directory files according to the ISO9660 is formed. To be concrete, all child directories CD are sequentially numbered and the positions (LBN) of the child directories are indicated on the table, thereby forming the path table PT.

Therefore, when the CD-ROM is accessed, a target child directory CD can be accessed in the shortest period of time on the basis of the path table PT. As a consequence, a file to be accessed can be accessed by the minimum number of seek operations.

Accordingly, while the CD-ROM is being reproduced, if the first TOC is read and the path table PT also is read and stored in the RAM of the drive, then the target file can be accessed by accessing the CD-ROM once. The reason for this is that the CD-ROM constructs the read-only memory. The path table PT is composed of a number of variable-length records.

When the child directory CD is declared on the lower hierarchy, the position (LBN) of the child directory, etc. are registered on the route directory RD. When files are directly declared on the lower hierarchy, the positions (LBNs) of these files are registered on the route directory DR in the form of a table. The route directory RD is used to retrieve the child directory CD and files through the volume descriptor VD declared on the upper hierarchy.

Positions (LBNs) of files declared on the lower hierarchy are registered on the child directory CD in the form of a table. The child directory CD is used to retrieve files through the route directory RD or the path table PT declared on the upper hierarchy.

The CD-R uses the same format as the file format of the CD-ROM. Specifically, the CD-R uses the file format of the CD-ROM as it is and can read necessary files with reference to retrieval data similar to the CD-ROM. Accordingly, data recorded on the CD-R can be reproduced by the CD-ROM drive.

The CD-R drive for recording and reproducing data on and from the CD-R is of a groove recording system such that pits are recorded on the pre-grooves. When desired data is recorded, a sector synchronization is achieved on the basis of a period of a wobble signal which results from optically detecting a wobble shape formed on the pre-groove. Then, a target sector is searched. When the target sector is detected, desired data is recorded in the form of pits.

If the CD-R (in this case, a blank disk) is composed of a polycarbonate base, for example, a reflection film formed on an organic pigment film formed on the polycarbonate base by vapor deposition and a plastic protection film formed on the reflection film, then when data is recorded on the CD-R by the CD-R drive, a laser beam modulated in response to data to be recorded is irradiated on the disk surface and the organic pigment film at the irradiated position is thermally changed so that organic pigment and polycarbonate react with each other, thereby forming pits corresponding to the data to be recorded.

In the blank disk, a wobble based on the wobble shape of the pregroove portion is frequency-modulated in response to data of ATIP (Absolute Time In Pre-groove) indicating attribute of CD-R or the like. Therefore, when the wobble based on the wobble shape is optically detected and a detected signal is demodulated, it is possible to detect time information on the blank disk.

The time information ATIP has time information (time in Program Area) indicative of a size of proaram area, time information (last possible start time of lead out) indicative of a start position of lead-out area necessary for securing a predetermined lead-out area, etc. assigned thereto.

As the time information indicating the size of program area and the time information indicating the start position of lead-out area, a blank disk with time information of 74 minutes at maximum is now commercially available on the market. If data is recorded over 74 minutes, then it becomes difficult to form the lead-out area.

Specifically, a recording time of the CD-R is determined by standards and data of 666.6 (Mbytes) can be recorded at maximum. To this end, the CD-R drive system is arranged so as to satisfy the standards and is capable of recording data on the blank disk by a simple arrangement.

Accordingly, the CD-R has a characteristic such that a maximum recordable time is limited by a recordable time previously-set by the time information ATIP frequency-modulated through the wobbling of the wobble shape and recorded on the blank disk. In addition, the CD-R is featured in the optical system of the CD-R drive, in particular, a converging characteristic of laser beam used Lo record pits, e.g., a numerical aperture NA (numerical aperture) of an objective lens serving as a converging lens is smaller than the numerical aperture NA in the optical system of a mastering apparatus which produces CD-ROMs.

On the other hand, as shown in the manufacturing process which will be described later on, after a mastering process using a laser beam, a metal master process (referred to as "nickel master" because of plating material) and a mother disk producing process, a stamper is produced from the mother disk and a resin material is compression molded by use of the stamper, thereby forming a disk master disk for the CD-ROM.

Accordingly, the mastering apparatus for effecting a mastering process, which is the first process, uses a gas laser as a laser light source in order to form pits with high accuracy. Further, the mastering apparatus includes a recording optical system with a large numerical aperture NA and a feed mechanism for feeding the recording optical system under servo control. Thus, a metal master with high recording density as compared with that of CD-R can be manufactured.

A plurality of mother disks are produced from the metal master. Also in this process, the production control is carried out in order to produce mother disks with high accuracy. Accordingly, a mother disk can be produced for a CD-ROM with high recording density as compared with that of CD-R manufactured by forming pits.

Further, when the mother disk is produced by use of the metal master, the production control of the CD-ROM is carried out in order to secure sufficient margin (margin) for the predetermined standards in anticipation of fluctuations of produced mother disks and fluctuations occurred in the manufactured CD-ROMs until CD-ROMs are completed through the stamper producing process from the mother disk.

Therefore, the recording density of the CD-ROM is higher than that of the CD-R and therefore the data recordable time of the CD-ROM can be set to be longer than that of the CD-R.

Furthermore, since the reproducing system of the CD-R drive has substantially the same arrangement as that of the CD-ROM drive, it is possible to reproduce data recorded on the CD-ROM whose recording density is high compared with that of the CD-R.

[Manufacturing process of CD-ROM]

The manufacturing process for manufacturing CD-ROMs will be described in brief with reference to FIG. 2.

Figure 2:
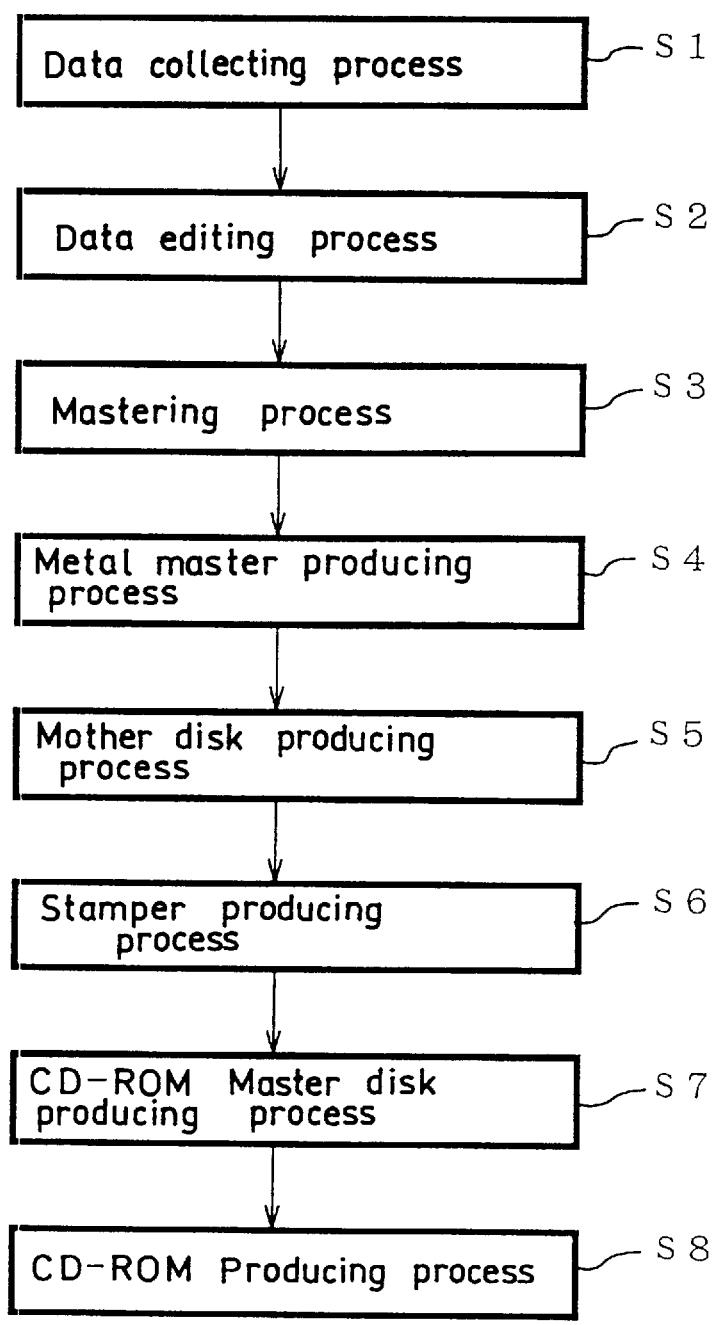
FIG. 2 a process block diagram showing a manufacturing process for making a CD-ROM.

As shown in FIG. 2, in a data collecting process shown at step S1, data to be recorded on the CD-ROM are collected and collected data are registered in a mass-storage device such as a hard disk.

Figure 3:
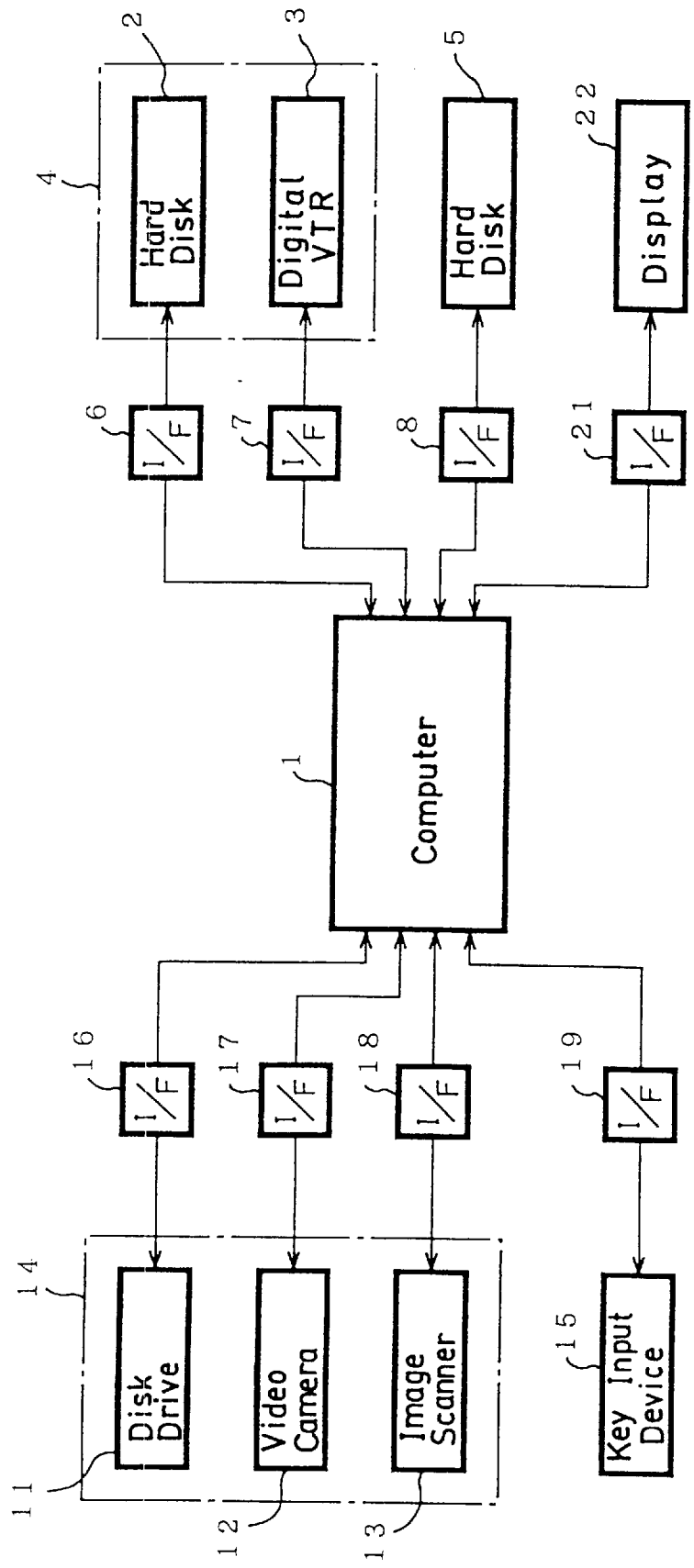
FIG. 3 is a block diagram showing a computer system for collecting data recorded on a CD-ROM and for editing data.

Specifically, data can be collected by a computer system shown in FIG. 3, for example. As shown in FIG. 3, the computer system includes a computer 1 provided at its center. The computer 1 includes a mass-storage device 4 including a filing hard disc 2 and a digital video tape recorder 3 and a mastering hard disk 5 for storing data to be recorded on the CD-ROM connected to its output side through interface circuits 6, 7, 8.

The computer 1 also includes an external device 14 such as a disk drive 11 (CD-R drive, a magneto-optical disk drive and FDD (Floppy Disk Drive) etc.), a video camera 12 and an image scanner 13 and a key input device formed of a keyboard or a mouse used by the operator to enter commands or the like to the computer 1 connected to its input side through interface its interface circuits 16, 17, 18, 19.

When the operator operates the computer 1 by operating the key input device 15, data (e.g., document data made by the user and dictionary data recorded on the disk) from the disk drive 11, audio data and video data from the video camera 12 and still picture data from the image scanner 13 are registered in the mass-storage device 4 such as the hard disk as independent files. Files are registered in the mass-storage device 4 through directory management and file management in the ordinary DOS (Disk operating system).

In a data edit process shown at step S2 in FIG. 2, when the user operates the computer 1 by operating the key input device 15, files actually recorded on the CD-ROM are selected and registered together with the retrieval data on the hard disk 5. Further, a re-edit is carried out in order to protect the CD-ROM from being copied. The file selection and the re-edit in the data editing process will be described in detail later.

In the mastering process shown in step S3, a laser beam is irradiated on a previously-prepared glass master disk coated with a photoresist layer by a mastering device. In this case, the glass master disk is irradiated with a laser beam while the laser beam is being modulated in response to recorded data read out from the hard disk 5. When the laser beam is irradiated on the glass master disk, latent images of pits corresponding to recording data are formed on the photoresist layer of the glass master disk. The mastering device also will be described fully later on.

In a metal mask producing process shown in step S4, the latent image portions are dissolved and removed by developing the glass master disk which had been processed by mastering to form the pits. Then, the resultant glass master disk is processed by nickel plating after electroless plating. Thus, a metal master is produced (nickel master) with pits transferred to the surface from the glass master disk.

In a mother disk producing process shown in step S5, mother disks of the necessary number are produced from the metal mask. At that time, the pits that were formed on the metal mater are transferred to the surface of each master disk.

In a stamper producing process shown in step S6, a stamper is produced from the mother disk. The pits that were formed on the mother disk are transferred to the surface of the stamper.

In a CD-ROM master disk producing process shown in step S7, a CD-ROM master disk made of resin is produced by compression-molding the resin by use of the stamper. At that time, the pits that were formed on the stamper are transferred to the CD-ROM master disk.

In a CD-ROM producing process shown in step S8, after a reflection film such as an Al layer is formed on the CD-ROM master disk, a transparent protection layer is formed on the CD-ROM master disk and a label is printed on the CD-ROM master disk, thereby completing a CD-ROM.

[Operation principle of data recording apparatus according to this embodiment]

A principle of operation of the data recording apparatus used in the data edit process shown in step S2 and the mastering process shown in step S3 will be described with reference to a flowchart of FIG. 4.

Figure 23:
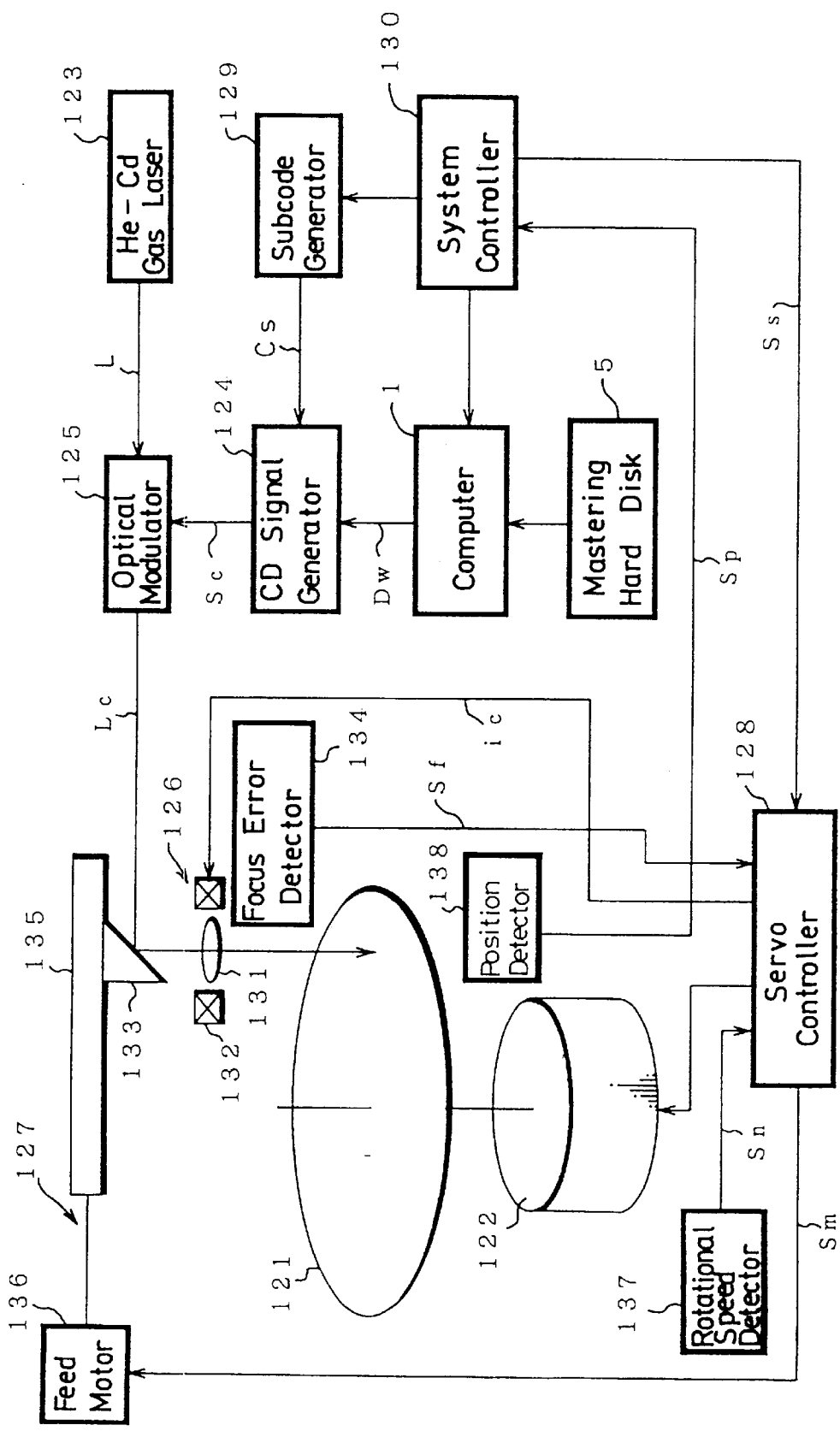
FIG. 23 is a block diagram showing a mastering apparatus which is one of the elements of the data recording apparatus according to the embodiment of the present invention.

The data recording apparatus is composed of a data editing means (software) incorporated in the computer 1 and a mastering apparatus shown in FIG. 23.

Figure 4:
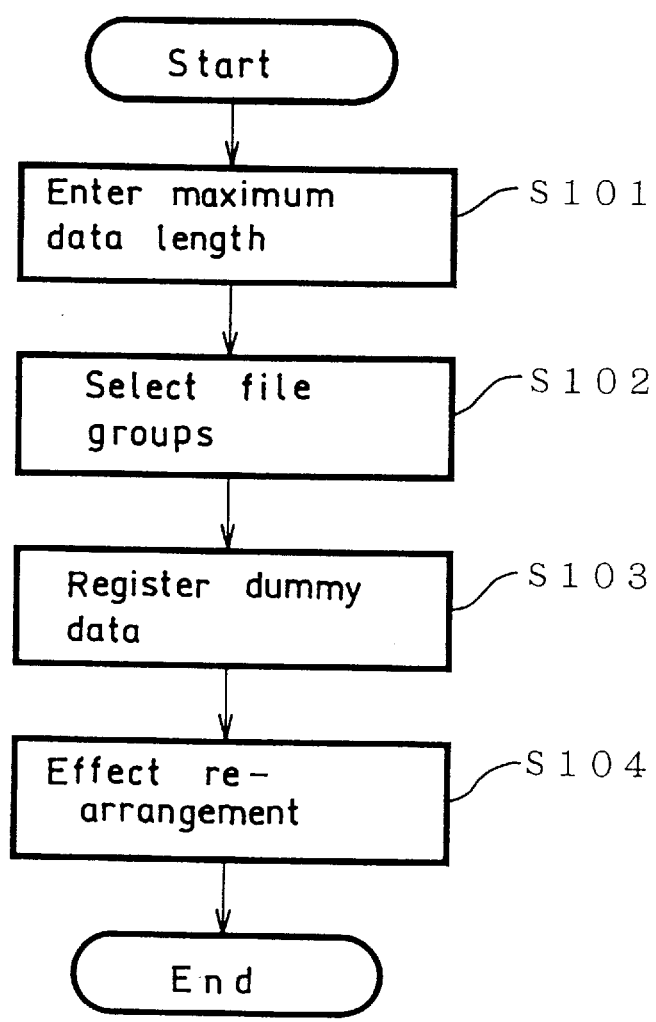
FIG. 4 is a flowchart showing an operation principle of a data recording apparatus used in a data editing process and a mastering process.

As shown in FIG. 4, watching a set picture displayed on a picture screen of a display 22 formed of a CRT or a liquid crystal display connected to the computer 1 through an interface circuit 21, the user enters a maximum data length of data to be recorded on the CD-ROM by use of ten keys, for example (step 101).

Then, the user selects file groups to be recorded on the CD-ROM by use of the key input device 15 (step S102).

Specifically, video data, audio data and document data stored in the mass-storage device 4 are respectively displayed on the set picture as file names or file numbers. Under recent GUI (Graphical User Interface) circumstances, symbol marks of files are frequently displayed as icons.

Then, the user selects file to be recorded on the CD-ROM by entering the file name or file number from the keyboard or clicking the icon of the corresponding file.

When the user selects a file, the user usually designates a directory necessary for retrieving files prior to selecting a file. Accordingly, the user initially registers a directory and then registers a selected file.

Figure 5A:
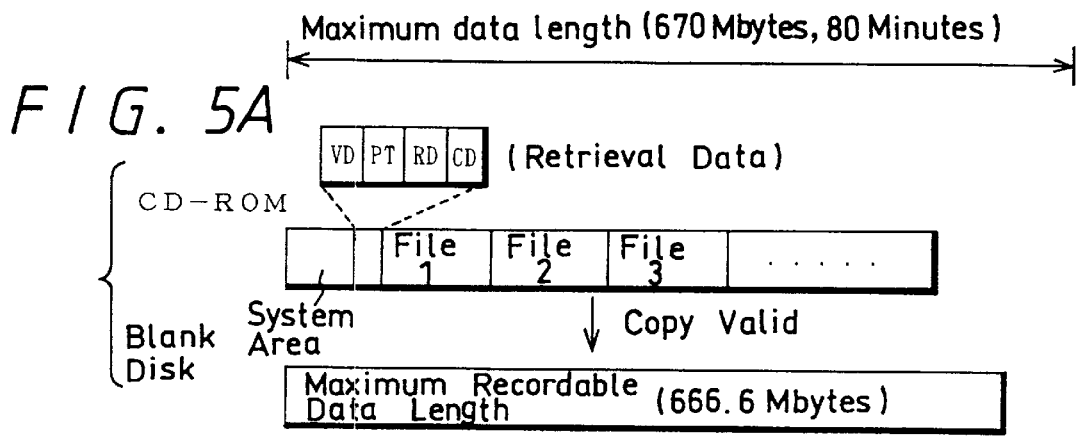
FIG. 5A, FIG. 5B, FIG. 5C, and FIG. 5D are explanatory diagrams conceptually showing a recording format to the CD-ROM and whether or not recorded data of CD-ROM can be copied to a blank disk.

A recording format of the CD-ROM will be described conceptually. As shown in FIG. 5A, the system area is followed by retrieval data such as volume descriptor, path table and directory which are followed by actually selected files in the selected order. In FIG. 5, volume descriptor, path table, root directory and child directory arranging the retrieval data are represented by VD, PT, RD and CD, respectively.

It is frequently observed that, as shown in FIG. 5A, all data lengths of selected files do not reach the set maximum data length. The maximum data length of the CD-ROM is generally 670 Mbytes. A time period of the 670 megabytes is about 80 minutes when it is converted into a recording time of audio data according to the ISO9660 standard. The maximum data length of blank disk is set to 666.6 megabytes (74 minutes when converted into a time) by time information ATIP.

Accordingly, if the whole data length including the retrieval data and file groups is 666.6 megabytes or smaller, then recorded data of the CD-ROM can be illegally copied to the CD-R.

Figure 6:
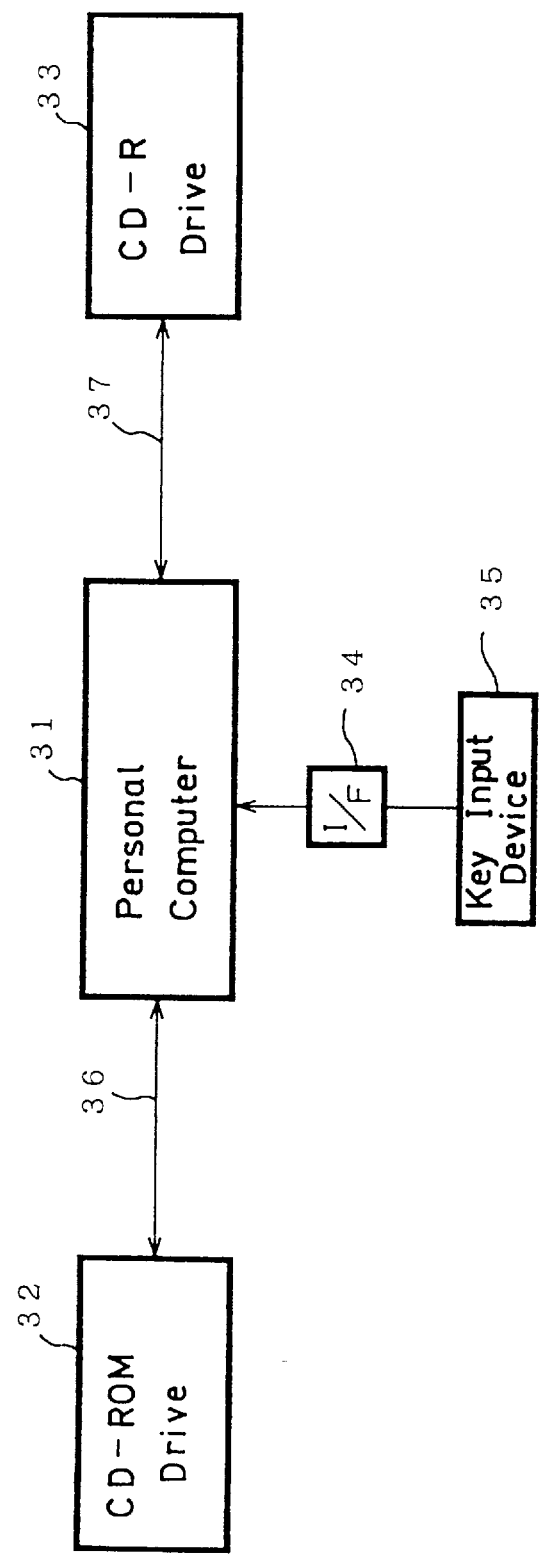
FIG. 6 is a block diagram showing a typical example of a computer system that the user constructs when a disk-copy from the CD-ROM to the blank disk is executed.

Specifically, as shown in FIG. 6, a computer system is arranged by connecting a CD-ROM drive 32 serving as a first external storage device and a CD-R drive 33 serving as a second external storage device of a computer 31 to the computer 31 through SCSIs (Small Computer System Interfaces) 36, 37.

Then, a CD-ROM with edited data is loaded on the CD-ROM drive 32 and a blank disk is loaded onto the CD-R drive 33. Then, if the user designates a command of "DISK-COPY", for example, by use of the key input device 35 such as the keyboard connected to the personal computer 31 through an interface circuit 34 and executes a disk copy from the drive name assigned to the CD-ROM drive to a drive name assigned to the CD-R drive, then recorded data of the CD-ROM loaded on the CD-ROM drive 32 is recorded on the blank disk loaded on the CD-R drive 33 as it is, thereby copying which is often referred to as an illegal copy is easily carried out.

In this data recording apparatus, not only files can be selected but also dummy data can be registered as shown in FIG. 4 (step S103). If an existing area data length obtained when a necessary data length (all data lengths of selected files, etc.) is subtracted from the maximum data length is a predetermined value or greater, then dummy data can be set.

This predetermined value is set to a data length long enough to prevent the data length from becoming the maximum data length or greater when data is shifted by a following rearrangement (see step S104). Such data length is 1.5 LBN (3 kbytes), for example.

The dummy data is started to be set when the set picture of dummy data is displayed on the picture screen of the display means after the selection of file was ended. Then, watching the set picture, the operator sets data length of dummy data to be recorded and determines whether or not the dummy data has invisible attributes. In addition, when the user sets dummy data, the user can set the divided number of dummy data. If the divided number of dummy data is two or greater, then the user sets data lengths of individual dummy data and also determines whether or not each dummy data has invisible attributes.

The invisible attribute is one of file attributes (file attribute), and cannot be checked by a DIR command. Also, the invisible attribute can be neither corrected nor erased.

The recording position of the set dummy data is determined by a random number, so that the dummy data is recorded in the manner where the recording position thereof cannot be known by the operator.

Figure 5B:
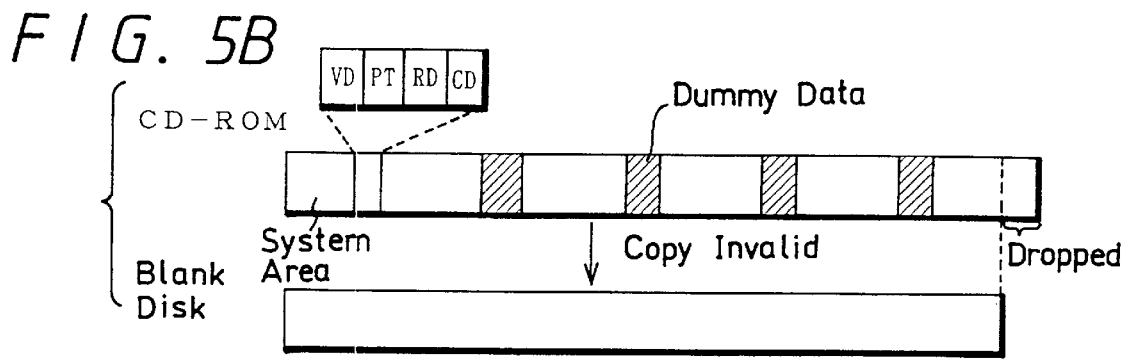

Dummy data are randomly disposed on the recorded positions of the file groups and data are recorded nearly up to the maximum data length (670 Mbytes) as shown in FIG. 5B. Therefore, if the recorded data of this CD-ROM is recorded on the CD-R as it is, then data at the portion exceeding 666.6 megabytes is dropped.

Even when those who skilled in the computer intend to remove dummy data and record only the file on the blank disk, they cannot remove dummy data and record only the file on the blank disk illegally because it is substantially impossible for them to know accurately how many and where dummy data are set. In addition, since the dummy data has invisible attributes, it becomes more difficult for the user to remove dummy data.

Although many illegal copies are made invalid by registration of dummy data, illegal copies are frequently made valid in the following cases.

Figure 5C:
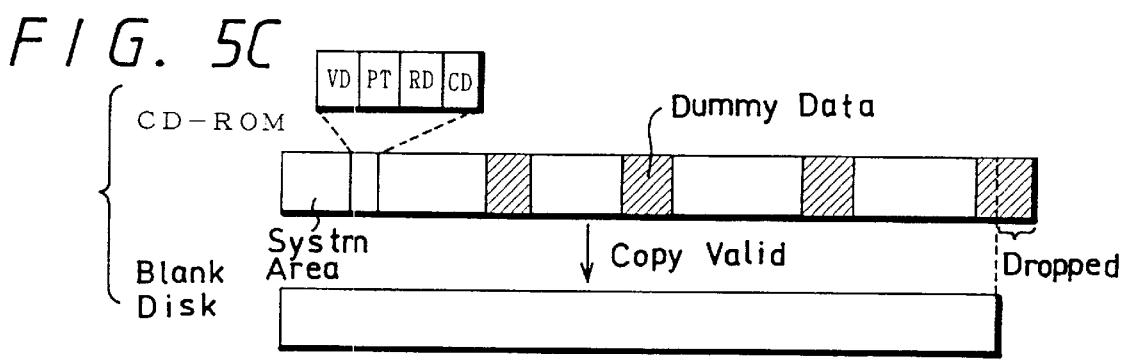

Specifically, since the retrieval data is still recorded on the starting portion, when the dropped portion is dummy data as shown in FIG. 5C, if recorded data of the CD-ROM is copied to the blank disk as it is to make the CD-R, then file groups that were recorded on the CD-R can be read out from the CD-R by ordinary operation, thereby achieving a substantially illegal copy. Therefore, even though dummy data are set as described above, such dummy data is not sufficient to prevent illegal copying.

To solve the above-mentioned problem, the data recording apparatus can shift (rearrange) data of a part of retrieval data by rearrangement as shown at step S104 of FIG. 4. Upon rearrangement, a message in the form of question, e.g., "REARRANGEMENT?" is displayed on the picture screen of the display means. Then, when the operator operates a key indicating rearrangement, e.g., key "Y", the rearrangement is started.

Figure 5D:
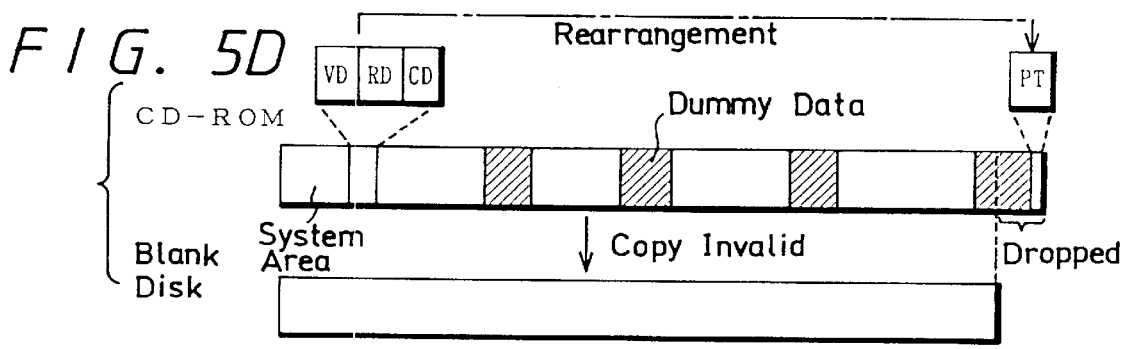

Upon rearrangement, as shown in FIG. 5D, the path table of the retrieval data is shifted to the final position of the recorded data, so that when the recorded data of the CD-ROM is illegally copied to the blank disk, the path table of the retrieval data is dropped constantly. When the illegally-copied CD-R is reproduced, an access time increases, which is not practical. Thus, illegal copying can be substantially prevented.

While the path table is rearranged as described above, the present invention is not limited thereto and the root directory and the child directory may be solely rearranged or combined with the path table and then rearranged.

If the root directory and the child directory are rearranged to the end of the recorded data, then when the CD-ROM is reproduced by the CD-ROM drive, the CD-ROM drive has to frequently seek the CD-ROM between the inner and outer peripheries, thereby requiring extra access time. Therefore, according to this embodiment, in order to prevent the access time from increasing considerably, data that is rearranged to the end of the recorded data is the path table.

If a system controller operation program incorporated in the CD-ROM drive is improved and the data recording apparatus includes a means for storing all of the retrieval data in a memory so that the retrieval data stored in the memory are referred to upon accessing, then it is possible to avoid the access time from increasing considerably. Accordingly, the route directory or the like may be rearranged at the end of the recorded data with similar effects being achieved.

[Specific arrangement of the data recording apparatus according to this embodiment]

A specific example that can realize the operation principle of the data recording apparatus will be described. When the data recording apparatus is described, initially, the computer 1 and the data editing means will be described and then the mastering apparatus will be described. When the computer 1 is described, a variety of interface circuits are not shown and described.

Figure 7:
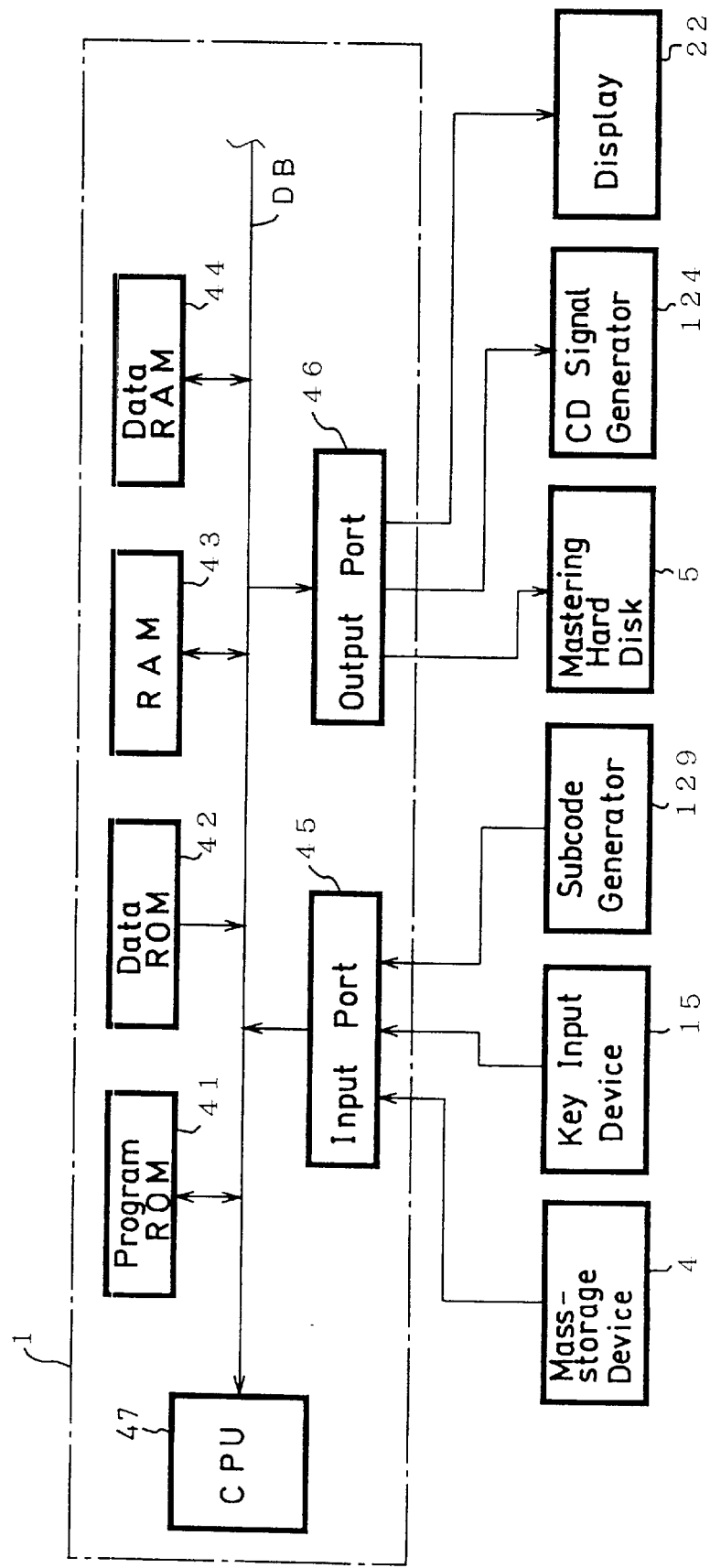
FIG. 7 is a block diagram showing an arrangement of a computer which edits data to be recorded on the CD-ROM.

As shown in FIG. 7, the computer 1 includes a program ROM 41 with a variety of programs stored therein, a data ROM 42 with a variety of fixed data previously registered therein, a RAM 43 used to execute program read out from the program ROM 41, a data RAM 44 with file data from the mass-storage device 4, data entered by the key input device 15 and data processed by various programs stored therein, an input port 45 and an output port 46 for inputting data to and outputting data from the external circuit (mastering hard disk 5, the display device 22, the key input device 15 and the mass-storage device 4, etc.) and a CPU (control apparatus and logical arithmetic unit) 47 for controlling these circuits.

Data are exchanged among the above-mentioned circuits via a data bus DB led out from the CPU 47. The above-mentioned circuits are controlled by the CPU 47 via a control bus and an address bus (both not shown) led out from the CPU 47.

An operation of the computer 1, in particular the operation of the data editing means, will be described with reference to functional block diagrams and flow charts of FIGS. 8 through 22.

Figure 9:
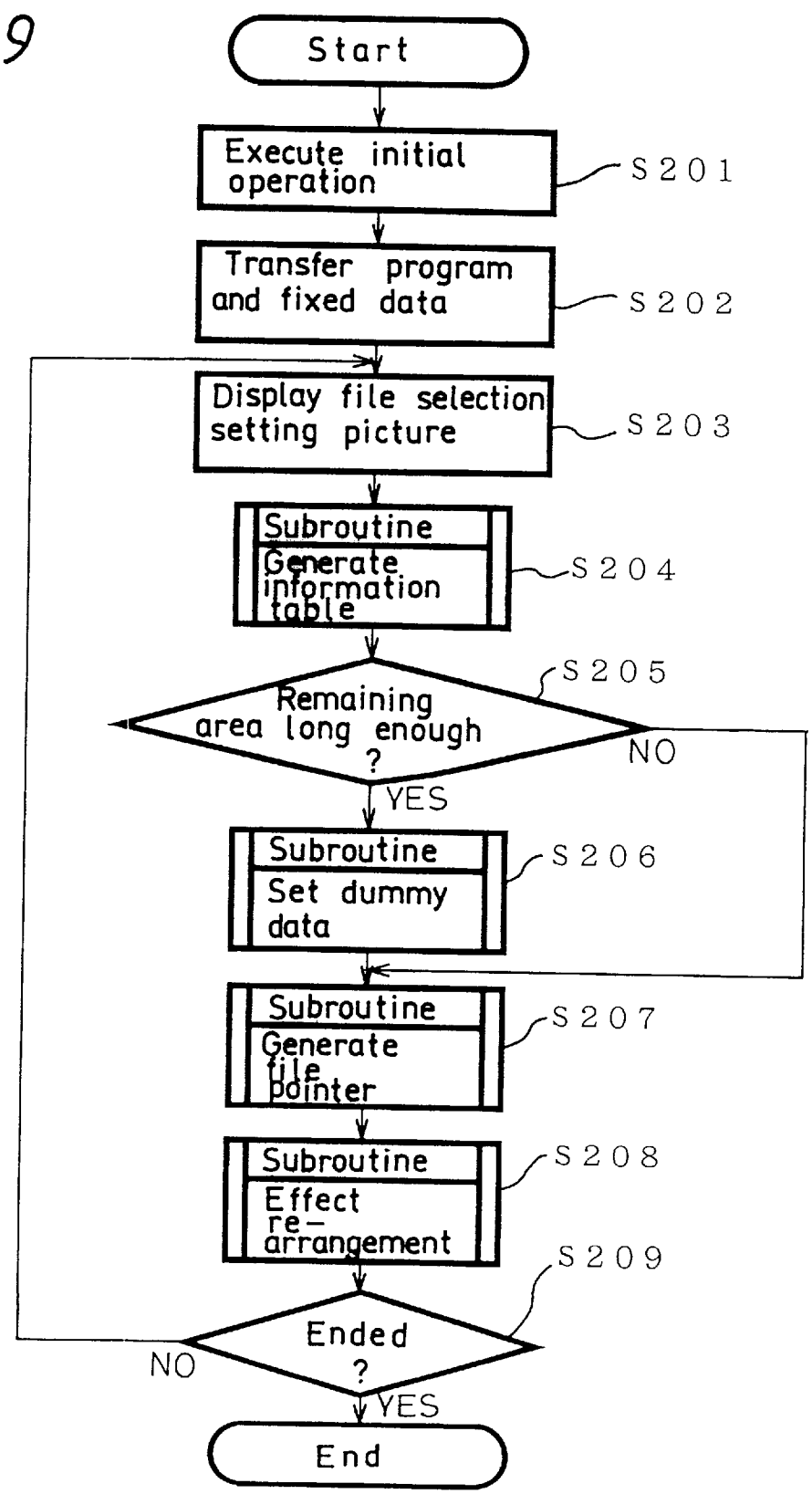
FIG. 9 is a flowchart to which reference will be made in explaining a processing operation of the data edit processing means.

At step S201 shown in FIG. 9, at the same time when the data recording apparatus is powered, an initial operation is carried out, e.g., systems of the computer 1 and the peripheral devices are checked, memories are checked and a setup is carried out.

In the next step S202, data editing means 51 (data editing program: see FIG. 8) is read out from the program ROM 41 and written in the operation RAM 43. At the same time, a work area used to temporarily store data generated when the program is operated and which is used to exchange parameters among routines constructing the above program is allocated into the operation RAM 43.

Moreover, an information table storage region with an information table concerning file groups to be recorded on the CD-ROM, a retrieval data storage region with retrieval data stored therein, a dummy table storage region with a dummy table concerning dummy data stored therein and a fixed data storage region with fixed data (data previously-set in accordance with a specification) from the data ROM 42 stored therein are allocated to the data RAM 44.

In step S202, the above program is transferred and a variety of fixed data are read out from the data ROM 42 and stored in the fixed data storage region.

Figure 8:
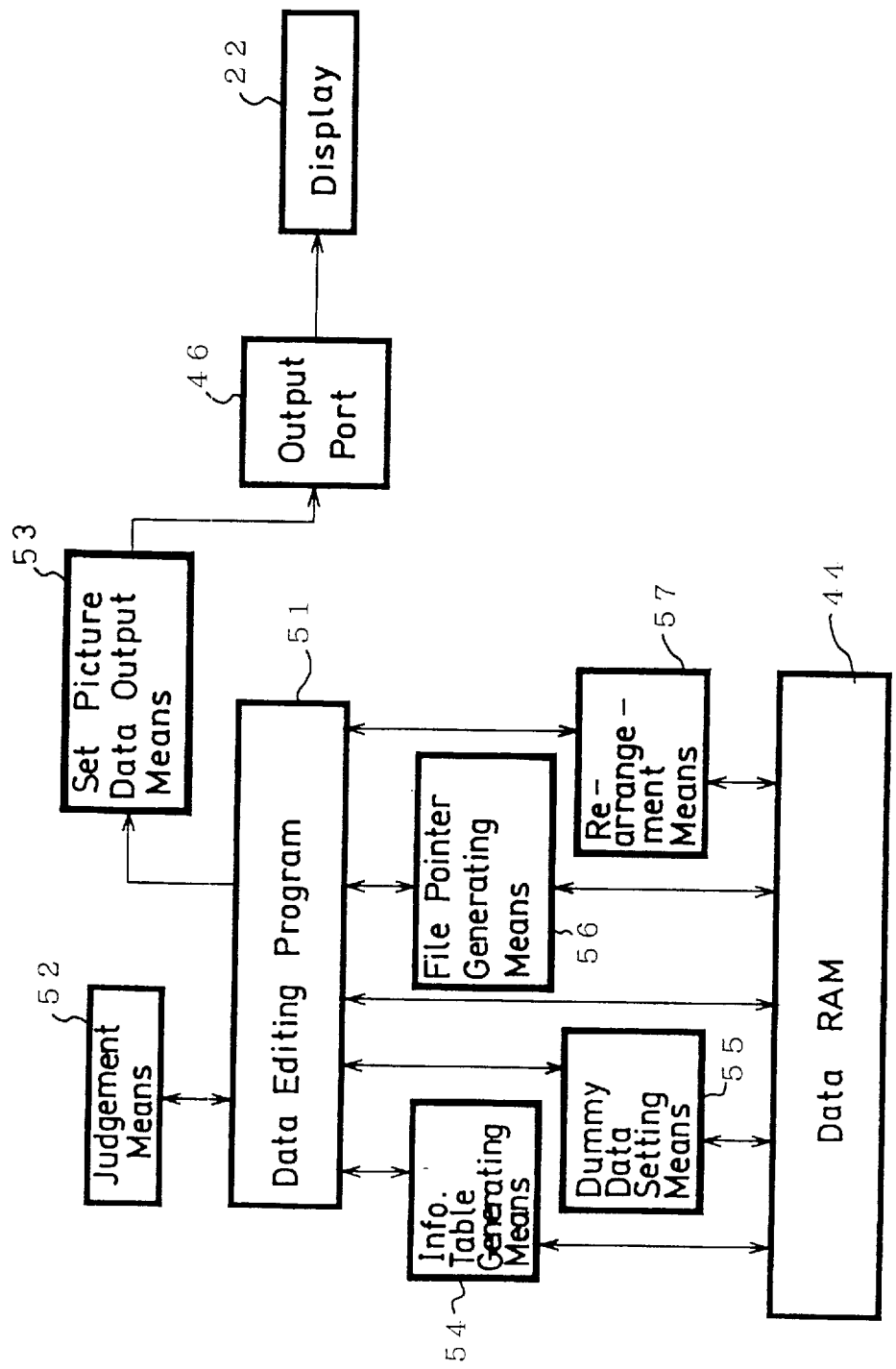
FIG. 8 is a functional block diagram showing a processing operation of a data edit processing means which is one of the elements of a data recording apparatus incorporated in a computer.

As shown in FIG. 8, the data editing program 51 read out to the RAM 43 is composed of a judgement means 52 for effecting a variety of judgement, a set picture data output means 53 for outputting set picture data to the display 22 such that the user can select file groups on the display screen of the display 22, an information table generating means 54 for generating an information table concerning a selected file group, a dummy data setting means 55 for setting dummy data randomly registered in the selected file group, a file pointer generating means 56 for generating a file pointer used to generate the leading LBN of each file of the selected file group and a rearrangement means for rearranging a part of data to be recorded on the CD-ROM.

In step S203 shown in FIG. 9, the data editing program 51 enables the set picture data output means 53 to output file selection setting picture data through the output port 46 to the display 22.

The display 22 displays the file selection setting picture on its screen based on the setting picture data input thereto from the computer 1. On the set picture, the user can easily select files by use of a coordinate input device such as a mouse under the so-called GUI (Graphical User Interface) circumstance where files groups that were registered in the mass-storage device 4 in the data collecting process (see step S1 in FIG. 2) are displayed as icons representing specific symbols. When the user selects the file, the file name or the file number of the selected file is input to the computer 1.

In the next step S204, the processing enters the information table generating means 54 (information table generating subroutine).

Figure 10:
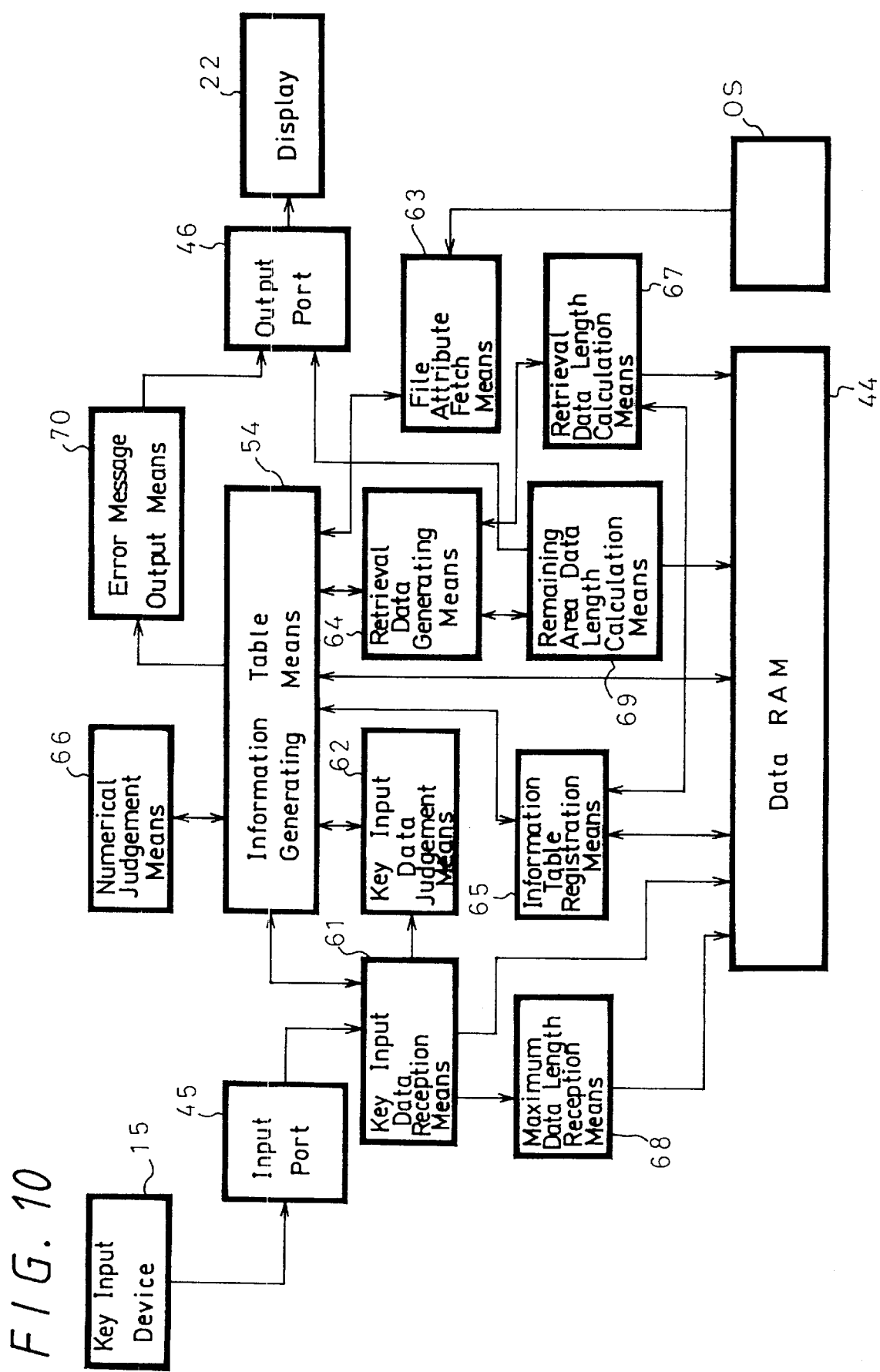
FIG. 10 is a functional block diagram showing a processing operation of an information table generating means which is one of the elements of the data edit processing means.

As shown in FIG. 10, the information table generating means 54 is composed of a key input data receiving means 61 for receiving key input data input thereto from the key input device 15 through the input port 45, a key input data judgement means 62 for judging contents of the key input data, a file attribute fetch means 63 for fetching file attribute data concerning the selected file from a file management table managed by the OS, a retrieval data generating means 64 for generating retrieval data (volume descriptor, path table, route directory and child directory) conforming to the ISO9660 based on the fetched file attribute data, and an information table registration means 65 for generating information tables concerning files sequentially selected in the file selection based on file attributes and registering thus generated information tables on the information table storage region.

The information table generating means 54 further includes a numerical judgement means 66 for judging a variety of numerical values, a retrieval data length calculation means 67 for calculating a whole data length of retrieval data updated each time retrieval data is generated, a maximum data length receiving means 68 for receiving maximum data length data of key input data to be recorded on the CD-ROM, a remaining area data length calculation means 69 for calculating data length of remaining area and an error message output means 70 for outputting error message data to the display 22 through the output port 46 when a file is selected over the data length of the remaining area.

Figure 11:
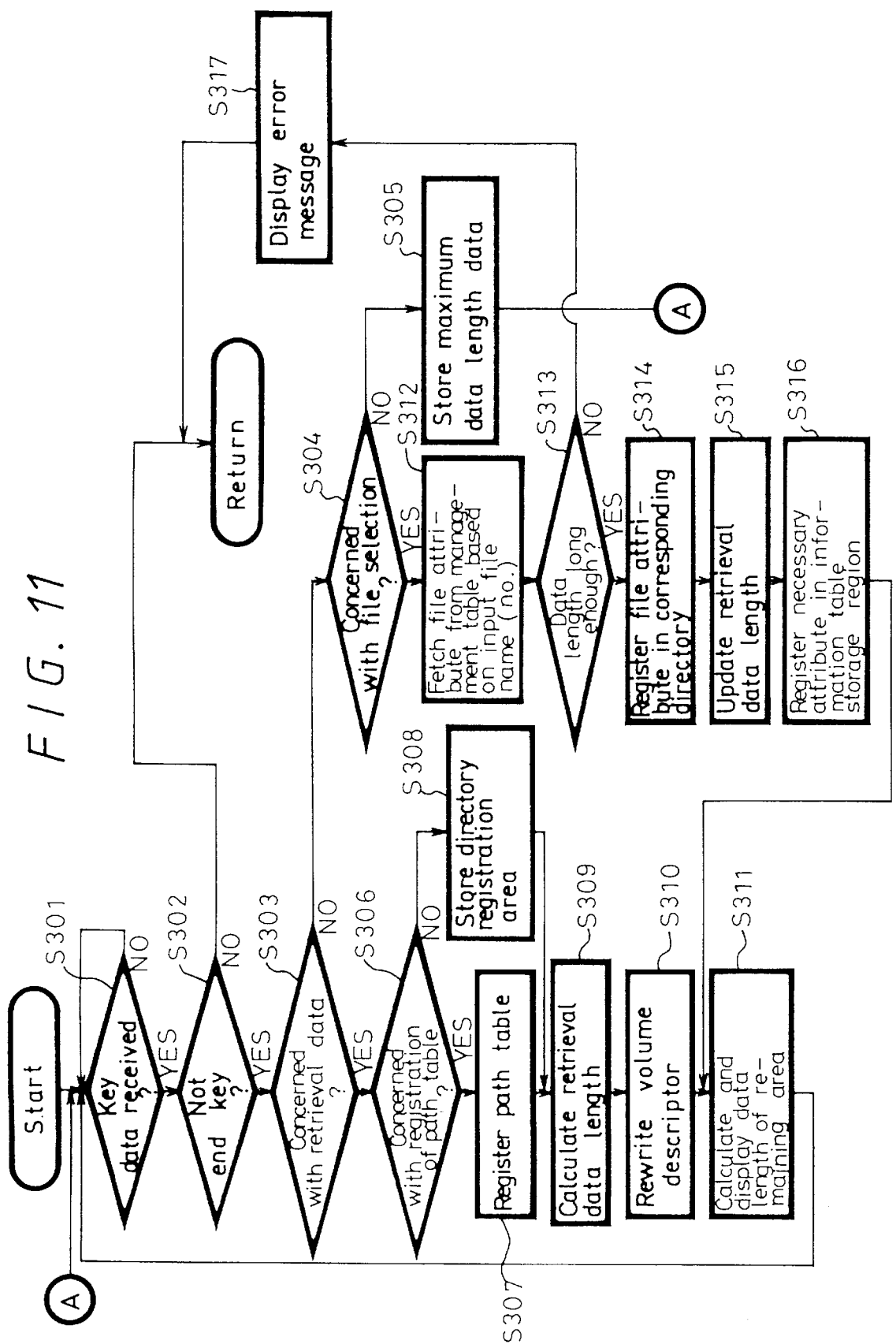
FIG. 11 is a flowchart to which reference will be made in explaining a processing operation of the information table generating means.

In the information table generating means 54 (information table generating subroutine), as shown in FIG. 11, it is determined in decision step S301 by the key input data judgement means 62 whether or not the key input data receiving means 61 receives key input data from the key input device 15. Step S301 is repeated until key input data is received by the key input data receiving means 61, i.e., key input is awaited.

If key input data is inputted through the input port 45 when the user operates the key input device 15, then the key input data is received by the key input data receiving means 61, and the processing proceeds to the next decision step S302.

In the first key input operation, a maximum data length of the data to be recorded on the CD-ROM is inputted and then data concerning retrieval data such as path table and directory are inputted. Thereafter, data (file name and file number) concerning the file to be recorded on the CD-ROM are inputted. Finally, a key (end key) indicating that file selection is ended is operated. Respective steps will be described in accordance with a manner in which the keys are operated.

It is determined at decision step S302 by the key input data judgement means 62 whether or not the content of the key input data is the end key. If the content of the key input data is not the end key, then the processing proceeds to the next decision step S303. It is determined therein by the key input data judgment means 62 whether or not the content of the key input data is concerned with the registration of retrieval data such as path table and directory.

If the content of the key input data is not concerned with the registration of retrieval data, then the processing proceeds to decision step S304. It is determined by the key input data judgement means 62 whether or not the key input data is concerned with file selection.

Since the key input data is data concerning the maximum data length, the processing proceeds to step S305, where the maximum data length data from the key input data receiving means 61 is received by the maximum data length receiving means 68. Then, the processing proceeds again to the step S301 to await the next key input.

If the key input data is concerned with the registration of retrieval data then the processing proceeds to the next decision step S306.

It is determined in step S306 by the key input data judgement means 62 whether or not the key input data is concerned with the registration of path table. If the key input data is concerned with the path table, then the processing proceeds to step S307, where the input path table is registered in the retrieval data storage region of the data RAM 44 by the retrieval data generating means 64.

If the key input data is concerned with the registration of the directory, then the processing proceeds to step S308, where a directory registration area is stored in the retrieval data storage region by the retrieval data generating means 64. This directory is completed by registering the file attribute when a file concerning the directory is selected.

When the registration of path table in step S307 or the storage of directory area in step S308 is ended, the processing proceeds to step S309, where a data length of retrieval data is calculated by the retrieval data length calculation means 67. In this calculation, retrieval data data lengths which increase each time the path table is registered at step S307 or the directory registration area is maintained at step S308 are accumulated and an accumulated value is stored in the predetermined area of the data RAM 44, e.g., retrieval data length storage region.

Then, the processing proceeds to step S310, where the volume descriptor that is registered in the retrieval data storage region when the path table is registered in step S307 and the directory registration area is maintained in step S308 is rewritten by the retrieval data generating means 64.

In step S311, a remaining area (area that can be recorded as recording data) is obtained by subtracting a retrieval data length or a data length which increases in step S307 or S308 from the maximum data length by the remaining area data length calculation means 69. A resultant data length is used as a data length of remaining area. In step S311, the data length data of the remaining area is outputted through the output port 46 to the display 22 by the remaining area data length calculation means 69. The display 22 displays on its picture screen the data length data of the remaining area supplied thereto from the computer 1.

If on the other hand the key input data is concerned with the file selection, then the processing proceeds to step S312 through steps S303 and S304. At that time, the directory name, the directory number, the file name or the file number input at the same time the file is selected is received by the key input data receiving means 61.

In step S312, the file attribute fetch means 63 fetches the file attribute concerning the file from the file management table managed by the OS based on the file name or the file number received by the key input data receiving means 61. The file attribute is the starting logical address in the storage area of the mass-storage device 4 with the file stored therein and information concerning data length and copy protect such as invisible attributes, etc.

It is determined in the step S313 by the numerical judgement means 66 whether or not the remaining area has a data length long enough to cover the selected file. In other words, it is determined by the numerical judgement means whether or not the data length of the selected file is the remaining area data length or shorter. If the data length of the selected file is less than the remaining area data length, then it is determined that the file can be registered. Then, the processing proceeds to step S314, where the file attribute of the selected file is registered in the retrieval data storage region at its directory area corresponding to the input directory name or directory number in accordance with the specification of the ISO9660.

Then, in step S315, the retrieval data length is updated by accumulating data length increased when the file attribute is registered in the directory to the retrieval data length by the retrieval data length calculation means 67.

In the next step S316, of the attributes concerning the selected file, a necessary attribute is registered in the information table storage region by the information table registration means 65.

The arrangement of the information table will be described with reference to FIG. 21. As illustrated, the information table is composed of a number of records. A corresponding directory name or directory number is stored in the first record. A file name or file number of the corresponding file is stored in the second record. A leading logical address of the mass-storage device 4 with the corresponding file stored therein is stored in the third record. Then, recording time data of the corresponding file is stored in the fourth record as LBN (referred to hereinafter as "available LBN" because LBN in this case indicates a recording time of file). A manner in which the available LBN is obtained from the recording time data has already been described.

Referring back to the flowchart of FIG. 11, when the registration of the information table at step S316 is ended, then the processing proceeds to step S311, where the data length of the present remaining area is calculated by the remaining area data length calculation means 69. In this case, a remaining area data length is obtained by subtracting from the data length data of the present remaining area the data length increased when the file is registered in the directory in step S314 and the data length of the selected file. The resultant data length data is outputted through the output port 46 to the display 22. The display 22 displays the remaining area data length data supplied thereto from the computer 1 on a predetermined position of its picture screen.

If it is determined in the step S313 that the remaining area does not have the data length long enough to register the selected file, then the processing proceeds to step S317, where error message data indicating "UNABLE TO SELECT FILES ANY MORE" is outputted through the output port 46 to the display 22 by the error message output means 70. The display 22 displays the error message at its predetermined position based on the error message data inputted thereto from the computer 1. Therefore, the user becomes able to easily visually confirm that the user will not be able to select files any more.

Then, when the user operates the end key after the file selection has been ended, this information table generating means (information table generating subroutine) 54 is ended through the step S302.

The processing returns to the main routine shown in FIG. 9. It is determined in S205 by the judgement means 52 whether or not the remaining area data length is long enough to register dummy data and data to be rearranged. In other words, it is determined whether or not the remaining area data length is a predetermined value or greater, e.g., longer than data length (in this case, 3 kbytes) of 1.5 LBN.

If the remaining area data length is 3 kbytes or larger, then the processing proceeds to the next step S106 and enters the dummy data setting means 55 (dummy data setting subroutine).

Figure 12:
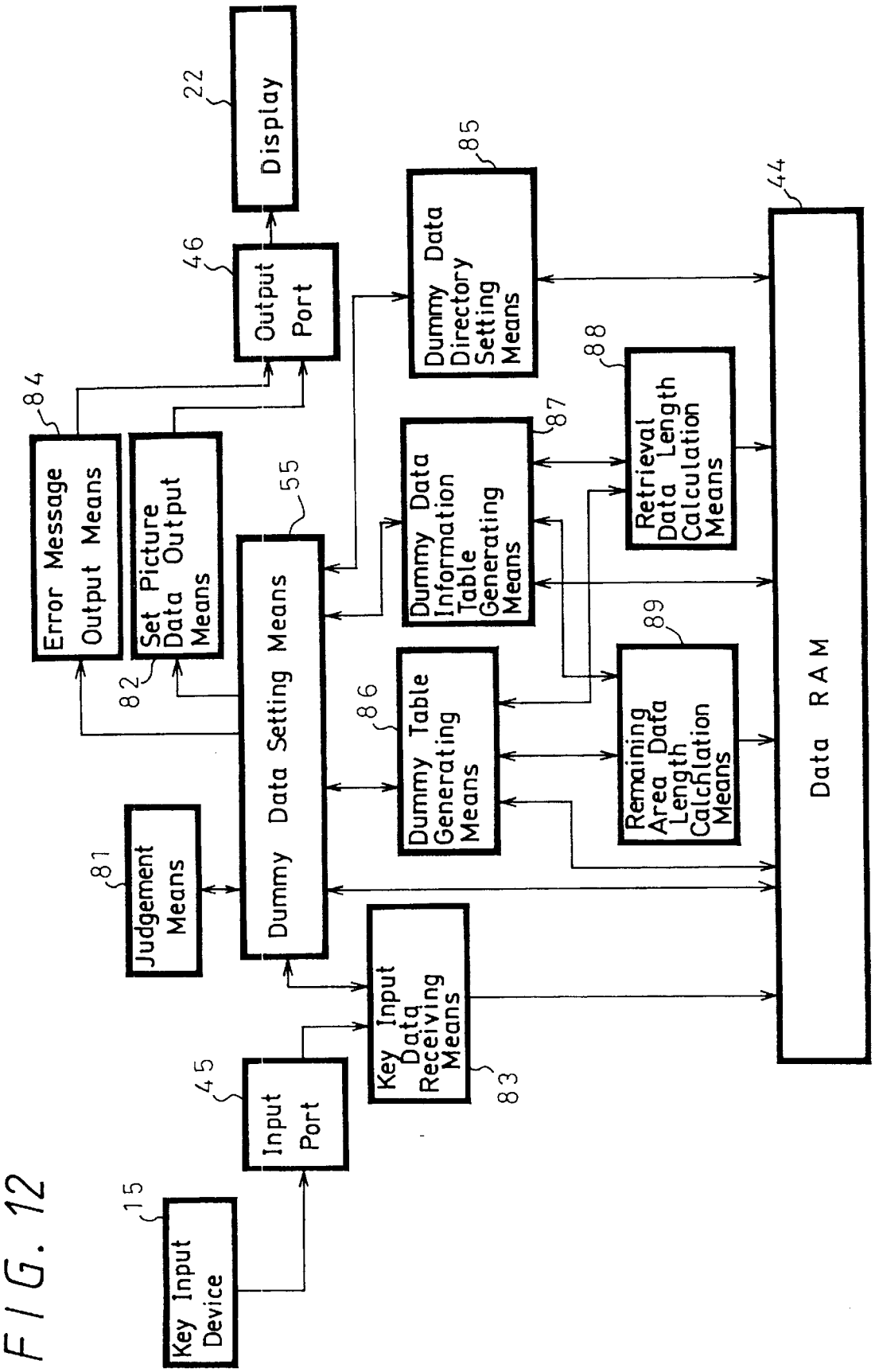
FIG. 12 is a functional block diagram showing a processing operation of a dummy data setting means which is one of the elements of the data edit processing means.

As shown in FIG. 12, the dummy data setting means 55 comprises a judgement means 81 for effecting a variety of judgement, a set picture data output means 82 for outputting set picture data to the display 22 so that the user can set dummy data on the display screen, a key input data receiving means 83 for receiving key input data input thereto from the key input device 15 through the input port 45, an error message output means 84 for outputting error message data through the output port 46 to the display 22 when the input divided number is not proper, a dummy data directory setting means 85 for setting a dummy data directory in the retrieval data, a dummy table generating means 86 for generating a dummy table based on a dummy data setting attribute, a dummy data information table generating means 87 for registering a dummy data attribute in the information table, a retrieval data length calculation means 88 for calculating a whole data length of retrieval data updated when the dummy data directory is set, and a remaining area data length calculation means 89 for calculating data lengths of remaining areas sequentially consumed each time dummy data is set.

Figure 13:
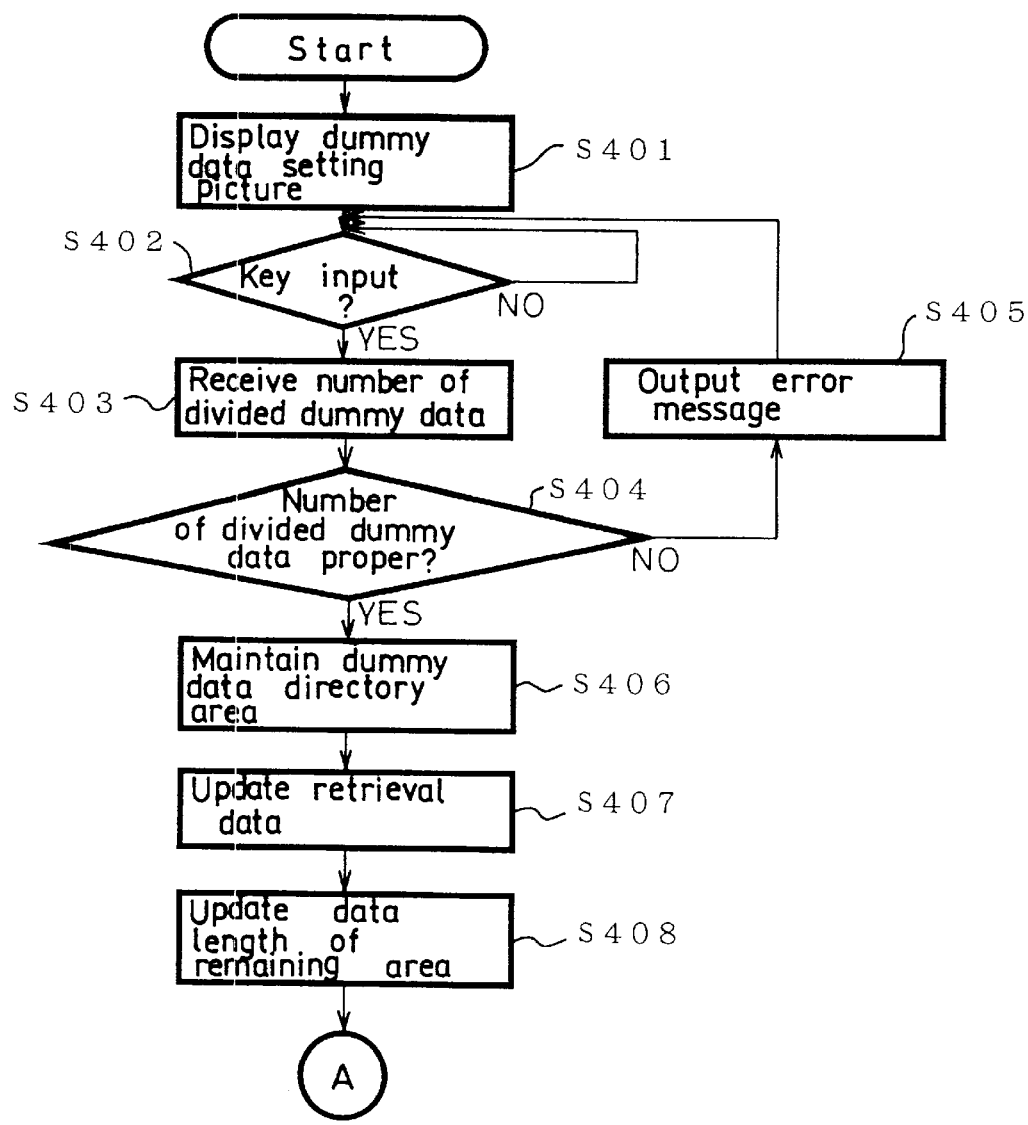
FIG. 13 is a flowchart (No. 1) to which reference will be made in explaining a processing operation of the dummy data setting means.

In the dummy data setting means 55 (dummy data setting subroutine), as shown in FIG. 13, at step S401, set picture data for setting dummy data is outputted from the setting picture data output means 82 through the output port 46 to the display 22.

The display 22 displays the dummy data setting picture on its picture screen based on the set picture data input thereto from the computer 1. On the set picture, there can be displayed the number of divided dummy data, a recording time of each divided dummy data and the setting of invisible attributes, etc.

In the next step S402, it is determined by the judgement means 81 whether or not key input data from the key input device 15 is received by the key input data receiving means 83. The step S402 is repeated until the key input data is entered, i.e., the apparatus awaits the key input data.

If the key input data is inputted through the input port 45 when the user operates the key input device 15, then the input key data is received by the key input data receiving means 83. Then, the processing proceeds to step S403.

Since the number of divided dummy data is inputted when the key is operated first, in step S403, entered key input data is received as the number of divided dummy data and is stored in the divided number storage region of the data RAM 44.

Then, the processing proceeds to the next step S404, where it is determined by the judgement means 81 whether or not the number of the divided dummy data is proper. In other words, it is determined whether or not a value (number of dummy data that can be divided) which results from dividing the remaining area data length by 1 LBN (2 kbytes) is greater than the input number of divided dummy data. If the number of the divided dummy data is greater than the number of dummy data that can be divided, then the number of the divided dummy data is regarded as improper and the processing proceeds to step S405, where an error message data indicating "NUMBER IS NOT PROPER AND ENTER CORRECT NUMBER" is outputted from the error message output means 84 through the output port 46 to the display 22. The display 22 displays the above error message on its predetermined position based on the error message data input thereto from the computer 1. Therefore, the user can easily visually confirm that the input number of divided dummy data is not proper.

If the number of divided dummy data is greater than the number of dummy data that can be divided and the number of divided dummy data is proper at decision step S404, then the processing proceeds to step S406. In step S406, the dummy data directory setting means 85 maintains the area with a directory concerning dummy data registered therein in the retrieval data storage region. When the setting of dummy data concerning the directory is finished, this directory is completed by registering an attribute concerning the dummy data.

In the next step S407, a data length of retrieval data is calculated by the retrieval data length calculation means 88. In this calculation, data lengths of retrieval data which increase when the area with the dummy data directory registered therein at step S406 are accumulated and an accumulated value is stored in the retrieval data length storage region of the data RAM 44.

In the next step S408, the remaining area data length calculation means 89 subtracts the data length maintained at step S406 from the present remaining area data length to provide a next remaining area data length.

Figure 14:
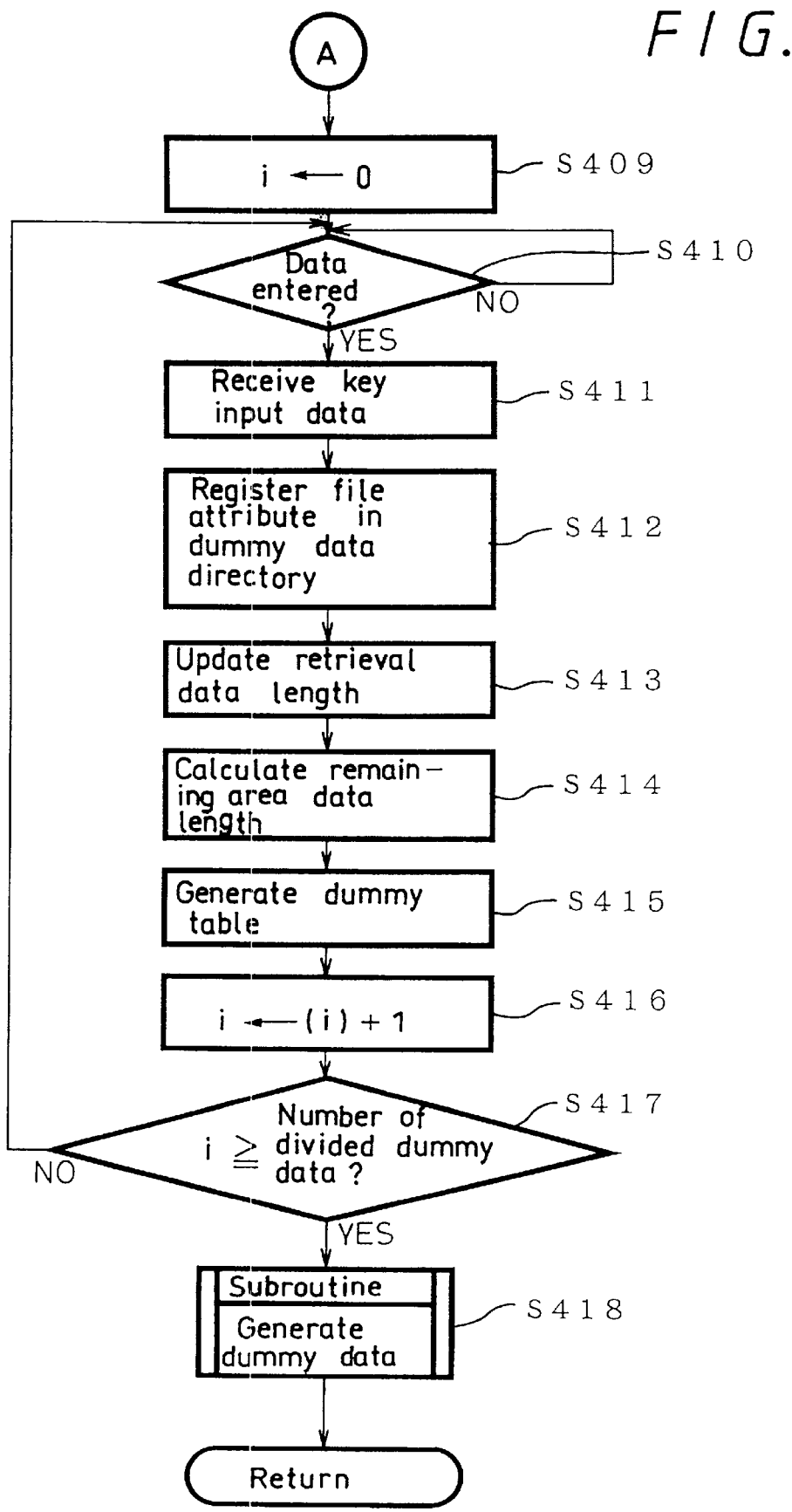
FIG. 14 is a flowchart (No. 2) to which reference will be made in explaining a processing operation of the dummy data setting means.

Then, in step S409 shown in FIG. 14, an initial value "O" is stored in an index register i (register declared as register i of a variety of registers used in the data editing program).

It is determined in the next step 410 whether or not data is entered by operating the keyboard. If data is inputted by operating the key input device 15, then the processing proceeds to step S311, where the key input data receiving means 83 receives recording time data of (value of index register i+1) th dummy data and setting data concerning invisible attribute.

In the next step S312, the dummy data directory setting means 85 registers the recording time data input thereto and the setting data concerning the invisible attribute in the dummy data directory maintained at step S406 in accordance with the specification of the ISO9660.

In step S413, the retrieval data length calculation means 88 accumulates data length which increase when the data are registered in the directory to the retrieval data length to update the retrieval data length.

In step S414, the remaining area data length calculation means 89 subtracts the data length which increased when the data are registered in the directory from the data length of the present remaining area to provide the next remaining area data length.

In step S415, the dummy table generating means 86 registers the setting data concerning the dummy data in the dummy table storage region of the data RAM 44. As shown in FIG. 22, the dummy table formed in the dummy table storage region includes the records the number of which corresponds to the number of divided dummy data. Each record is of the arrangement that recording time data is stored as the available LBN. In this case, the dummy data recording time data is stored in the record address (hereinafter simply referred to as "i address") indicated by the value of the index register i of the dummy table as the available LBN.

In the next step S416, the index register i is updated +1. Then, the processing proceeds to the next step S417, where it is determined by the judgement means 81 whether or not the setting of dummy data corresponding to the number of divided dummy data is ended. In other words, it is determined whether or not the value of the index register i becomes greater than the number of divided dummy data. If the value of the index register i is less than the number of divided dummy data, then the processing returns to the step S410, where step S410 and the following steps are repeated, i.e., the key input data concerning the next dummy data is registered in the dummy data directory to update the retrieval data length and the recording time data of the dummy table is stored in the corresponding record address as the available LBN.

If the value of the index register i becomes greater than the number of the divided dummy data, then the processing proceeds to the next step S418 and enters the dummy data information table generating means 87 (dummy data information table generating subroutine).

Figure 15:
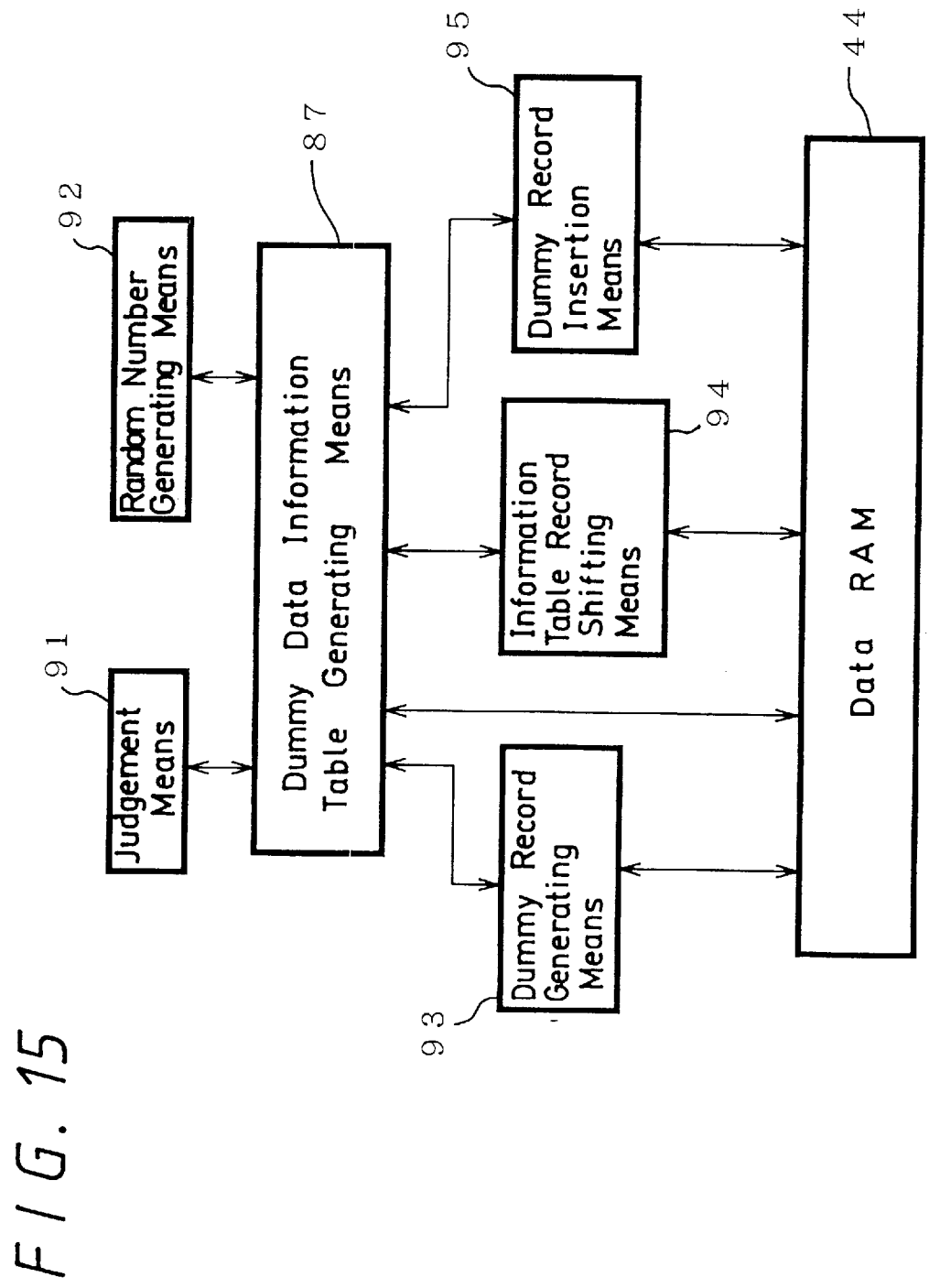
FIG. 15 is a functional block diagram showing a processing operation of a dummy data information table generating means which is one of the elements of the dummy data setting means.

As shown in FIG. 15, the dummy data information table generating means 87 comprises a judgment means 91 for effecting a variety of judgments, a random number generating means 92 for generating a point with dummy data inserted thereto as a random number, a dummy record generating means 93 for generating a record for dummy data in records arranging the information table, an information table record shifting means 94 for shifting the information table behind the corresponding record in order to register the dummy data record generated by the dummy record generating means 93 in the information table, and a dummy record insertion means 95 for inserting the thus generated dummy data record into the information table.

Figure 16:
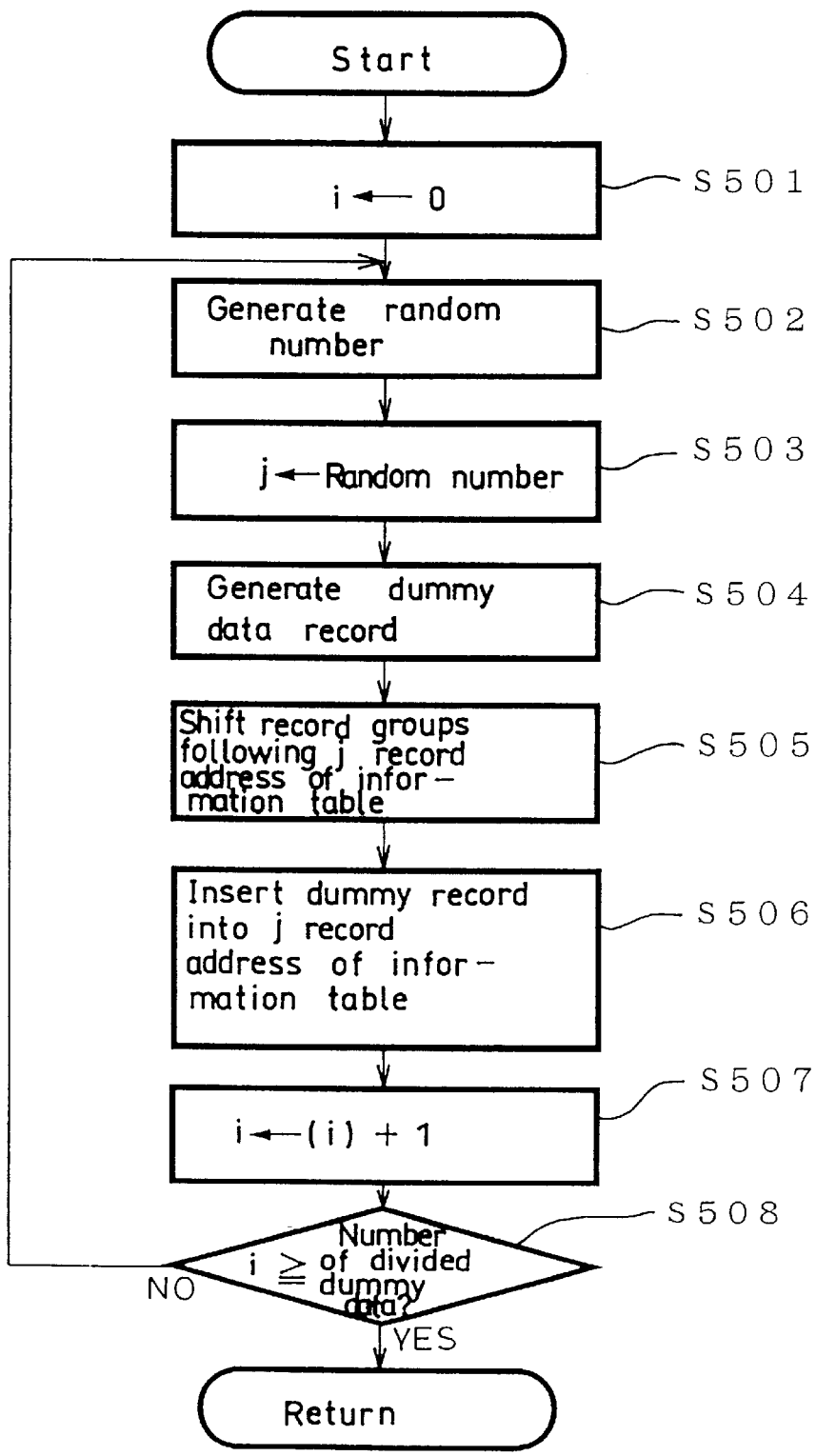
FIG. 16 is a flowchart to which reference will be made in explaining a processing operation of the dummy data information table generating means.

In the dummy data information table generating means 87, at step S501 shown in FIG. 16, the initial value "O" is stored in the index register i. Then, the processing proceeds to step S502 where the random number generating means 92 generates a random number. The random number generating means 92 generates random numbers in a range of from 0 to the maximum value +1 where the maximum record number of the presently-registered information table is assumed to be a maximum value.

In the next step S503, a random number generated by the random number generating means 92 is stored in the index register j (register declared as the index register j of a variety of registers used in this data editing program).

In the next step S404, the dummy record generating means 93 generates dummy data records of records constructing the information table. In this case, a region (referred to as a "dummy record storage region") with one dummy data record stored therein is maintained in a predetermined region of the data RAM 44. Then, in accordance with the one record storage format of the information table shown in FIG. 21, necessary data are stored in the dummy record storage regions.

To be more concrete, a directory name or directory number corresponding to dummy data is stored in the leading region of the dummy record storage region, where the code data is indicative of the dummy data, e.g., "FFFF" is stored in the region with the next file name or file name stored therein and a region with the next leading logical address stored therein, and the available LBN stored in i record address of the dummy table is stored in the region with recording time data stored therein as the available LBN. Thus, there is formed an information table record (i.e., dummy record) concerning (i+1)th dummy data.

In the next step S505, the information table record shifting means 94 shifts record groups following the record address (hereinafter simply referred to as a "j record address") indicated by the index register j of information table by an amount of one record to maintain an area large enough to store the dummy record of the j record address of the information table.

In the next step S506, the dummy record insertion means 95 inserts the dummy record into the j record address of the information table, i.e., the dummy record concerning (i+1)th dummy data is registered in the information table.

In step S507, the index register i is updated by +1 and the processing proceeds to the next decision step S508. It is determined in step S508 whether or not the registration of dummy records concerning all dummy data is ended. In other words, it is determined whether or not the value of the index register i becomes greater than the number of divided dummy data. If the value of the index register i is less than the number of divided dummy data as represented by a NO at decision step S508, then the processing returns to step S502, wherein step S502 and the following steps are repeated. Therefore, with respect to the next dummy data, the record to be registered on the information table is obtained by a random number and the dummy data record (dummy record) is registered in the record address indicated by this random number.

If the value of the index register i becomes greater than the number of divided dummy data, then the dummy data information table generating means 87 (dummy data information table generating subroutine) is ended.

The processing returns to the dummy data setting means 55 (dummy data setting subroutine) shown in FIG. 14. Then, when the processing in the dummy data information table generating means 87 is ended, this dummy data setting subroutine also is ended.

Then, the processing returns to the main routine shown in FIG. 9. When the dummy data setting is finished at step S206 or if it is determined in step S205 that the remaining area data length is less than the predetermined value, then the processing proceeds to step S207 and enters the file pointer generating means 56 (file pointer generating subroutine).

Figure 17:
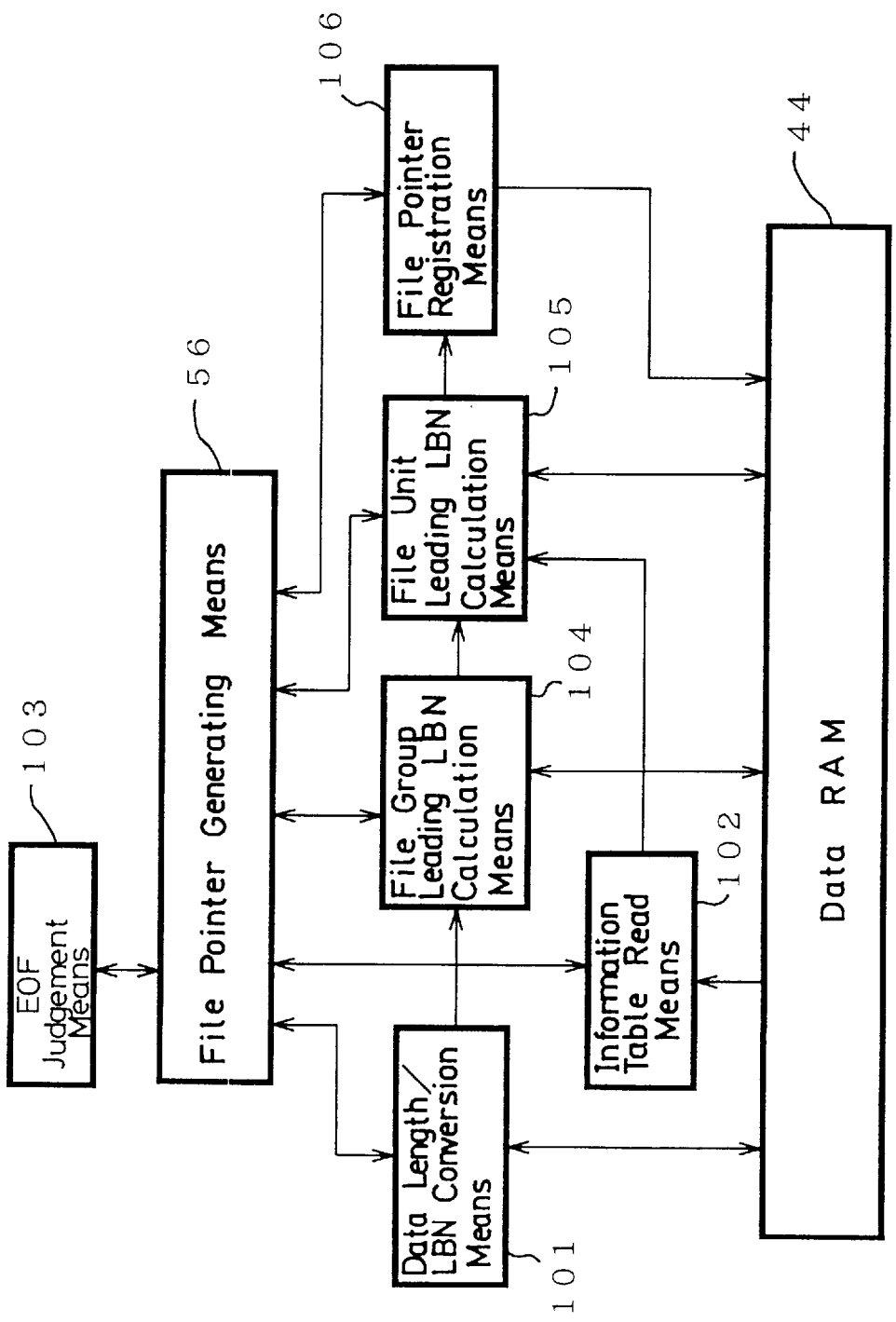
FIG. 17 is a functional block diagram showing a processing operation of a file pointer forming means which is one of the elements of the data edit processing means.

As shown in FIG. 17, the file pointer generating means 56 comprises a data length/LBN conversion means 103 for converting a decided retrieval data length into the available LBN, an information table read means 103 for reading the contents of information table in the record unit, an EOF (end of file) judgement means for determining whether or not all records in the information table are read out, a file group leading LBN calculation means 104 for calculating a leading LBN at which file groups are recorded on the CD-ROM, a file unit leading LBN calculation means 105 for calculating respective leading LBNs where files are recorded on the CD-ROM and a file pointer registration means 106 for registering the leading LBN obtained by the file unit leading LBN calculation means 105 in the corresponding directory.

Figure 18:
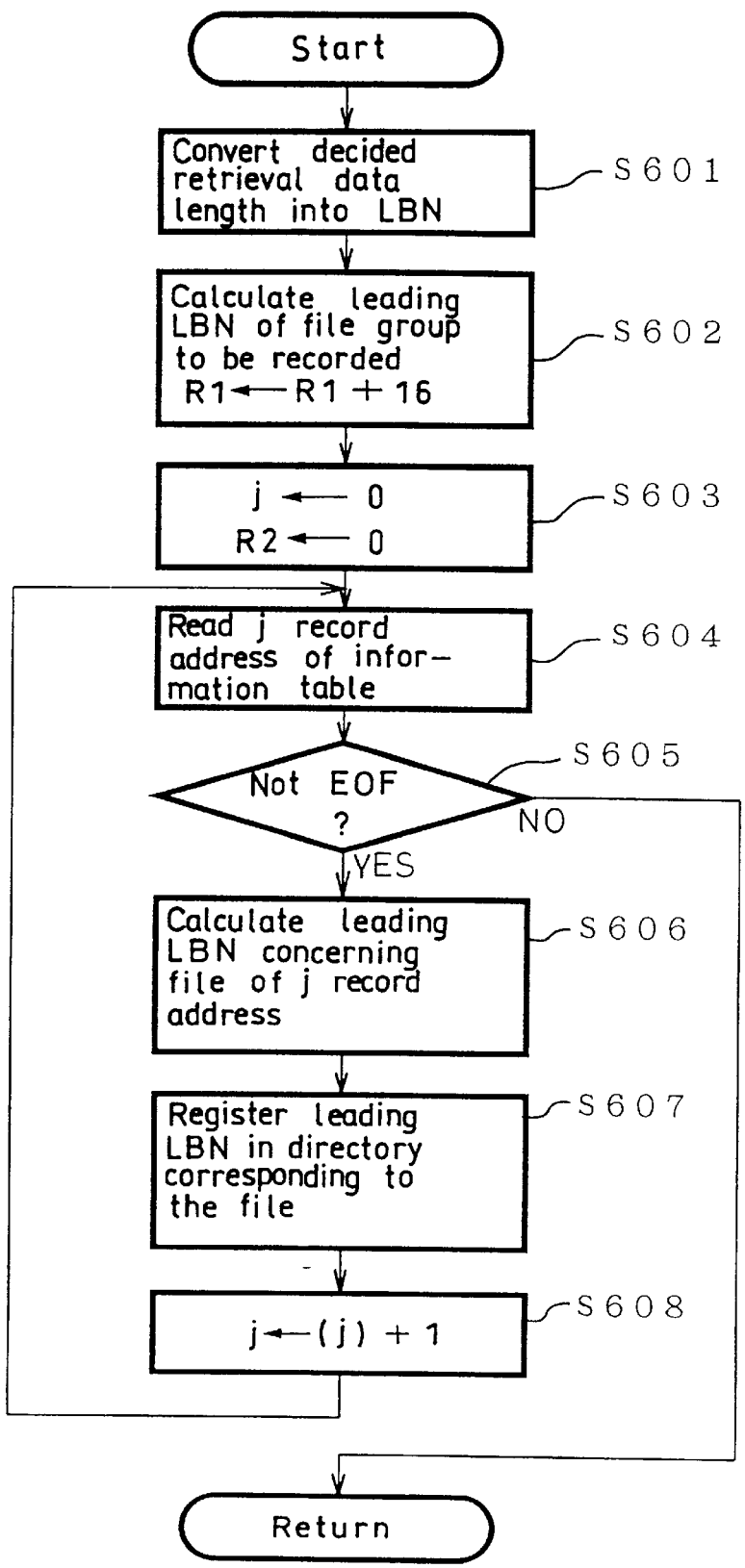
FIG. 18 is a flowchart to which reference will be made in explaining a processing operation of the file pointer forming means.

In the file pointer generating means 56, as shown in FIG. 18, at step S601, the data length/LBN conversion means 101 converts the decided retrieval data length stored in the retrieval data length storage region into the available LBN. To be more concrete, the data length is divided by 1 LBN (2kbytes) and then the available LBN of the retrieval data length is obtained by raising decimals. The resultant available LBN is stored in a first register R1 (register declared as the first work register R1 of various registers used in the data editing program).

In the next step S602, the file group leading LBN calculation mean 104 calculates the leading LBN of the file group to be recorded on the CD-ROM. Specifically, "16" which is the leading LBN of the retrieval data is added to the value of the first register R1 and the added value is stored again in the first register R1.

In step S603, the initial value "0" is stored in the index register j and in a second register R2 (register declared as a second work register R2 of various registers used in the data editing program).

In step S604, the information table reading means 102 reads j record address of the information table.

It is determined at the next step S605 by the EOF judgement means 103 whether or not the content of the j record address thus read out is the EOF (end of file). If the content of the j record address is not the EOF, then the processing proceeds to step S606, where the file unit LBN calculation means 105 calculates the leading LBN concerning the file registered on the j record address.

Specifically, the value of the first register R1 and the value of the second register R2 are added and then the added value is stored again in the first register R1. Thereafter, the available LBN that was registered in the j record address is read out and stored in the second register R2. The value stored in the second register R2 is used to obtain the leading LBN of the file registered in the next record.

In the next step S607, the file pointer registration means 106 registers the leading LBN (value stored in the first register R1) of the file obtained by the file unit leading LDN calculation means 105 in the corresponding directory of the retrieval data developed in the retrieval data storage region. The corresponding directory is retrieved based on the directory name or the directory number stored in the starting portion of the j record address thus read out.

Then, the index register j is updated by +1 in step S608 and the processing returns to the step S604, whereafter the step S604 and the following steps are repeated. That is, the leading LBN concerning the file registered on the next record of the information table is obtained and registered in the corresponding directory.

Since it is determined in step S605 that the content of the record address is EOF after repeating the loop processing (composed of step S604 to step S608) times corresponding to the number of records registered on the information table, when the EOF is judged, the file pointer generating means 56 (file pointer generating subroutine) is ended.

With the processing executed by the file pointer generating means 56, the leading LBNs concerning the selected file and dummy data registered on the information table on the CD-ROM are registered on the corresponding directories, respectively.

The processing returns to the main routine in FIG. 9. In step S208, the processing enters the rearrangement means 57 (rearrangement subroutine).

Figure 19:
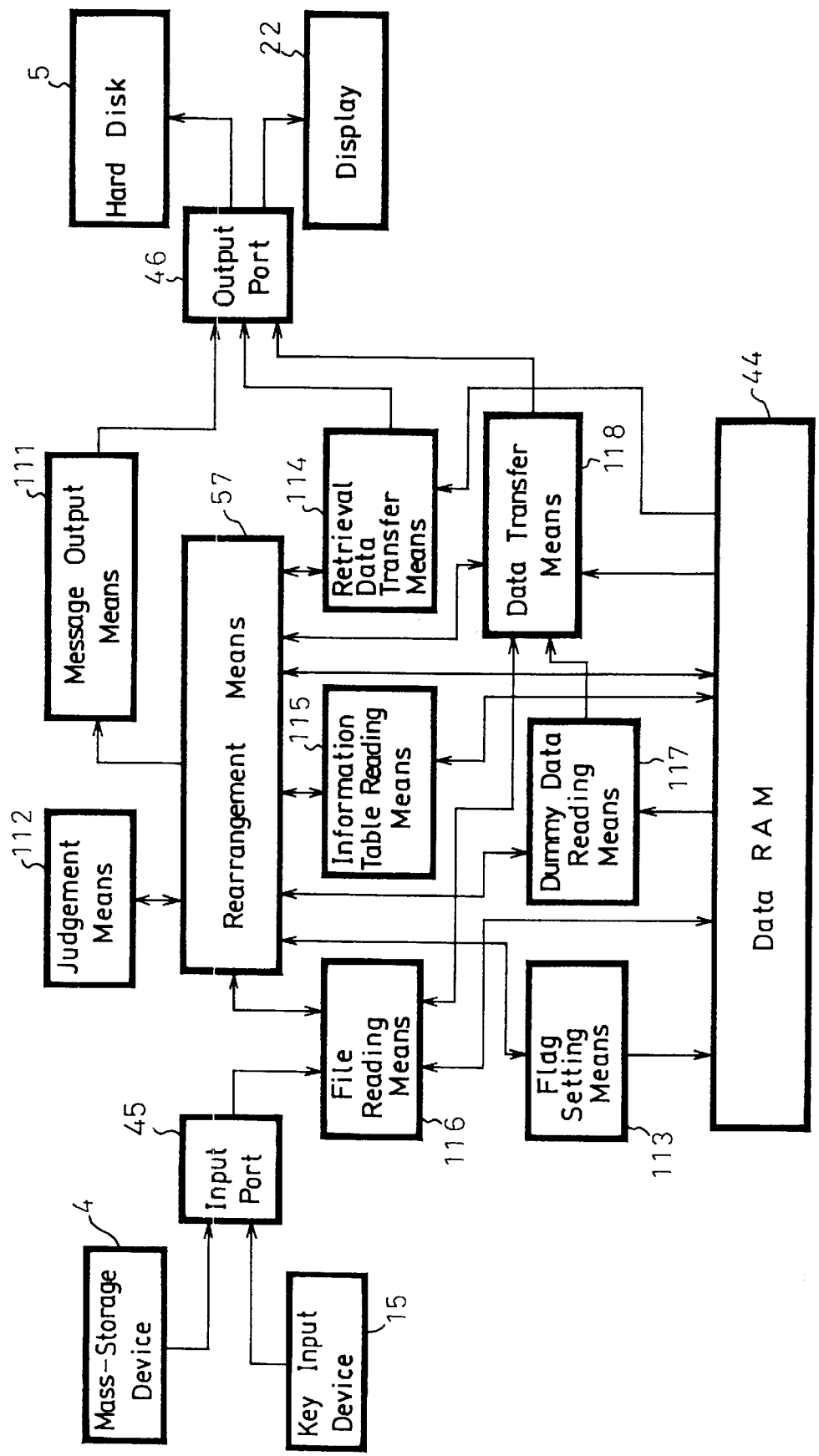
FIG. 19 is a functional block diagram showing a processing operation of a rearrangement processing means which is one of the elements of the data edit processing means.

As shown in FIG. 19, the rearrangement means 57 is composed of a message output means 111 for outputting message data to the display 22 in order to enable the display 22 to display on its picture screen a message in the form of questions for rearrangement, a judgement means 112 for executing a variety of judgements, a flag setting means 113 for setting an information flag (rearrangement flag) indicating a rearrangement request when a rearrangement request is issued, a retrieval data transfer means 114 for transferring the retrieval data stored in the retrieval data storage region to the mastering hard disk 5, an information table reading means 115 for reading the content, of the information table at the record unit, a file reading means 116 for reading the file registered in the information table from the mass-storage device 4, a dummy data reading means 117 for reading dummy data developed in the fixed data storage region of the data RAM 44 by an amount of a predetermined LBN, and a data transfer means 118 for transferring the file read out by the file reading means 116 or dummy data read out by the dummy data reading means 117 to the mastering hard disk 5.

Figure 20:
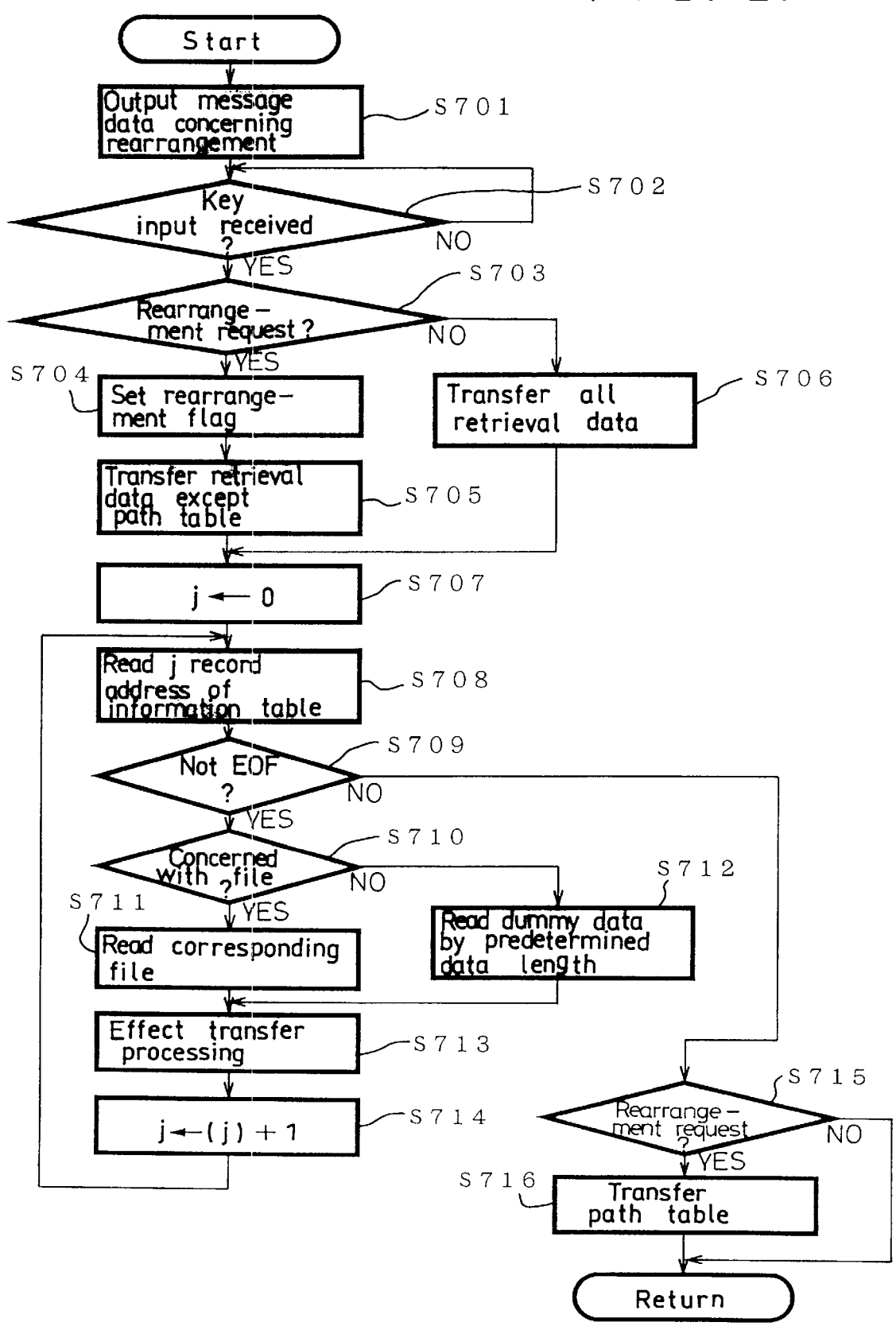
FIG. 20 is a flowchart to which reference will be made in explaining a processing operation of the rearrangement processing means.

In the rearrangement means 57, as shown in FIG. 20, at step S701, the message output means 111 outputs message data in the form of a question for rearranging data (path table in this example) through the output port 46 to the display 22. The display 22 displays a message of "REARRANGE PATH TABLE?", for example, on a predetermined position of the picture screen based on the message data input thereto from the computer 1.

It is determined in the next decision step S702 by the judgement means 112 whether or not data input by the key input device 15 is received. The step S702 is repeated until the data input by the key input device 15 is received, i.e., the apparatus is placed in the standby mode for awaiting input data.

The operator enters a key input for rearranging the path table (e.g., operate key "Y") when the operator intends to inhibit the CD-ROM from being illegally copied to the CD-R. When the operator allows the CD-ROM to be copied to the CD-R, the operator enters a key input so as not to rearrange the path table (e.g., operate key "N").

Then, it is determined in the next step S703 by the judgement means 112 whether or not the content of key input data is a rearrangement request. If the operator operates the key "Y" to enter key input data indicating the rearrangement request, then the processing proceeds to step S704, where the flag setting means 113 sets the rearrangement flag.

In step S705, the retrieval data transfer means 114 transfers, of retrieval data stored in the retrieval data storage region, retrieval data except the path table, i.e., volume descriptor, root directory and child directory through the output port 46 to the mastering hard disk 5.

If on the other hand the operator enters key input data (key input data entered by operating the key "N") indicating that the content of the key input data is not the rearrangement request, then the processing proceeds to step S706, where the retrieval data transfer means 114 transfers all retrieval data stored in the retrieval data storage region, i.e., volume descriptor, path table, root directory and child directory through the output port 46 to the mastering hard disk 5.

When the transfer of retrieval data except the path table in step S705 or the transfer of all retrieval data in step S706 is ended, the processing proceeds to step S707, where the "O" is stored in the index register j as the initial value.

In the next step S708, the information table reading means 115 reads j record address of the information table.

It is determined in the next step S709 by the judgement means 112 whether or not the content of the j record address thus read out is EOF. If the content of the j record address is not EOF, then the processing proceeds to the next decision step S710. It is determined in step S710 by the judgement means 112 whether or not the content of the j record address is concerned with not dummy data but file. In this case, it is determined whether or not the file name or the file number of the j record address is stored in the file name or file number storage region. If the content of the j record address is concerned with the dummy data, then code data "FFFF", indicating dummy data, is stored in the above storage region.

If the file name or the file number is stored in the j record address and the content of the j record address is concerned with the file, then the processing proceeds to step S7 11, where the file reading means 116 reads out the corresponding file from the mass-storage device 4 through the input port 45. The file reading means 116 reads the corresponding file based on the leading logical address and the data length (available LBN) stored in the j record address.

If on the other hand it is determined in step S710 by the judgement means 112 that the content of the j record address is concerned with the dummy data, then the processing proceeds to step S712, where the dummy data reading means 117 reads out the dummy data developed in the fixed data storage region of the data RAM 44 by the amount of the available LBN stored in the j record address.

When the reading of the corresponding file in step S711 or the reading of dummy data in step S712 is ended, the processing proceeds to step S713, where the data transfer means 118 transfers the read-out file or dummy data through the output port 46 to the mastering hard disk 5.

If the available LBN of the file or dummy data is large so that one file or dummy data cannot be read out by one read processing, then one file or one dummy data can be transferred to the mastering hard disk 5 by repeating a connected processing of the file reading processing and the data transfer processing or a connected processing of the dummy data reading processing and the data transfer processing several times.

Then, the index register j is updated by +1 in step S714 and the processing returns to step S708, where the next record of the information table is read out and the file or the dummy data registered in the record is transferred to the mastering hard disk 5. Since it is determined in decision step S709 that the content of the j record address is EOF after the loop processing (composed of step S708 to step S714) has been repeated a number of times corresponding to the number of records registered in the information table, the EOF is judged and then the processing proceeds to the next decision step S715. At this stage, file data and dummy data registered in the information table are all transferred to the mastering hard disk 5.

It is determined in step S715 by the judgement means 112 whether or not the rearrangement request is issued presently. This judgement of the rearrangement request is carried out by determining whether or not the rearrangement flag is set. Therefore, if the rearrangement flag is set, then it is determined that the rearrangement request is issued presently. Then, the processing proceeds to step S716, where the retrieval data transfer means 114 transfers the path table, which has not yet been transferred, to the mastering hard disk 5.

When the transferring of path table is ended or if it is determined in decision step S715 by the judgement means 112 that the rearrangement request is not issued presently, then the rearrangement means 57 (rearrangement subroutine) is ended.

Then, the processing returns to the main routine shown in FIG. 9, where it is determined in step S209 by the judgement means 52 whether or not a program end request is issued. This judgement is carried out by determining whether or not an end request interruption such as turning a power switch off occurs.

If it is determined in step S209 by the judgement means 52 that the end request is not issued, then the processing returns to step S203 and step S203 and the following steps are repeated. Specifically, a file selection setting picture is displayed on the picture screen of the display 222 and data to be recorded on the CD-ROM is edited. If on the other hand it is determined in step S209 by the judgement means 52 that the end request is issued, then the data editing means 51 is ended.

Although not shown, the computer 1 activates a TOC data generating means when data to be recorded on the CD-ROM are all registered in the mastering hard disk 5. The TOC data generating means generates TOC data including management data with recording positions of each data (file) and recording times of whole files registered therein on the basis of data (file groups, etc.) registered on the mastering hard disk 5.

The mastering apparatus will be described with reference to FIG. 23. As illustrated, the mastering apparatus includes a spindle motor 122 for rotating a glass master disk 121 with a photoresist coated on its surface, a laser light source, e.g., He—Cd gas laser 123 for irradiating the photoresist coated on the glass master disk 121 with laser beams, a CD signal generator 124 for converting recording data Dw output from the computer 1 into CD-ROM data and outputting the same as a CD-system on/off signal Sc, an optical modulator 125 for modulating a laser beam L having a short wavelength (about 0.4 μm) emitted from the He—Cd gas laser 123 under the control of the on/off signal SC supplied thereto from the cD signal generator 124, a recording optical system 126 capable of forming a latent image of a sufficiently small beam spot by converging a modulated beam (a laser beam controlled by the on/off signal Sc) Lc from the optical modulator 125 on the photoresist coated on the glass master disk 121, a feeding mechanism 127 for moving the recording optical system 126 along the radial direction of the glass master disk 121, a servo controller 128 for servo-controlling the spindle motor 122 and the feeding mechanism 127, a subcode generator 129 for generating a subcode Cs used to retrieve data recorded on the CD-ROM and synchronization, and a system controller 130 for controlling a variety of detectors and a variety of circuits.

The optical modulator 125 is composed of an EOM (Electro Optical Modulator) using Pockel's effect and an AOM (Acoustic-Optical Modulator) using supersonic waves.

The recording optical system 126 comprises an objective lens 131 for converging the modulated beam Lc from the optical modulator 125 on the photoresist coated on the glass master disk 121,1 a focusing voice coil 132 for moving the objective lens 131 in the upper and lower direction, a mirror 133 for introducing the modulated beam Lc from the optical modulator 125 into the objective lens 131, and a focus error detector 134 for outputting a distance between the objective lens 131 and the glass master disk 121 as a focus error signal Sf.

Though not shown, the focus error detector 134 comprises a He—Ne semiconductor laser for irradiating an error-detection laser beam on the glass master disk 121 through the objective lens 131, for example, a photodetector for converting reflected-back light from the glass master disk 121 into an electrical signal (focus error signal), and a beam splitter for introducing the reflected-back light into the photodetector.

The feeding mechanism 127 comprises a feeding holder 135 with the recording optical system mounted thereon and a feed motor 136 for moving the feeding holder 135.

The photodetectors are not limited to the focus error detector 134. There are available a rotational speed detector for detecting a rotational speed of the spindle motor 122 and a position detector 138 for detecting a distance of the modulated beam Lc converged by the objective lens 131 from the central shaft of the spindle motor 122. A position signal Sp from the position detector 138 of these detectors is supplied to the system controller 130, whereby the system controller 130 outputs a spindle motor rotation control signal Ss based on a relationship between the content (position of the modulated beam Lc) of the input position signal Sp and the diameter of the glass master disk 121 to the servo controller 128.

The servo controller 128 comprises a focus servo circuit, a feed servo circuit and a rotation servo circuit, though not shown.

The focus servo circuit supplies a control current ic to the voice coil 132 based on the focus error signal Sf input thereto from the focus error detector 134 in the recording optical system 126 to very slightly move the objective lens 131 in the upper and lower direction so that a distance between the objective lens 131 and the glass master disk 121 becomes constant.

The feed servo circuit supplies a control signal Sm to the feed motor 136 based on the rotational speed signal Sn input thereto from the rotational speed detector 137 such that the feeding holder 135 is moved along the radial direction of the glass master disk 121 at a predetermined pitch (e.g., 1.6 μm) per revolution of the rotary shaft of the spindle motor 122 (per revolution of the glass master disk 121).

The rotation servo circuit controls rotation of the spindle motor 122 in accordance with the rotation control signal Ss input thereto from the system controller 130. The spindle motor 122 rotates the glass master disk 121 at a constant linear velocity, for example, under the control of the rotation servo circuit.

The CD signal generator 124 adds the subcode Cs output from the subcode generator 129 and an error correcting code to the recording data Dw output from the computer 1 through the mastering hard disk 5, and scrambles, interleaves and modulates the resultant recording data Dw in an EFM (Eight to Fourteen Modulation) fashion.

An operation of the mastering apparatus will be described in brief. In this mastering apparatus, when the operator issues an activation command (e.g., the operator operates a start button on an operation panel), the system controller 130 outputs an activation signal to the rotation servo signal in the servo controller 128. The rotation servo circuit rotates the spindle motor 122 based on the activation signal input thereto from the system controller 130.

When a rotational speed of the spindle motor 122 becomes constant, the system controller 130 outputs an activation signal to the feed servo circuit in the servo controller 128. The feed servo circuit outputs the control signal Sm to the feed motor 136 based on the activation signal input thereto from the system controller 130 such that the feed motor 136 moves the feed table 135 to the initial position. The feed motor 136 is responsive to the control signal Sm input thereto from the feed servo circuit for moving the feeding table 135 (i.e., the recording optical system 126) to the initial position, in this case, the innermost peripheral position when the glass master disk 121 is seen as the CD-ROM. At that time, when the system controller 130 is responsive to the position signal Sp input thereto from the position detector 138 for recognizing that the recording optical system 126 reaches the innermost peripheral position, the system controller 130 outputs a step-by-step feed start signal to the feed servo circuit so that the feeding holder 135 is moved toward the outer periphery of the glass master disk 121 in a step-by-step fashion under the control of the feed servo circuit. The feed servo circuit is responsive to the step-by-step feed start signal supplied thereto from the system controller 130 for outputting the control signal Sm to the feed motor 136 so that the feed motor 136 feeds the feeding table 135 in a step-by-step fashion.

The feed motor 136 moves the feed holder 135 toward the outer periphery of the glass master disk 121 along the radius of the glass master disk 121 based on the control signal Sm input thereto from the feed servo circuit. At that time, the feed servo circuit is responsive to the rotational speed signal Sn input thereto from the rotational speed detector 137 for controlling the feed motor 136 so that the feed motor 136 moves the feeding holder 135 by a predetermined pitch per rotation of the rotary shaft of the spindle motor 122.

When the recording optical system 126 reaches the position corresponding to the lead-in area of the CD-ROM, the system controller 130 outputs a read command of the recording data Dw to the computer 1. The computer 1 is responsive to the read command inputted thereto from the computer 1 for outputting TOC data and a command code indicating the TOC data. Timings at which the computer 1 outputs the command code and the TOC data are determined on the basis of an output timing signal input thereto from the system controller 130. The command code and the TOC data are supplied to the CD signal generator 124 connected to the computer 1. The CD signal generator 124 is responsive to the command code for recognizing that data supplied from the computer 1 is the TOC data and converts the TOC data into the on/off signal Sc as it is, whereafter the CD signal generator 124 outputs the on/off signal Sc to the optical modulator 125.

The optical modulator 125 is responsive to the on/off signal Sc supplied thereto from the CD signal generator 124 for turning on and off the laser beam L emitted from the gas laser 123. In other words, a laser beam emitted from the optical modulator 125 becomes the modulated beam Lc modulated by the TOC data.

The modulated beam Lc is converged through the recording optical system 126 on the photoresist coated on the glass master disk 121, whereby a pit-series latent image based on the modulated beam Lc, i.e., a pit-series latent image corresponding to the TOC data, is formed on the photoresist at the portion corresponding to the lead-in area of the CD-ROM.

When the computer 1 has finished outputting the TOC data, the computer 1 reads out the recording data (data such as retrieval data and file groups) Dw from the mastering hard disk 5 and sequentially outputs them to the CD signal generator 124. The output timing of the recording data Dw also is determined based on the output timing signal input from the system controller 130.

At the same time the computer 1 outputs the recording data Dw, the subcode generator 129 outputs the subcode Cs necessary for recording on the CD-ROM. The subcode Cs is inputted to the CD signal generator 124. An output timing of the subcode Cs from the subcode generator 129 also is determined in accordance with the output timing signal from the system controller 130.

The CD signal generator 124 adds the subcode Cs from the subcode generator 129 to the recording data Dw supplied thereto from the computer 1 and further adds the error correcting code to the recording data Dw. The recording data Dw with the subcode Cs and the error correcting code added thereto is scrambled, interleaved and modulated in an EFM fashion, and thereby converted into the on/off signal Sc for turning on and off the optical modulator 125. This on/off signal Sc is supplied to the optical modulator 125.

The optical modulator 125 is responsive to the on/off signal Sc supplied thereto from the CD signal generator 124 for turning on and off the laser beam L emitted from the gas laser 123. At that time, a laser beam emitted from the optical modulator 125 equivalently becomes the modulated beam Lc modulated by the recording data Dw.

The modulated beam Lc is converged through the recording optical system 126 on the photoresist coated on the glass master disk, whereby a pit-series latent image based on the modulated beam Lc, i.e., a pit-series latent image corresponding to the recording data Dw, is formed on the photoresist at the portion corresponding to the program area of the CD-ROM.

A numerical aperture (NA) of the objective lens 131 disposed on the recording optical system 126 is selected to be of a sufficiently large value as compared with that of an objective lens disposed in an optical pickup of a CD-ROM drive and that of an objective lens disposed on an optical head of a CD-R drive. Therefore, the pit-series latent image formed on the photoresist with the radiation of laser beam by this mastering apparatus is high in accuracy, which can substantially satisfy design value.

When the laser irradiation processing in the mastering apparatus is ended, the pit-series latent image is formed on the photoresist coated on the glass master disk 121 at its portion corresponding to the lead-in area of the CD-ROM and the pit-series latent image is formed on the photoresist at its portion corresponding to the program area.

Specifically, retrieval data except the system area and the path table, the file groups, randomly-inserted dummy data and recording data (see FIG. 5D) concerning the rearranged path table are recorded on the portion corresponding to the program area as the pit-series latent image.

When the laser irradiation processing in the mastering apparatus is ended, a desired CD-ROM is completed through the metal master process in step S4 shown in FIG. 2, the mother disk manufacturing process in step S5, the stamper manufacturing process in step S6, the CD-ROM master disk manufacturing process in step S7 and the CD-ROM manufacturing process in step S8.

[Arrangement of computer system using CD-ROM]

A computer system using a CD-ROM will be described. As shown in FIG. 6, a CD-ROM drive 32 is connected to a personal computer 31 as an external storage via a SCSI 36, for example.

The user of the personal computer 31 reads necessary file from the CD-ROM and makes business data or plays a computer game on the picture screen of a display connected to the personal computer 31.

However, users of the computer using the CD-ROM do not always use the computer in the above-mentioned manner. It is frequently observed that users illegally copy recorded data of the CD-ROM to the blank disk of the CD-R for the purpose of distributing recorded data of the CD-ROM as pirate data and also distributing recorded data of the CD-ROM to those who are not regular users free of charge or for payment.

At present, a user can easily do illegal copying by connecting a CD-ROM drive 33 to the personal computer 31 via SCSI 37 in addition to the CD-ROM drive 32.

Figure 24:
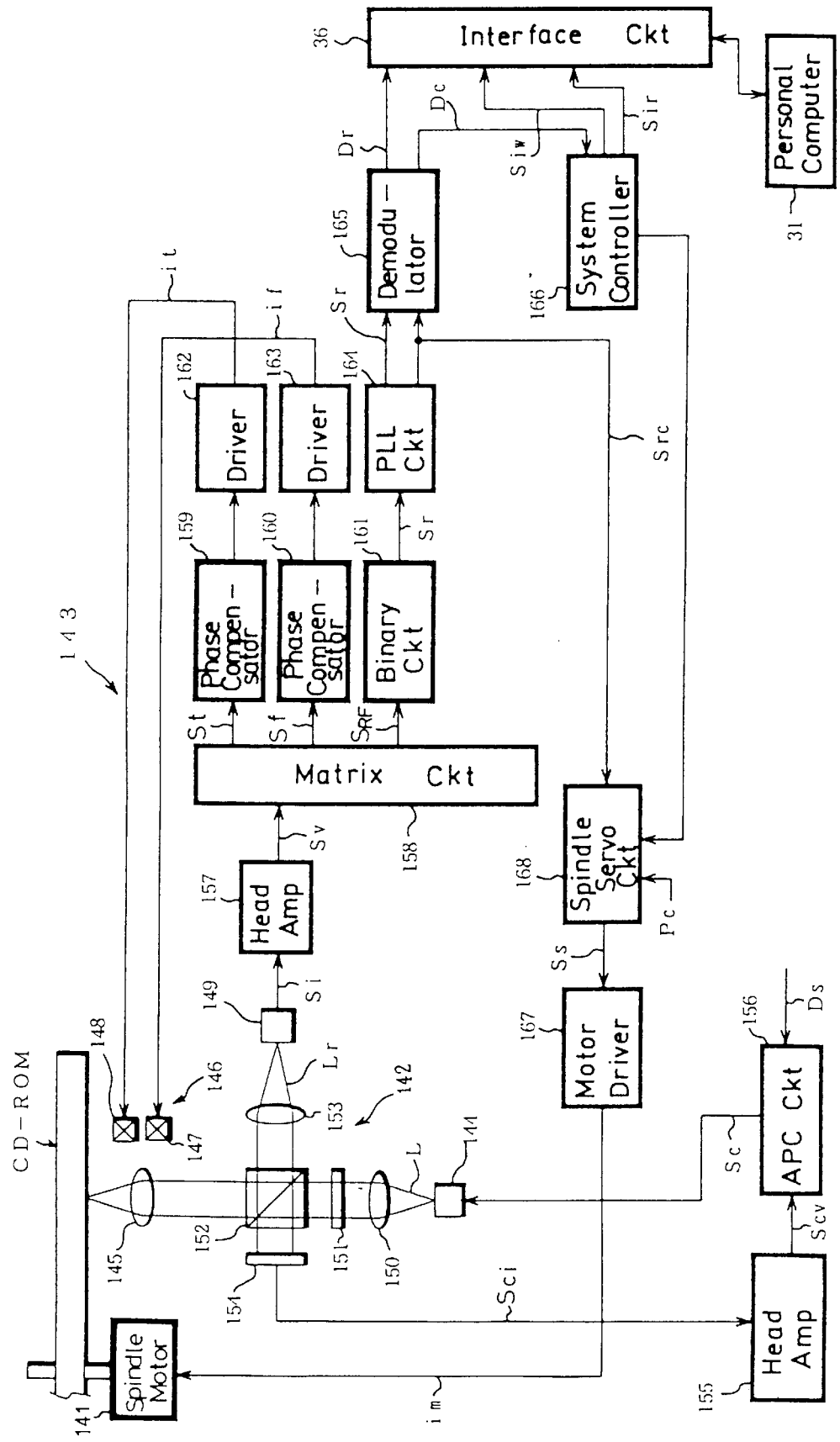
FIG. 24 is a block diagram showing an arrangement of a CD-ROM drive which is one of external storage devices of the computer system mainly formed of a personal computer by the user.
Figure 25:
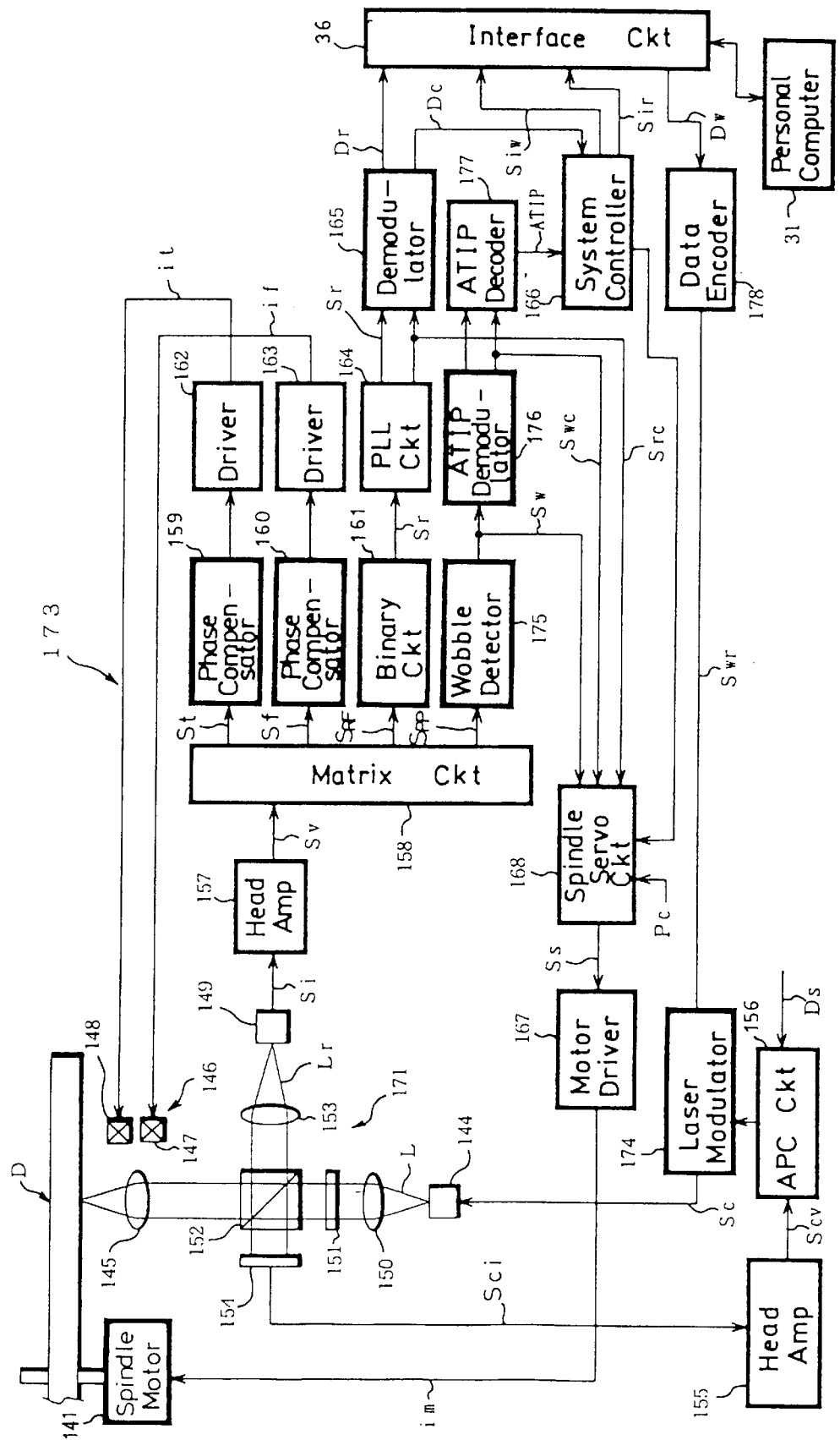
FIG. 25 is a block diagram showing an arrangement of a CD-R drive which is one of external storage devices of the computer system mainly formed of a personal computer by the user.

The CD-ROM drive 32 and the CD-R drive 33 will be described in brief with reference to FIGS. 24 and 25.

Initially, the CD-ROM drive 32 will be described with reference to FIG. 24. As shown in FIG. 24, the CD-ROM drive 32 comprises a spindle motor 141 for rotating a CD-ROM at a constant linear velocity v =1.2 to 1.4 m/s, an optical pickup 142 for reproducing an information signal from the CD-ROM, and a signal reproducing system 143 for processing the information signal reproduced by the optical pickup 142 in a predetermined signal form.

The optical pickup 142 can be moved along the radial direction of the CD-ROM by a known optical head slide mechanism (not shown) mainly composed of a linear motor and a guide shaft, for example. The optical pickup 142 includes an objective lens 145 for converging laser beam L from a laser light source 144 on the CD-ROM.

The objective lens 145 can be moved a little by a two-dimensional actuator 146 in the direction in which it comes close to or away from the CD-ROM and in the radius direction of the CD-ROM. The two-dimensional actuator 146 includes a magnetic circuit composed of a focusing coil 147, a tracking coil 148 and a magnet (not shown).

As illustrated, the optical system of the optical pickup 142 includes the laser light source 144 formed of a semiconductor laser as a light source of laser beam L, the objective lens 145 for converging the laser beam L on the CD-ROM and a photodetector 149 for detecting reflected-back light Lr reflected on the CD-ROM and converting the detected reflected-back light Lr into an electrical signal (detected signal) Si of a current level corresponding to the intensity of the detected reflected-back light Lr, all of which are formed as a single unit. This single unit of the optical system can be moved along the radial direction of the CD-ROM by the optical pickup moving mechanism.

The above optical system further includes a collimator lens 150 for collimating the laser beam L emitted from the laser light source 144 to provide a parallel beam, a phase diffraction grating 151 for separating the laser beam L into at least three light bundle components (−1-order light, 0-order light and +1-order light) and a beam splitter 152 for separating the laser beam L from the laser light source 144 and the reflected-back light Lr from the beam splitter 152.

In the optical path of the reflected-back light Lr, there are disposed a focusing lens 153 for focusing the reflected-back light Lr on the photodetector 149 and a multi-lens (not shown) composed of a cylindrical lens and a concave lens for adjusting a focal length of the reflected-back light Lr and generating an astigmatism.

The three light bundle components separated by the phase diffraction grating 151 will be described more fully. The 0-order light component scans a track on the CD-ROM, the −1-order light scans the guide groove of the outer periphery adjacent to the above track and the +1-order light scans the guide groove of the inner periphery adjacent to the above track.

Therefore, the photodetector 149 is composed of three kinds of photodetectors for converting the reflected-back light beam Lr of the three light bundle components into an electrical signal.

The beam splitter 152 includes on its side opposite to the focusing lens 153 a monitoring photodetector 154 disposed in order to detect a part (light component reflected on the boundary surface of the beam splitter 152) of the laser beam L emitted from the laser light source 144 and converting the same into an electrical signal (detected signal) Sci of output level (current level) corresponding to the intensity of the light component.

The monitoring photodetector 154 is connected with a monitoring head amplifier 155 for converting the detected signal (current signal) Sci from the photodetector 154 into a voltage signal Scv and amplifying the same by a predetermined gain and an intensity controller 156 (generally referred to as APC (Automatic Power Control) circuit) responsive to the detected signal (voltage signal) Scv amplified by the head amplifier 155 for controlling the laser light source 144 so that the laser light source 144 can emit the laser beam stably.

Specifically, the APC circuit 156 controls the laser light source 144 such that the output (intensity) of the laser beam L emitted from the laser light source 144 becomes set value data Ds supplied thereto from a system controller 166, which will be described later on, and that the laser light source 144 can be oscillated stably.

On the other hand, the photodetector 149 of the optical pickup 142 is connected with a head amplifier 157 for converting the detected signal (current signal) Si supplied thereto from the photodetector 149 into the voltage signal Sv and amplifying the same by a predetermined gain and a matrix circuit 158 responsive to the amplified detected signal (voltage signal) Sv supplied thereto from the head amplifier 157 to generate a variety of signals, i.e., a tracking error signal St, a focus error signal Sf and an RF signal $S_{RF}$. The matrix circuit 158 is composed of a variety of adders and subtracters, though not shown.

The matrix circuit 158 is connected in parallel with a phase compensator 159 with the tracking error signal St inputted thereto from the matrix circuit 159 and maintaining the stability of a tracking control system, a phase compensator 160 with the focus error signal Sf inputted thereto from the matrix circuit 158 and maintaining the stability of the focus control system, and a binary circuit 161 for converting the RF signal SRF supplied thereto from the matrix circuit 158 into a binary signal Sr.

The phase compensator 159 is connected with a driver 162 for supplying an exciting current it to the tracking coil 148 of the two-dimensional actuator 146 based on the tracking error signal St supplied thereto through the phase compensator 159. Another phase compensator 160 is connected with a driver 163 for supplying an exciting current if to the focus coil 147 of the two-dimensional actuator 146 based on the focus error signal supplied thereto through the phase compensator 160.

The binary circuit 161 is connected with a signal line supplying the binary signal Sr as it is and a multiplying circuit composed of a PLL circuit 164 for generating an RF clock signal Src by multiplying the binary signal Sr supplied thereto from the binary circuit 161 with a detection timing of a certain special signal pattern (i.e., unique pattern such as a frame synchronizing signal).

The above signal line and the PLL circuit 164 are connected with a demodulator 165. Having demodulated the binary signal Sr supplied thereto from the signal line on the basis of the RF clock signal supplied thereto from the PLL circuit 164, the demodulator 165 de-interleaves and descrambles the demodulated signal to provide digital data. Further, having decoded the error correcting code or the like added to the digital data, the demodulator 165 outputs digital data as reproduced information data Dr including the subcode Dc such as a sector synchronizing signal and a sector address signal. The reproduced information data Dr is transmitted through the interface circuit (SCSI) 36 to the personal computer 31 connected to the outside of the apparatus.

Of the reproduced information data Dr, the subcode Dc such as a variety of synchronizing signals and address signals is supplied to the system controller 166 for controlling various circuits.

The system controller 166 controls various circuits. As a typical control operation done by the system controller 166, the system controller 166 outputs the set value data Ds to the APC circuit 156 so that the APC circuit 156 sets the intensity of the laser beam used upon reproduction. Further, the system controller 166 retrieves the predetermined position with a synchronization on the basis of the reproduced subcode Dc and supplies an enable signal Sir for reproducing data to the interface circuit 36.

On the other hand, the spindle motor 141 is connected to a motor driver 167 for supplying a drive current im to the spindle motor 141. The motor driver 167 is connected to a spindle servo circuit 168 for outputting a servo signal Ss under whose control the CD-ROM is rotated at a predetermined rotational speed.

The spindle servo circuit 168 outputs the servo signal Ss based on the RF clock signal Src supplied thereto from the PLL circuit 164. Specifically, the spindle servo circuit 168 outputs the servo signal Ss to the motor driver 167 so as to rotate the CD-ROM at a constant speed when a frequency of the input RF clock signal Src becomes equal to that of a reference clock Pc inputted to other input terminals thereof.

A manner in which the CD-ROM drive reproduces data from the CD-ROM will be described.

The spindle servo circuit 168 is responsive to the RF clock signal Src supplied thereto from the PLL circuit 164 to control a rotational speed of the CD-ROM so that the CD-ROM can be rotated at a predetermined rotational speed by the spindle motor 141 through the motor driver 167.

The system controller 166 retrieves a frame of recorded data to be reproduced. Having detected a predetermined frame, the system controller 166 detects a header address of data to be reproduced supplied thereto from the demodulator 165. When the target header address is detected, the system controller 166 starts reading the data.

When the system controller 166 outputs the data reproduction enable signal Sir to the interface circuit 36 and the reproduced information data Dr output from the demodulator 165 is transmitted through the interface circuit 36 to the personal computer 31, the system controller 166 starts reading the data. During a series of playback operation, the spindle servo circuit 168 is operated by the RF clock signal Src supplied thereto from the PLL circuit 164.

The CD-R drive 33 will be described with reference to FIG. 25. In the drawing, like parts corresponding to those of FIG. 24 are marked with the same references and therefore need not be described in detail. The CD-R drive can reproduce CD-R, a blank disk and CD-ROM and these optical disks will hereinafter be collectively referred to as an optical disk D for simplicity.

As illustrated, the CD-R drive 33 includes the spindle motor 141 for rotating the optical disk D at a constant linear velocity v=1.2 to 1.4 m/s, an optical head 171 for reproducing an information signal from the CD-R or CD-ROM or recording an information signal on the blank disk or the CD-R, and a signal processing system 172 for placing the information signal reproduced by the optical head 171 in a predetermined signal form and placing recording data in such a predetermined signal form as it can be recorded on the blank disk or the CD-R.

The optical head 171 is arranged in substantially the same manner in which the optical pickup 142 mounted on the CD-ROM drive 32 is arranged.

The CD-R drive 33 includes a laser modulator 174 for modulating a laser output of the laser light source 144 disposed within the optical head 171.

The phase diffraction grating 151 disposed within the optical head 171 separates the laser beam to provide three light bundle components, i.e., the 0-order light component, the +1-order light component and the −1-order light component. The 0-order light component scans one groove portion (track in the case of CD-ROM) on the optical disk D, the +1-order light component scans a land portion (guide groove of the outer peripheral side in the case of CD-ROM) of the outer peripheral side adjacent to the groove portion, and the −1-order light component scans a land portion (guide grove of the inner peripheral side in the case of the CD-ROM) of the inner peripheral side adjacent to the groove portion. Reflected-back light of 1-order light is used to detect a tracking error.

The APC circuit 156 in the CD-R drive 33 is responsive to the amplified detected signal (voltage signal) Sc supplied thereto from the monitor head amplifier 155 for outputting a control signal Sc to the laser modulator 174 so that the laser light source 144 can emit the laser beam stably.

Specifically, the APC circuit 156 outputs the control signal Sc to the laser modulator 174 such that a power (intensity) of the laser beam L emitted from the laser light source 144 becomes equal to the set value data Ds supplied from the system controller 166 and that the laser light source 144 can emit the laser beam stably. The system controller 166 outputs the set value data Ds of different values when an information signal is played back from the CD-R and CD-ROM and when an information signal is recorded on the blank disk. The value of the set value data Ds is set such that the output power of the laser beam L used to record the information signal becomes stronger than the output power of the laser beam L used to reproduce the information signal.

The laser modulator 174 is responsive to the control signal Sc supplied thereto from the APC circuit 156 to control the supply of a current to the laser light source 144 (in particular, the amplitude of the current signal supplied to the laser light source 144). Moreover, the laser modulator 174 controls the supply of current to the laser light source 144 on the basis of an on/off sinal Swr supplied thereto from a data encoder 178 which will be described later on.

On the other hand, the head amplifier 157 is connected with the matrix circuit 158. The matrix circuit 158 is composed of various adders and subtracters so as to generate the tracking error signal St, the focus error signal Sf, the RF signal SRF and a push-pull signal Spp in response to the amplified detected signal (voltage signal) Sv supplied thereto from the head amplifier 157. The matrix circuit 158 can generate the tracking error signal St by D-PP (differential push-pull method).

The matrix circuit 158 is connected with the phase compensators 159, 160, the binary circuit 161 and a wobble detector 175 composed of a bandpass filter or the like, for example, for extracting a wobble signal Sw from the push-pull signal Spp thereof.

The wobble detector 175 is connected with an ATIP demodulator 176 which demodulates the wobble signal Sw supplied thereto from the wobble detector 175 to provide an FM-demodulated signal Sfm for obtaining absolute time information ATIP. Also, the ATIP demodulator 176 generates a read clock signal Swc for reading the absolute time information ATIP from the FM-demodulated signal Sfm on the wobble signal Sw. A frequency of the read clock signal Swc is 6.35 kHz, for example, when a frequency of the wobble signal Sw is held at 22.05 kHz.

The ATIP demodulator 176 is connected with an ATIP decoder 177 which converts the FM-demodulated signal Sfm supplied thereto from the ATIP demodulator 176 into the absolute time information ATIP for synchronizing sectors on the basis of the read clock signal Swc supplied thereto from the ATIP demodulator 176. The resultant absolute time information ATIP is supplied from the ATIP decoder 177 to the system controller 166.

The ATIP decoder 177 is connected with the system controller 166. The system controller 166 is adapted to control a variety of circuits. As typical control operations of the system controller 166, the system controller 166 outputs the set value data Ds to the APC circuit 156 so that the APC circuit 156 can set the laser power used upon reproduction or recording. Further, the system controller 166 is responsive to the absolute time information ATIP supplied thereto from the ATIP decoder 177 for retrieving a predetermined position to transmit a data reproducing or data recording enable signal Sir or Siw to the interface circuit 36 while achieving the synchronization.

The spindle servo circuit 168 outputs the servo signal Ss in response to the wobble signal Sw supplied thereto from the wobble detector 175, the read clock signal Swc supplied thereto from the ATIP demodulator 176 or the RF clock signal Src supplied thereto from the PLL circuit 164.

To be more concrete, in response to the wobble signal Sw supplied thereto from the wobble detector 175, the spindle servo circuit 168 outputs the servo signal Ss to the motor driver 167 so that the optical disk D is rotated at a constant standard velocity when the frequency of the input wobble signal Sw is held at 22-05 kHz (44.1 kHz in twice normal speed mode).

In response to the read clock signal Swc supplied thereto from the ATIP demodulator 176, the spindle servo circuit 168 outputs the servo signal Ss to the motor driver 167 so that the optical disk D is rotated at a constant standard velocity when the frequency of the input read clock signal Swc is held at 6.35 kHz.

In response to the RF clock signal Src supplied thereto from the PLL circuit 164, the spindle servo circuit 168 outputs the servo signal Ss to the motor driver 167 so that the optical disk D is rotated at a constant velocity so as to make the frequency of the input RF clock signal Src equal to the frequency of the reference clock Pc inputted to other terminals thereof.

The laser modulator 174 is connected with a data encoder 178. Having error-corrected and encoded the recording data (digital data) Dw supplied thereto through the interface circuit 36 from the personal computer 31, the data encoder 178 modulates the resultant data in an EFM (Eight to Fourteen Modulation) fashion to provide recording information data and converts the thus converted data into a binary signal, whereafter it outputs the binary signal as the on/off signal Swr.

A manner in which the CD-R drive 33 records data on the blank disk, for example, will be described below.

This blank disk is of the groove recording type where pits are recorded on the groove portion. When data is recorded on the blank disk, the spindle motor 141 rotates the blank disk at a certain linear velocity in response to an actuation signal supplied thereto from the system controller 166. Then, the system controller 166 outputs the set value data Ds indicating laser power value for reproduction to the APC circuit 156. The APC circuit 156 controls the laser modulator 174 such that the power of the laser beam L emitted from the laser light source 144 becomes equal to the power indicated by the set value data Ds from the system controller 166.

At that very time, the wobble detector 175 extracts the wobble signal Sw from the push-pull signal Spp supplied thereto from the matrix circuit 158 (more precisely, the push-pull signal generator). Then, the succeeding ATIP demodulator 176 generates the FM-demodulated signal Sfm for obtaining the absolute time information ATIP and the read clock Swc in response to the wobble signal Sw.

The wobble signal Sw from the wobble detector 175 and the read clock signal Swc from the ATIP demodulator 176 are supplied to the spindle servo circuit 168. The spindle servo circuit 168 controls a rotational speed at which the blank disk is rotated by the spindle motor 141 through the motor driver 167 such that the frequency of the wobble signal Sw becomes 22.05 kHz upon one time normal speed mode or that the frequency of the read clock signal Swc becomes 6.35 kHz upon one time normal speed mode.

Since in this case the wobble signal Sw extracted by the wobble detector 175 has the waveform without noise and timebase error, the spindle servo circuit 168 can accurately control the rotational speed of the blank disk. Therefore, it becomes possible to read the information signal from the blank disk quickly.

On the other hand, the FM-demodulated signal Sfm and the read clock signal Swc are supplied to the ATIP decoder 177 which generates the absolute time information ATIP on the basis of these signals Sfm and Swc. The resultant absolute time information ATIP is supplied from the ATIP decoder 177 to the succeeding system controller 166. The system controller 166 achieves a synchronization on the basis of the absolute time information ATIP supplied thereto.

Having achieved a synchronization, the system controller 166 searches the position at which data is to be recorded in response to the above absolute time information ATIP. When the system controller 166 detects a predetermined position, the system controller 166 outputs a data recording enable signal Siw to the interface circuit 36 so that recording data from the personal computer 1 in the standby mode is supplied through the interface circuit 36 to the data encoder 178. In this case, when the recording data is CD-ROM data from the CD-ROM drive 32, data are TOC data, subcode and recording data (selected file groups, etc.) recorded on the CD-ROM.

This time, the system controller 166 outputs the set value data Ds indicating a recording laser power value to the APC circuit 156. The APC circuit 156 controls the laser modulator 174 such that the power of the laser beam L emitted from the laser light source 144 becomes the value indicated by the set value data Ds supplied thereto from the system controller 166.

The recording data Dw supplied to the data encoder 178 is encoded in some suitable fashions such as error correction, and modulated in an EFM fashion into recording information data. Then, the data encoder 178 converts the recording information data into a binary signal, and outputs this binary signal to the laser modulator 174 as the on/off signal Swr.

The laser modulator 174 controls the laser power of the laser light source 144 on the basis of the control signal Sc supplied thereto from the APC circuit 156. Further, the laser modulator 174 turns on and off the laser output of the laser light source 144 on the basis of the on/off signal Swc supplied thereto from the data encoder 178. Then, the laser beam L that is emitted from the laser light source 144 controlled by the laser modulator 174 is irradiated on a data portion of a predetermined sector on the blank disk, thereby recording data on the data portion as pits. When data is recorded, a frame synchronizing signal also is recorded at a predetermined interval. A series of operations is sequentially repeated and therefore the recording data transmitted from the personal computer 31 is recorded on the data portion of the corresponding sector as each pit. Specifically, when the recording data is the reproduced data from the CD-ROM drive 32, TOC data, subcode and recorded data recorded on the CD-ROM are recorded as pits as they are.

A manner in which the CD-R drive 33 reproduces data from the CD-R will be described next.

The spindle servo circuit 168 controls a rotational speed at which the CD-R is rotated by the spindle motor 141 through the motor driver 167 in response to the wobble signal Sw supplied thereto from the wobble detector 175 or the read clock signal Swc supplied thereto from the ATIP demodulator 176. This operation is the same as the spindle servo circuit 168 performs upon recording.

Then, the system controller 166 searches information data at its frame (absolute time) to be reproduced. When detecting a predetermined frame (absolute time), the system controller 166 awaits the supply of header address of data to be reproduced from the demodulator 165. When the target header address is detected, the data starts being reproduced from the above header address.

In order to reproduce the data, the system controller 166 outputs the data reproduction enable signal Sir to the interface circuit 36 and the reproduced information data Dr output from the demodulator 165 is transmitted through the interface circuit 36 to the personal computer 3 1. During a series of reproducing operations, the spindle servo circuit 168 is operated in response to the wobble signal Sw.

[Disk copy processing from CD-ROM to blank disk]

As is clear from the arrangements of the CD-ROM drive 32 and the CD-R drive 33, the CD-R drive 33 can directly record data on the blank disk if data to be recorded is data from the CD-ROM drive 32. Therefore, if the user inputs a command "DISK COPY" to the personal computer 31 in order to copy the data of the CD-ROM to the blank disk, then the personal computer 31 activates the CD-ROM drive 32 in response to the "DISK COPY" command inputted thereto. The CD-ROM drive 32 reproduces the CD-ROM loaded thereunto and transmits reproduced data through the interface circuit (SCSI) 36 to the personal computer 31.

The personal computer 31 receives data transmitted from the CD-ROM drive 32 and transmits together with a recording command the received data through the SCSI 36 to the CD-R drive 33. The CD-R drive 33 records data of CD-ROM on the blank disk on the basis of the recording command inputted thereto from the personal computer 31.

As described above, the user can copy the data of the CD-ROM to the blank disk easily by use of the personal computer 31.

[Effects of CD-ROM on which data is recorded by the inventive data recording apparatus]

A maximum data length of data recorded on the CD-ROM is generally larger than 666.6 Mbytes which is the maximum recording data length of the blank disk because of the numerical aperture NA of the objective lens 131 disposed on the recording optical system 126 (see FIG. 23) of the mastering apparatus. Although the maximum data length is 670 Mbytes, if data lengths of file groups recorded on the CD-ROM are less and the whole data length of recording data is less than the maximum recording data length of the blank disk, then data of the CD-ROM can be recorded on the blank disk as they are by the copy operation of the computer system (see FIG. 5A).

However, in the CD-ROM with data recorded by the data recording apparatus according to this embodiment, as shown in FIG. 5D, data lengths of the recorded files are shorter. Therefore, even if the whole data length of recorded data is less than the maximum recording data length of the blank disk, the dummy data setting means 55 randomly records dummy data of the number corresponding to the number of divided data so that the whole data length of recording data can be expanded to the maximum data length of the CD-ROM. In addition, the rearrangement means 57 shifts a part (path table) of the retrieval data at the end of the recording data and then the data is recorded. Thus, the following effects can be achieved.

Specifically, even when the recording data of the CD-ROM is recorded on the blank disk as it is by use of the computer system to make a copy CD-R of the CD-ROM, data of the portion exceeding 666.6 Mbytes which are the maximum recording data length of the blank disk cannot be recorded physically.

In this case, even when those who are skilled in operating the personal computer 31 are going to remove dummy data and record only the file on the blank disk, it is substantially impossible to know the number of dummy data and the positions at which the dummy data are placed. Therefore, it is substantially difficult to carry out illegal copying by removing the dummy data. In addition, since the dummy data is selectively given the invisible attribute, it becomes difficult to remove the dummy data by operating the computer 31.

Since the path table exists in the portion (dropped portion) of the data that is not recorded on the blank disk as shown in FIG. 5D, even when recorded data on the CD-ROM is illegally used by reproducing the CD-R, it becomes difficult to reproduce the recorded data. As a consequence, the CD-R becomes substantially useless.

The user cannot recognize that the copy of the CD-R from the CD-ROM is useless until the CD-R is actually reproduced. In this case, if the user is directly urged to recognize at the stage of operating the personal computer 31 that the illegal copy is not allowed, then this becomes more effective for preventing illegal copying.

Therefore, as one method for urging the user to inhibit the illegal copy, the computer 31 which can effect the disk copy should preferably include the following copy restriction means.

This copy restricting means is declared (registered) in a program information table on the DOS, for example, so as to be activated when the user enters a disk copy command or the like.

There are two methods of copy restricting means. In the first method, when the data length of recorded data on the CD-ROM, for example, is longer than the maximum recordable data length of the blank disk, the entered disk copy command is made invalid and the disk copy is forced to be useless. In accordance with the second method, under the above-mentioned conditions, although the disk copy operation itself is allowed, a message indicating that the disk copy is invalid is displayed on the picture screen of a monitor display to urge the user to recognize that the illegal copy is substantially useless.

A copy inhibition means 201 for realizing the first method and a warning generating means 221 for realizing the second method will be described with reference to FIGS. 26 to 29.

Figure 26:
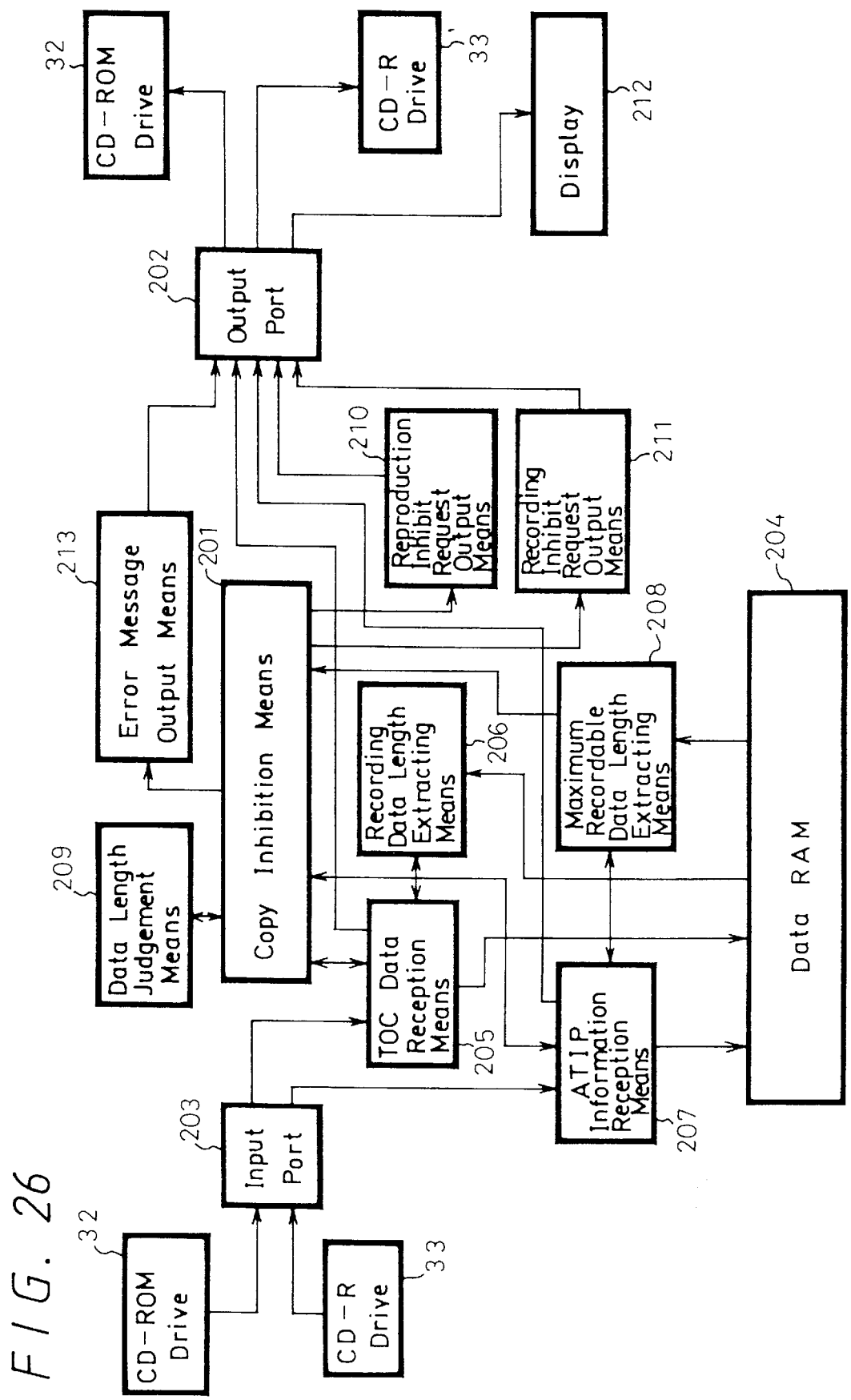
FIG. 26 is a functional block diagram showing a processing operation of a copy inhibiting means of methods (copy restricting means) for urging the user to refrain from doing the illegal copy.

The copy inhibition means 201 is activAled by the OS based on the copy command entered thereto. As shown in FIG. 26, the copy inhibition means 201 is composed of a TOC data reception means 205 for requesting the CD-ROM drive 32 to transmit the TOC data through the output port 202 of the personal computer 31. There is also a means for receiving the TOC data transmitted through the input port 203 of the personal computer 1 from the CD-ROM drive 32 and storing the received TOC data in the predetermined region of a data RAM 204 in the personal computer 1. Additionally, there is a recording data length extracting means 206 for extracting a recording data length of the CD-ROM from the TOC data received by the TOC data reception means 205, an ATIP information reception means 207 for requesting the CD-R drive 33 to transmit ATIP information through the output port 202 and receiving the ATIP information transmitted from the CD-R drive 33 through the input port 203 and storing the received ATIP information in a predetermined region of the data RAM 203, a maximum recordable data length extracting means 208 for extracting maximum recordable data length data of the CD-R (or blank disk) from the ATIP information received by the ATIP information reception means 207, a data length judging means 209 for comparing and judging the extracted recording data length and the extracted maximum recordable data length, a reproduction inhibit request output means 210 for outputting a reproduction inhibit request signal to the CD-ROM drive 32 through the output port 202, a recording inhibit request output means 211 for outputting a recording inhibit request signal to the CD-R drive 33 through the output port 202, and an error message output means 213 for outputting error message data to the display 212 connected to the personal computer 31 through the output port 202.

Figure 27:
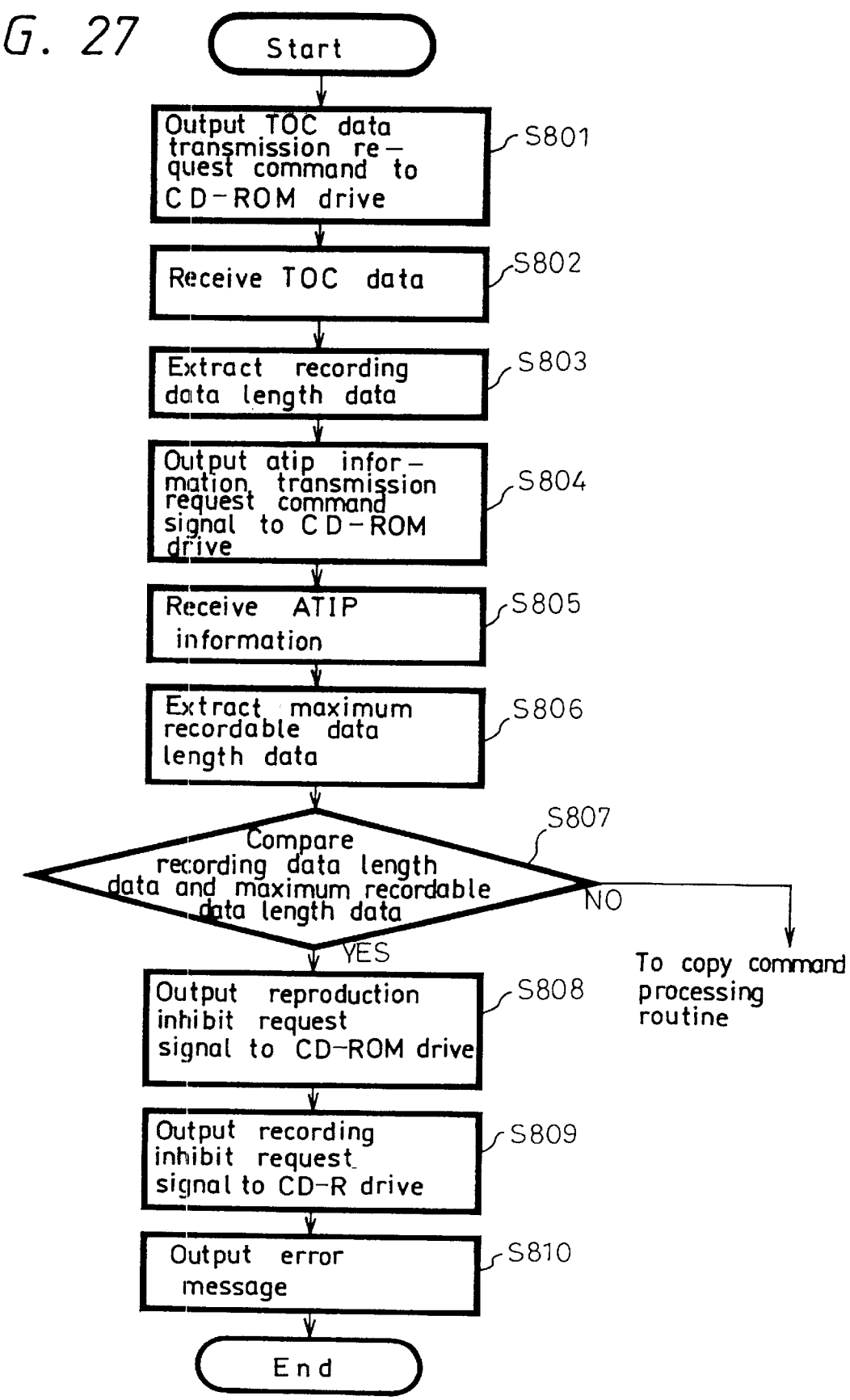
FIG. 27 is a flowchart to which reference will be made in explaining a processing operation of a copy inhibiting means.

In the copy inhibit means 201, in step S801 shown in FIG. 27, the TOC data receiving means 205 outputs a data transmission request command signal to the CD-ROM drive 32 through the output port 202. The CD-ROM drive 32 reproduces data on the basis of the command signal inputted thereto from the personal computer 31 and the outputted TOC data of the reproduced data to the personal computer 31.

In step S802, the TOC data reception means 205 receives the TOC data inputted thereto through the input port 203 from the CD-ROM drive 32 and stores the received data in a predetermined region of the data RAM 204.

In step S803, the recording data length extracting means 206 extracts CD-ROM recording data length data from the TOC data stored in the predetermined region of the data RAM 204.

In step S804, the ATIP information reception means 207 202 outputs an ATIP information transmission request command signal to the CD-R drive 33 through the output port 202. The CD-R drive 33 reproduces data based on the above command signal supplied thereto from the personal computer 31 and outputs ATIP information of the reproduced data to the personal computer 31.

In step S805, the ATIP information reception means 207 receives the ATIP information supplied thereto from the CD-R drive 33 through the input port 203 and stores the received ATIP information in a predetermined region of the data RAM 204.

In step S806, the maximum recordable data length extracting means 208 extracts maximum recordable data length data of blank disk from the ATIP information stored in the predetermined region of the data RAM 204.

In step S807, the data length judgement means 209 compares recording data length data value (recording data length) extracted by the recording data length extracting means 206 and the maximum recordable data length data (maximum recordable data length) extracted by the maximum recordable data length extracting means 208.

If the recording data length is longer than the maximum recordable data length, then the processing proceeds to the next step S808, where the reproduction inhibit request means 210 outputs the reproduction inhibit request signal to the CD-ROM drive 33 through the output port 202. The CD-R drive 33 inhibits the recording operation from being effected on the blank disk on the basis of the recording inhibit request signal inputted thereto from the personal computer 31. Thus, recording data is prevented from being copied from the CD-ROM to the CD-R.

In the next step S810, the error message output means 213 outputs error message data indicating "THIS CD-ROM CANNOT BE COPIED", for example, to the display 212 through the output port 202. Then, the display 212 displays the above-mentioned error message on a predetermined position based on the error message data inputted thereto from the personal computer 31.

When the output processing of the error message data at step S810 is ended, the processing does not proceed to a copy command processing and the copy inhibit means 201 is ended. Therefore, the copy command processing routine is forced to be ended.

If on the other hand it is determined in step S807 that the recording data length of the CD-ROM is longer than the maximum recordable data length of the blank disk, then the input copy command is made invalid and the disk copy from the CD-ROM to the CD-R is not effected.

Figure 28:
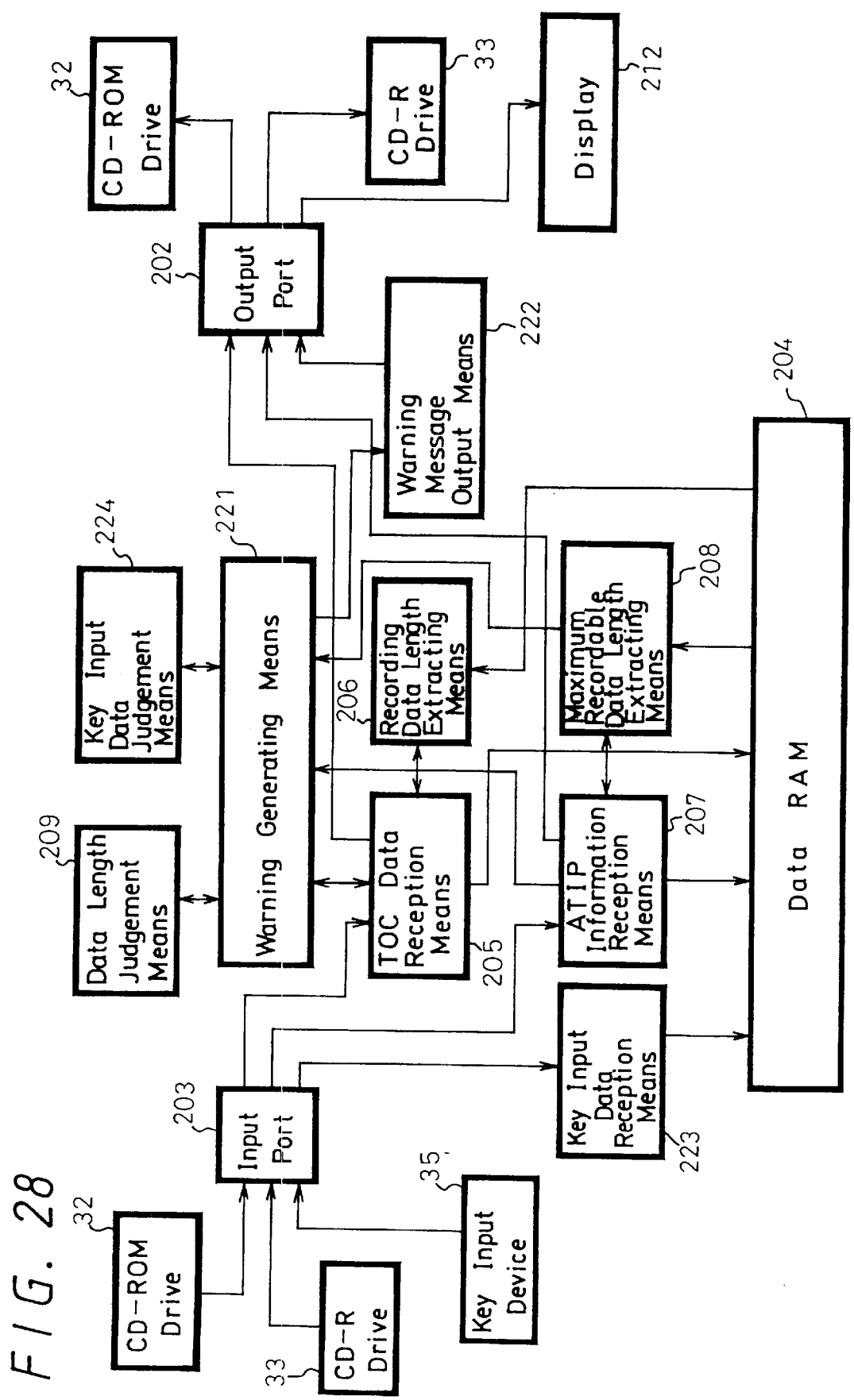
FIG. 28 is a functional block diagram showing a processing operation of a warning generating means of methods (copy restricting means) for urging the user to refrain from doing the illegal copy.
Figure 29:
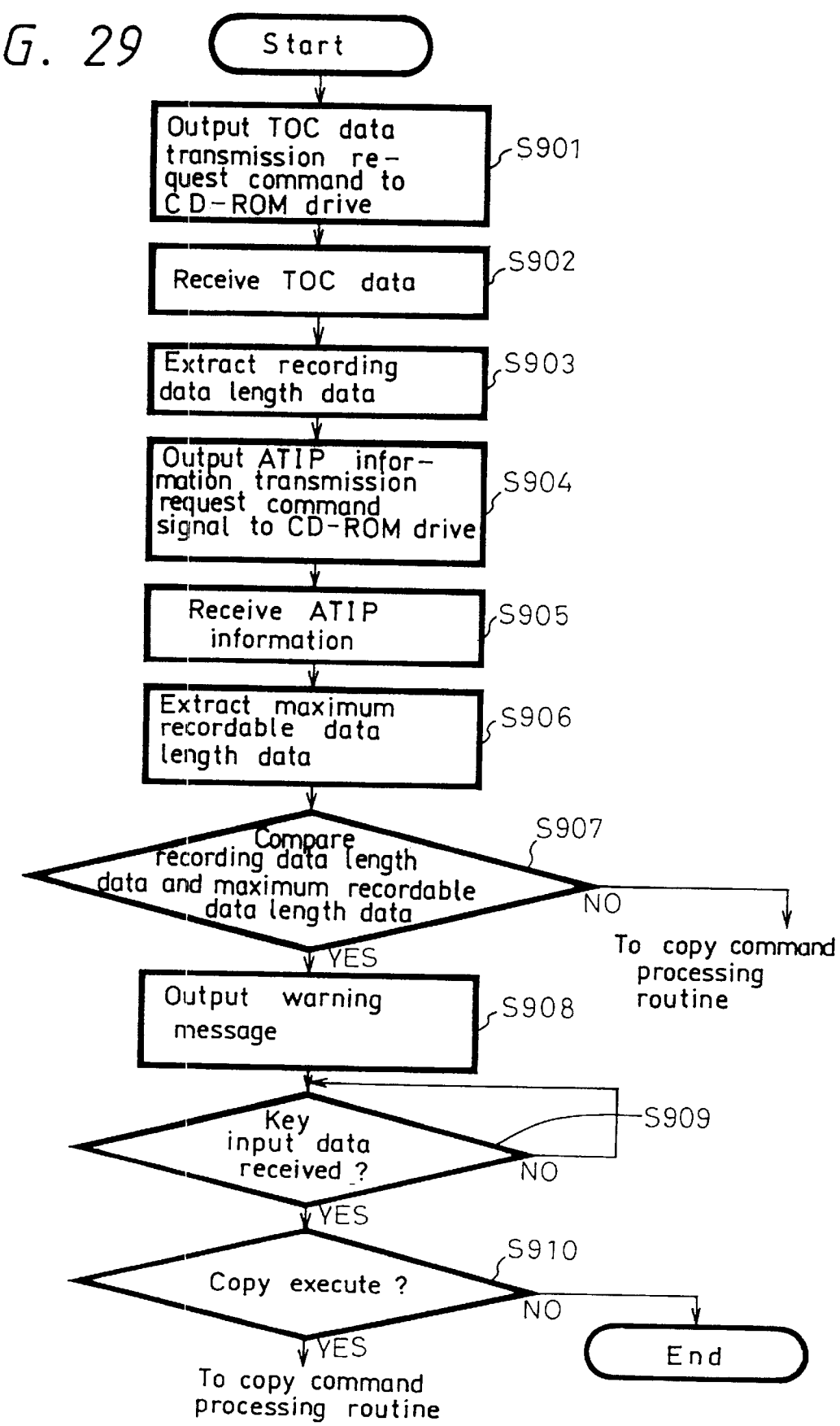
FIG. 29 is a flowchart to which reference will be made in explaining a processing operation of the warning generating means.

A warning generating means 221 will be described with reference to FIGS. 28 and 29. As shown in FIG. 28, the warning generating means 221 includes the TOC data reception means 205, the recording data length extracting means 206, the ATIP information reception means 207, the maximum recordable data length extracting means 208 and the data length judgment means 209 of the copy inhibit means 201, a warning message output means 222 for outputting warning message data through the output port 202 to the display 212, a key input data reception means 223 for receiving key input data inputted thereto through the input port 203 from the key input device such as a keyboard connected to the personal computer 31, and a key input data judgement means 224 for judging the content of the key input data.

Operation of the warning generating means 221 will be described below. Steps S901 to S907 are exactly the same in processing as steps S801 to S807 of the copy inhibition means 201, and therefore need not be described in detail.

If it is determined in step S907 that the recording data length is longer than the maximum recordable data length, then the processing proceeds to the next step S908, where the warning message output means 222 outputs warning message data indicating "INVALID DISK COPY FROM CD-ROM TO CD-R. <A>CANCEL, <B> EXECUTE" to the display 212 through the output port 202. The display 212 displays the warning message on a predetermined position of its picture screen based on the warning message data input thereto from the personal computer 31.

The user operates the key "A" if the user gives up copy based on the display of the warning message. If the user recognizes that the disk copy is invalid and that the user tries to do the disk copy, then the user operates the key "B".

It is determined in step S909 by the key input data judgment means 224 whether or not the key input data reception means 223 receives the key input data inputted thereto from the key input device 33. The step S909 is repeated until the key input data reception means 223 receives key input data, i.e., the apparatus is placed in the standby mode awaiting the inputted data entered by the key input device 35.

If the key input data is entered by operating the key input device 35 by the user through the input port 203, then the key input data is received by the key input data reception means 223, and the processing proceeds to the next step S910.

It is determined in step S910 by the key input judgment means 224 whether the content of the key input data represents "EXECUTE" or "CANCEL". If the content of the key input data represents "EXECUTE" as represented by a YES at decision step S910, then the processing proceeds to the copy command processing routine and the copy from the CD-ROM to the CD-R is executed. In this case, however, in this disk copy, the path table data is dropped and therefore the copied CD-R becomes substantially useless.

If it is determined in decision step S910 that the content of the key input data represents "CANCEL", then the processing does not proceed to the copy command processing routine and the warning generating means 221 is ended. Therefore, the copy command processing routine is forced to be ended.

If it is determined in step S907 that the recording data length is less than the maximum recordable data length, then the processing proceeds to the copy command processing routine, where the disk copy from the CD-ROM to the CD-R is executed.

As described above, according to the warning generating means 221, if the recording data length of the CD-ROM is larger than the maximum recordable data length of the blank disk, then the disk copy operation itself is allowed but the message indicating that the disk copy is substantially invalid is displayed on the display screen of the display 212 to thereby urge the user to recognize that the illegal copy is substantially useless. Thus, it becomes possible to effectively prevent a successful illegal copy from being executed.

While the present invention is applied to the data recording on the CD-ROM and the inhibition of the illegal copy from the CD-ROM to the CD-R (blank disk) as described above, the present invention is not limited thereto and the present invention is applied to CDs in which music data are recorded. Furthermore, the present invention is not limited to CD and CD-ROM but can be widely applied to a variety of optical disks and magneto-optical disks.

Furthermore, although recording data of CD-ROM can all be recorded if the maximum recordable data length recorded on the time information ATIP is selected to be more than 670 Mbytes by increasing the wobbling shape, in particular, wobbling pitch of pregroove on the blank disk, when data of 666.6 Mbytes or greater are recorded on the blank disk, a clearance between adjacent recording pits is substantially removed from a standpoint of an ability (NA of objective lens, etc.) of a recording optical system mounted on the CD-R drive. As a result, in worst cases, there is the possibility that pits that should be recorded discretely will be recorded as one successive pit. Therefore, even when the recording density of the blank disk is increased to be 670 megabytes or greater, when the CD-R drive reproduces the blank disk, bit errors will frequently occur and the blank disk becomes substantially useless.

We claim:

1. A data recording method for recording data on a disk shaped recording medium comprising the steps of:
   (a) making recording data which satisfies a relationship expressed as $M \geq W \geq D$ where
      M is a maximum recordable data length defined by a standard of a first disk shaped recording medium,
      W is a data length of the recording data to be recorded on the first disk shaped recording medium, and
      D is a data length of effective data which is effective on access; and
   (b) recording the recording data made in step (a) on the first disk shaped recording medium,
wherein the recording data made in step (a) has a relationship of $W>m$, where m is a maximum recordable data length of a second disk shaped recording medium that is associated with the first disk shaped recording medium.

2. A data recording method according to claim 1, wherein a relationship between the recording data length W and the effective data length is $W>D$, and
   wherein the recording data having a relationship of $W>m$ is achieved by adding invalid data to the effective data in the step (a).

3. A data recording method according to claim 2, wherein the invalid data has an invisible attribute.

4. A data recording method according to claim 1, wherein a part of the effective data is rearranged in step (a).

5. A data recording method according to claim 4, wherein a part of the data is disposed at the end of the recording data in step (a).

6. A data recording method according to claim 5, wherein the effective data comprises real data composed of a number of file groups and retrieval data used to retrieve the real data and the part of the data is a part or whole of the retrieval data.

7. A data recording apparatus for recording data on a disk shaped recording medium comprising:
   recording data making means for making recording data which satisfies a relationship expressed as $M \geq W \geq D$ where
      M is the maximum recordable data length defined by the standard of a first disk shaped recording medium,
      W is the data length of recording data which is to be recorded on the first disk shaped recording medium, and
      D is the data length of effective data which is effective on access; and
   recording means for recording the recording data made by the recording data making means on the first disk shaped recording medium,
   wherein the data making means makes the recording data have a relationship of $W>m$ where m is a maximum recordable data length of a second data recordable disk shaped recording medium associated with the first disk shaped recording medium.

8. A data recording apparatus according to claim 7, wherein when a relationship between the recording data length W and the effective data length is $W>D$, and
   wherein the recording data making means makes the recording data have a relationship of $W>m$ by adding invalid data to the effective data.

9. A data recording apparatus according to claim 8, wherein the recording data making means includes attribute setting means for setting the invalid data in an effective data management file as having an invisible attribute.

10. A data recording apparatus according to claim 8, wherein the recording data making means includes a rearrangement means for rearranging a part of the effective data.

11. A data recording apparatus according to claim 10, wherein the rearrangement means disposes a part of the data at the end of the recording data.

12. A data recording apparatus according to claim 11, wherein the effective data comprises real data composed of a number of file groups and retrieval data used to retrieve the real data and the part of the data is a part or whole of the retrieval data.

13. A disk shaped recording medium, wherein recording data which satisfies a relationship expressed as $M \geq W \geq D$ is recorded where
   M is the maximum recordable data length defined by the standard of the disk shaped recording medium,
   W is the data length of recording data which is to be recorded on the disk shaped recording medium, and
   D is the data length of effective data which is effective on access,
wherein the recording data satisfies a relationship of $W>m$, wherein m is a maximum recordable data length of a different data recordable disk shaped recording medium which is associated with the disk shaped recording medium.

14. A disk shaped recording medium according to claim 13, wherein the recording data is recorded under the condition that a part of the effective data is rearranged with other portions of the effective data.

15. A disk shaped recording medium according to claim 14, wherein the recording data is recorded under the condition that a part of the effective data is disposed at the end of the recording data.

16. A computer system including a first storage device for reproducing information data from a first disk shaped recording medium, a second storage device for recording information data on a second disk shaped recording medium and control apparatus for controlling the first and second storage devices, the computer system comprising:
   data length detection means for detecting a data length W of information data recorded on the first disk shaped recording medium;
   detection means for detecting whether the data length W is longer than a maximum recordable data length m determined by standards for the second disk shaped recording medium; and
   copy restricting means for restricting information data recorded on the first disk shaped recording medium from being copied to the second disk shaped recording medium when the detection means determines W>m.

17. A computer system according to claim 16, wherein the copy restricting means includes copy inhibiting means to inhibit the information data from being copied to the second disk shaped recording medium.

18. A computer system according to claim 16, wherein the copy restricting means includes warning generating means for generating a warning indicating that the copy is substantially invalid.

19. A data copy preventing method for preventing information data having a recording data length W recorded on a first disk shaped recording medium from being copied to a second disk shaped recording medium having a maximum recordable data length m, the data copy preventing method comprising the steps of:

comparing the recording data length W and the maximum recordable data length m; and restricting the information data recorded on the first disk shaped recording medium from being copied onto the second disk shaped recording medium when a comparison result is W>M.

20. A data copy preventing method according to claim 19, wherein the information data is inhibited from being copied to the second disk shaped recording medium as a copy restriction.

21. A data copy preventing method according to claim 19, wherein a warning indicating that a copy of the information data to the second disk shaped recording medium is invalid, is generated as a copy restriction.

* * * * *